US010683076B2

(12) United States Patent
Zha

(10) Patent No.: US 10,683,076 B2
(45) Date of Patent: Jun. 16, 2020

(54) FLUID SYSTEMS THAT INCLUDE A CO-FLOW JET

(71) Applicant: COFLOW JET, LLC, Cutler Bay, FL (US)

(72) Inventor: Gecheng Zha, Cutler Bay, FL (US)

(73) Assignee: COFLOW JET, LLC, Cutler Bay, FL (US)

( * ) Notice: Subject to any disclaimer, the term of this patent is extended or adjusted under 35 U.S.C. 154(b) by 129 days.

(21) Appl. No.: 16/135,120

(22) Filed: Sep. 19, 2018

(65) Prior Publication Data

US 2019/0127042 A1   May 2, 2019

Related U.S. Application Data

(60) Provisional application No. 62/687,835, filed on Jun. 21, 2018, provisional application No. 62/649,703, (Continued)

(51) Int. Cl.
*B64C 3/14* (2006.01)
*B64C 21/02* (2006.01)
(Continued)

(52) U.S. Cl.
CPC ............. *B64C 3/141* (2013.01); *B64C 3/10* (2013.01); *B64C 3/36* (2013.01); *B64C 21/025* (2013.01);
(Continued)

(58) Field of Classification Search
CPC ..... B64C 3/141; B64C 3/36; B64C 2003/143; B64C 21/00; B64C 21/02; B64C 21/025; B64C 21/04; B64C 21/06
See application file for complete search history.

(56) References Cited

U.S. PATENT DOCUMENTS

| 1,580,577 A | 4/1926 | Baumann |
| 1,714,608 A | 5/1929 | Massey |
| (Continued) | | |

FOREIGN PATENT DOCUMENTS

| CN | 104176241 | 12/2014 |
| CN | 104149967 | 5/2015 |
| (Continued) | | |

OTHER PUBLICATIONS

ESPACENET, Patent Translate of DE202011051844, pp. 1-9, retrieved from Internet Apr. 11, 2018.
(Continued)

*Primary Examiner* — Richard G Davis
(74) *Attorney, Agent, or Firm* — Buchanan Van Tuinen LLC

(57) ABSTRACT

Fluid systems are described herein. An example embodiment of a fluid system has a first body portion, a second body portion, a plurality of supports, a plurality of fluid pressurizers, and a plurality of ducts. The first body portion and the second body portion cooperatively define an injection opening, a suction opening, and a channel that extends from the injection opening to the suction opening. The fluid pressurizer is disposed within the channel cooperatively defined by the first body portion and the second body portion. Each duct of the plurality of ducts is disposed within the channel cooperatively defined by the first body portion and the second body portion.

20 Claims, 31 Drawing Sheets

Related U.S. Application Data filed on Mar. 29, 2018, provisional application No. 62/646,960, filed on Mar. 23, 2018, provisional application No. 62/579,429, filed on Oct. 31, 2017.

(51) Int. Cl.
  *B64C 3/10* (2006.01)
  *B64C 3/36* (2006.01)
  *F15D 1/00* (2006.01)
  *B64C 29/00* (2006.01)

(52) U.S. Cl.
  CPC ........ *F15D 1/0055* (2013.01); *B64C 29/0075* (2013.01); *B64C 2003/143* (2013.01); *B64C 2230/04* (2013.01); *B64C 2230/06* (2013.01)

(56) References Cited

U.S. PATENT DOCUMENTS

| | | |
|---|---|---|
| 1,771,257 A | 7/1930 | Ingram |
| 1,772,196 A | 8/1930 | Wallace |
| 1,806,927 A | 5/1931 | Aldrich |
| 1,810,693 A | 6/1931 | Alfaro |
| 1,845,307 A | 2/1932 | Maxwell |
| 1,861,336 A | 5/1932 | Cox |
| 1,888,871 A | 11/1932 | Apperman |
| 1,993,419 A | 3/1935 | Stalker |
| 2,039,676 A | 5/1936 | Zaparka |
| 2,041,795 A | 5/1936 | Stalker |
| 2,063,030 A | 12/1936 | Crouch |
| 2,071,744 A | 2/1937 | Anathor-Henrikson |
| 2,075,817 A | 4/1937 | Loerke |
| 2,077,071 A | 4/1937 | Rose |
| 2,078,854 A | 4/1937 | Jones |
| 2,082,674 A | 6/1937 | Young |
| 2,223,744 A | 12/1940 | Stalker |
| 2,225,525 A | 12/1940 | Pitcairn |
| 2,267,927 A | 12/1941 | Kightlinger |
| 2,352,144 A | 6/1944 | Woods |
| 2,406,918 A | 9/1946 | Stalker |
| 2,421,694 A | 6/1947 | Hawkins |
| 2,427,972 A | 9/1947 | Melchior |
| 2,438,942 A | 4/1948 | Polk |
| 2,464,726 A | 3/1949 | Stalker |
| 2,469,902 A | 5/1949 | Stalker |
| 2,478,793 A | 8/1949 | Trey |
| 2,507,611 A | 5/1950 | Pappas et al. |
| 2,511,504 A | 6/1950 | Hawkins |
| 2,514,513 A | 7/1950 | Price |
| 2,584,666 A | 2/1952 | Bockrath |
| 2,597,769 A | 5/1952 | Ashkenas |
| 2,605,983 A | 8/1952 | Stalker |
| 2,619,302 A | 11/1952 | Loedding |
| 2,714,495 A | 8/1955 | Focke |
| 2,809,793 A | 10/1957 | Warner |
| 2,892,582 A | 6/1959 | O'Rourke |
| 2,910,254 A | 10/1959 | Razak |
| 2,946,541 A | 7/1960 | Boyd |
| 3,029,043 A | 4/1962 | Churchill |
| 3,029,044 A | 4/1962 | Childress |
| 3,039,719 A | 6/1962 | Platt |
| 3,045,947 A | 7/1962 | Bertin et al. |
| 3,055,614 A | 9/1962 | Thompson |
| 3,097,817 A | 7/1963 | Towzey, Jr. |
| 3,101,678 A | 8/1963 | Grube |
| 3,128,063 A | 4/1964 | Kaplan |
| 3,144,220 A | 8/1964 | Kittelson |
| 3,161,377 A | 12/1964 | Balluff |
| 3,261,576 A | 7/1966 | Valyi |
| 3,262,658 A | 7/1966 | Reilly |
| 3,291,420 A | 12/1966 | Laing |
| 3,298,636 A | 1/1967 | Arnholdt |
| 3,430,894 A | 3/1969 | Strand et al. |
| 3,438,599 A | 4/1969 | Welzen |
| 3,441,236 A | 4/1969 | Arnholdt |
| 3,506,220 A | 4/1970 | Sbrilli |
| 3,507,463 A | 4/1970 | Kuntz |
| 3,540,681 A | 11/1970 | Orazi |
| 3,545,701 A | 12/1970 | Bertin et al. |
| 3,572,612 A | 3/1971 | Irbitis |
| 3,576,300 A | 4/1971 | Palfreyman |
| 3,586,267 A | 6/1971 | Ingelman-Sundberg |
| 3,658,279 A | 4/1972 | Robertson |
| 3,666,209 A | 5/1972 | Taylor |
| 3,807,663 A | 4/1974 | Bartoe, Jr. |
| 3,887,146 A | 6/1975 | Bright |
| 3,917,193 A | 11/1975 | Runnels, Jr. |
| 3,977,629 A | 8/1976 | Tubeuf |
| 4,033,526 A | 7/1977 | Benson |
| 4,086,022 A | 4/1978 | Freeman et al. |
| 4,117,995 A | 11/1978 | Runge |
| 4,375,937 A | 3/1983 | Cooper |
| 4,381,091 A | 4/1983 | Pegram |
| 4,391,424 A | 7/1983 | Bartoe, Jr. |
| 4,398,683 A | 8/1983 | Schmetzer |
| 4,398,688 A | 8/1983 | Williams |
| 4,804,155 A | 2/1989 | Strumbos |
| 4,828,203 A | 5/1989 | Clifton et al. |
| 4,848,701 A | 7/1989 | Belloso |
| 4,928,907 A | 5/1990 | Zuck |
| 4,976,349 A | 12/1990 | Adkins |
| 4,990,053 A | 2/1991 | Rohne |
| 5,016,837 A | 5/1991 | Willis |
| 3,011,762 A | 12/1991 | Pouit |
| 5,098,034 A | 3/1992 | Lendriet |
| 5,255,881 A | 10/1993 | Rao |
| 5,280,863 A | 1/1994 | Schmittle |
| 5,282,718 A | 2/1994 | Koff et al. |
| 5,335,885 A | 8/1994 | Bohning |
| 5,395,073 A | 3/1995 | Rutan et al. |
| 5,474,417 A | 12/1995 | Privett et al. |
| 5,542,149 A | 8/1996 | Yu |
| 5,586,859 A | 12/1996 | Nolcheff |
| 5,607,284 A | 3/1997 | Byrne et al. |
| 5,687,934 A | 11/1997 | Owens |
| 5,707,206 A | 1/1998 | Goto et al. |
| 5,765,777 A | 6/1998 | Schmittle |
| 5,769,359 A | 6/1998 | Rutan et al. |
| 5,899,416 A | 5/1999 | Meister et al. |
| 6,089,503 A | 7/2000 | Volk |
| 6,220,012 B1 | 4/2001 | Hauser et al. |
| 6,231,301 B1 | 5/2001 | Barnett et al. |
| 6,264,425 B1 | 7/2001 | Keller |
| 6,368,059 B1 | 4/2002 | Maines |
| 6,464,171 B2 | 10/2002 | Ruffin |
| 6,543,720 B2 | 4/2003 | Ladd |
| 6,669,142 B2 | 12/2003 | Saiz |
| 6,796,533 B2 | 9/2004 | Barrett et al. |
| 6,896,221 B1 | 5/2005 | Einarsson |
| 6,935,833 B2 | 8/2005 | Seitz |
| 7,074,006 B1 | 7/2006 | Hathaway et al. |
| 7,104,143 B1 | 9/2006 | Powell |
| 7,143,983 B2 | 12/2006 | McClure |
| 7,308,762 B2 | 12/2007 | Bath et al. |
| 7,441,724 B2 | 10/2008 | Parks |
| 7,520,465 B2 | 4/2009 | Mahjoub |
| 7,575,412 B2 | 8/2009 | Seitz |
| 7,673,832 B2 | 3/2010 | Meister |
| 7,837,438 B2 | 11/2010 | Campbell |
| 7,878,458 B2 | 2/2011 | Shmilovich et al. |
| 8,128,037 B2 | 3/2012 | Powell et al. |
| 8,128,364 B2 | 3/2012 | Pesetsky |
| 8,191,820 B1 | 6/2012 | Westra et al. |
| 8,246,311 B2 | 8/2012 | Pesetsky |
| 8,251,317 B2 | 8/2012 | Pitt |
| 8,251,319 B2 | 8/2012 | Jonker et al. |
| 8,262,031 B2 | 9/2012 | Zha et al. |
| 8,302,903 B2 | 11/2012 | Morgan et al. |
| 8,448,892 B2 | 5/2013 | Zhu |
| 8,459,597 B2 | 6/2013 | Cloft et al. |
| 8,469,907 B2 | 6/2013 | Ichihashi et al. |
| 8,485,476 B2 | 7/2013 | Zha et al. |
| 8,561,935 B2 | 10/2013 | Milde, Jr. |
| 8,829,706 B1 | 9/2014 | Sammy |

(56) References Cited

U.S. PATENT DOCUMENTS

| | | |
|---|---|---|
| 9,115,594 B2 | 8/2015 | Krautheim |
| 9,726,084 B2 | 8/2017 | Duong et al. |
| 9,815,545 B1 | 11/2017 | Steer |
| 2002/0139894 A1 | 10/2002 | Sorensen |
| 2003/0035715 A1 | 2/2003 | Torrance |
| 2003/0150962 A1 | 8/2003 | Orban |
| 2005/0111968 A1 | 5/2005 | Lapworth |
| 2005/0226717 A1 | 10/2005 | Xu |
| 2006/0196633 A1 | 9/2006 | Mahjoub |
| 2007/0095970 A1 | 5/2007 | Richardson |
| 2007/0196204 A1 | 8/2007 | Seitz |
| 2007/0217902 A1 | 9/2007 | Sirakov et al. |
| 2007/0228222 A1 | 10/2007 | Davis |
| 2008/0044273 A1 | 2/2008 | Khalid |
| 2009/0014592 A1 | 1/2009 | Zha |
| 2009/0065631 A1 | 3/2009 | Zha |
| 2009/0095446 A1 | 4/2009 | Hamstra et al. |
| 2009/0108141 A1 | 4/2009 | Shmilovich |
| 2009/0173834 A1 | 7/2009 | Prince et al. |
| 2010/0127129 A1 | 5/2010 | Zha et al. |
| 2011/0001000 A1 | 1/2011 | Zhu |
| 2011/0001020 A1 | 1/2011 | Forgac |
| 2011/0210211 A1* | 9/2011 | Zha ............... B64C 21/025 244/208 |
| 2011/0215172 A1 | 9/2011 | Todorovic |
| 2012/0043428 A1* | 2/2012 | Goelling ............ B64C 9/18 244/208 |
| 2012/0068020 A1 | 3/2012 | Milde, Jr. |
| 2012/0074264 A1 | 3/2012 | Heaton |
| 2012/0145834 A1 | 6/2012 | Morgan et al. |
| 2012/0237341 A1 | 9/2012 | Simon |
| 2013/0206920 A1 | 8/2013 | Bichler et al. |
| 2014/0286746 A1 | 9/2014 | Nicholas et al. |
| 2014/0369812 A1 | 12/2014 | Caruel et al. |
| 2016/0009374 A1 | 1/2016 | Glezer |
| 2016/0368339 A1 | 12/2016 | Nam |
| 2017/0355450 A1 | 12/2017 | Zha |
| 2017/0355451 A1 | 12/2017 | Zha |
| 2018/0251211 A1 | 9/2018 | Zha |

FOREIGN PATENT DOCUMENTS

| | | |
|---|---|---|
| DE | 202011051844 U1 | 1/2012 |
| EP | 3254961 | 12/2017 |

OTHER PUBLICATIONS

European Patent Office, Extended European Search Report for Application No. 18202156.8, dated Apr. 2, 2019, pp. 1-11.
European Patent Office. "Extended European Search Report" for EP application No. 19181825.1, dated Oct. 30, 2019, pp. 1-7.
European Patent Office, Extended European Search Report for Application No. 17175582.0, dated Nov. 9, 2017, pp. 1-5.
World Intellectual Property Organization, English Translation of CN 104149967, retrieved from Internet Oct. 4, 2019, pp. 1-4.
World Intellectual Property Organization, English Translation of CN 104176241, retrieved from Internet Oct. 2, 2019, pp. 1-7.

* cited by examiner

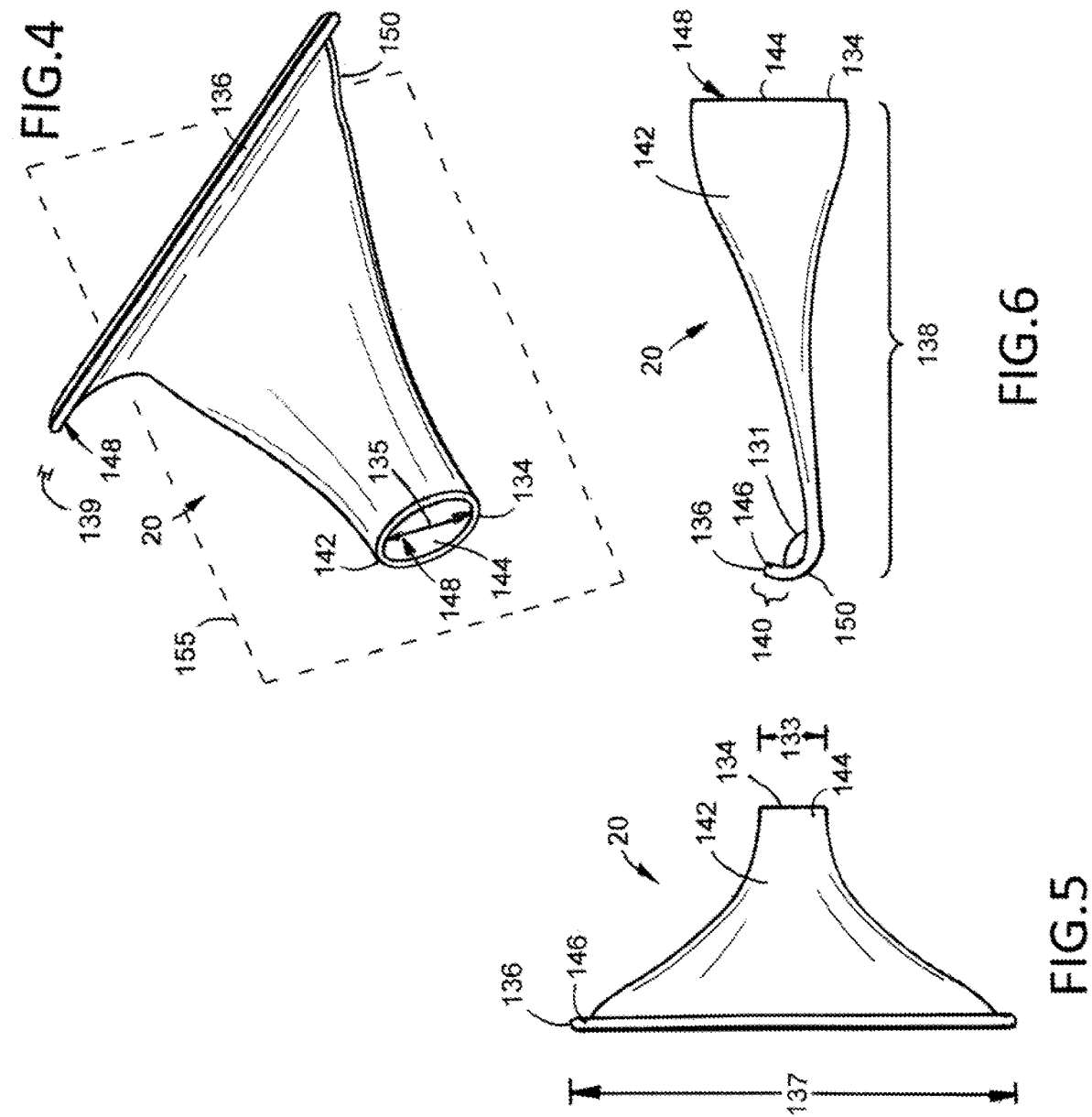

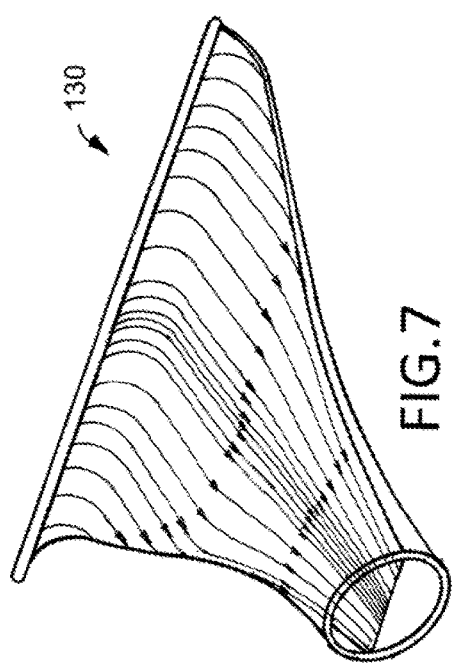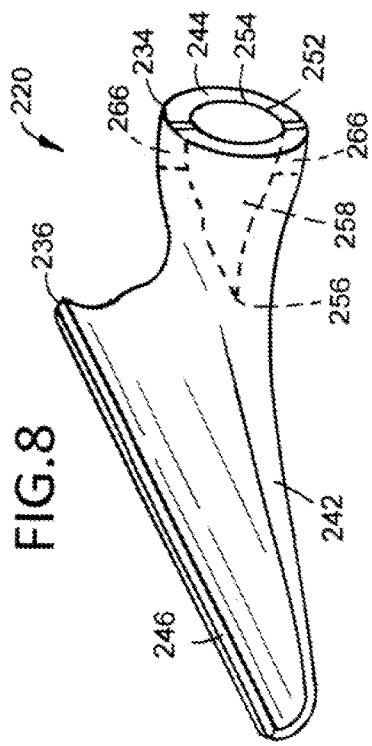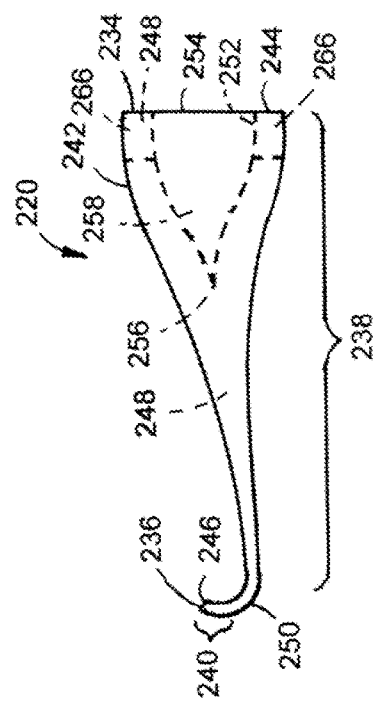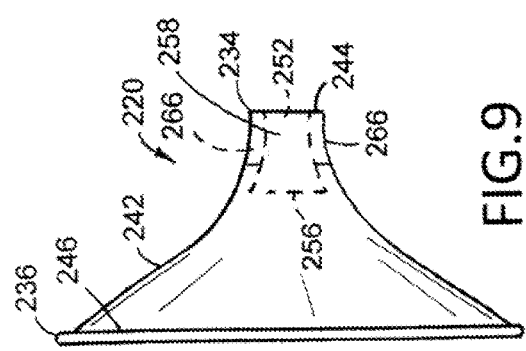

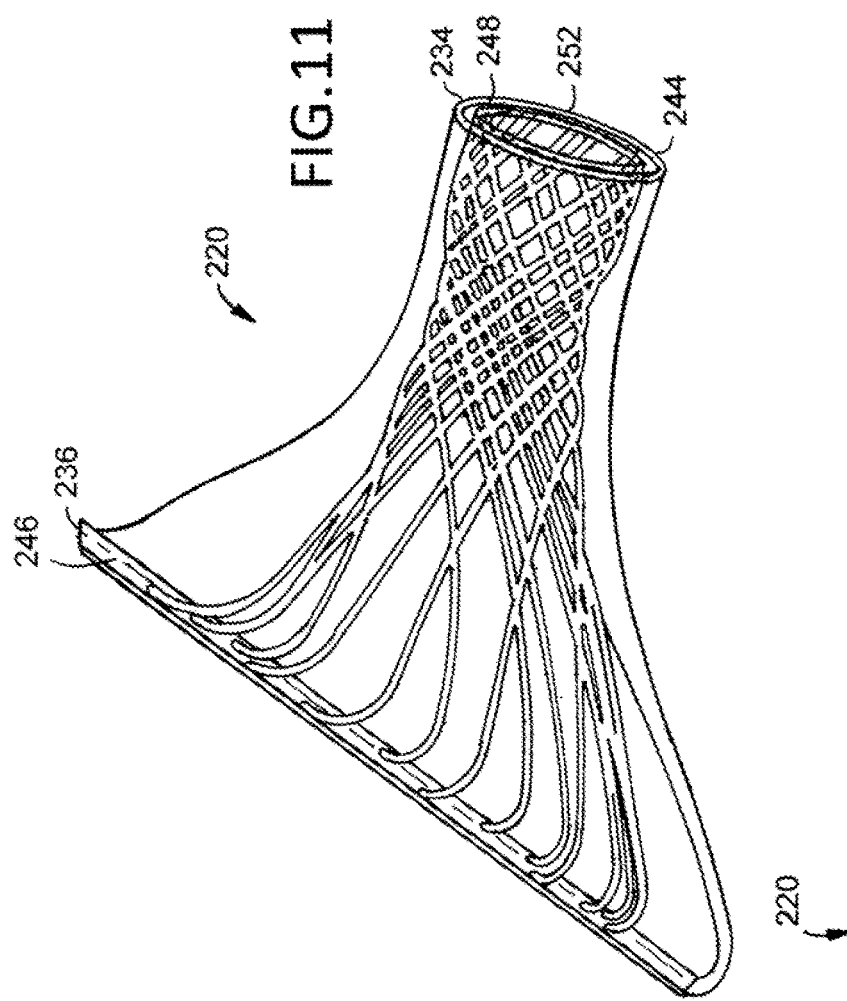
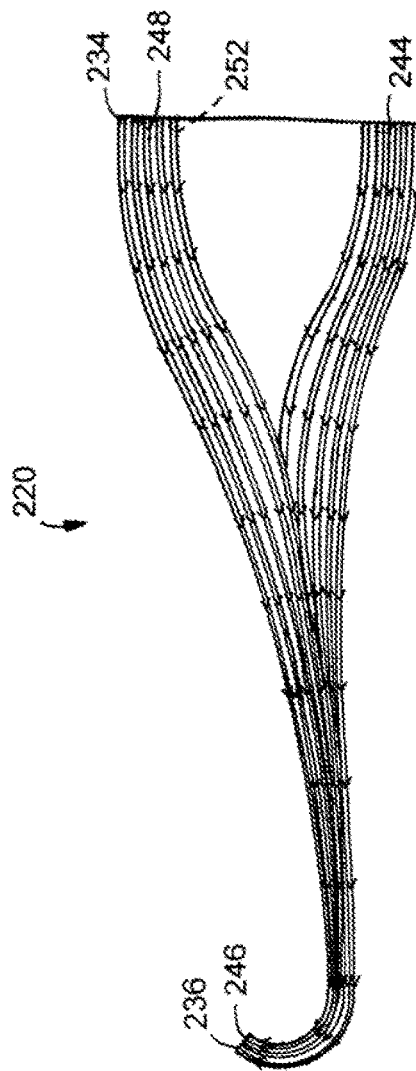

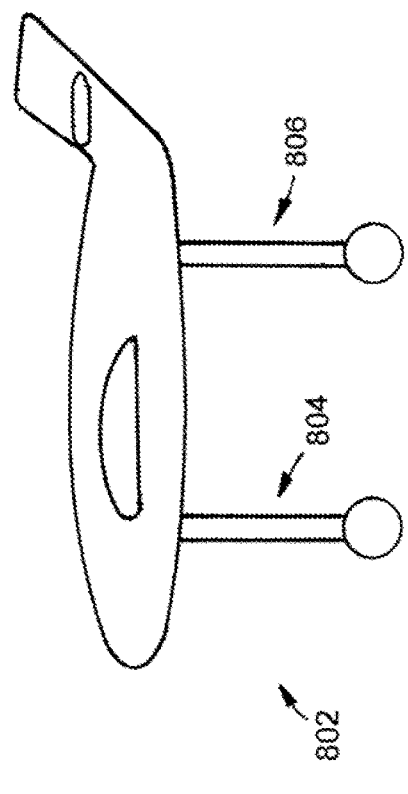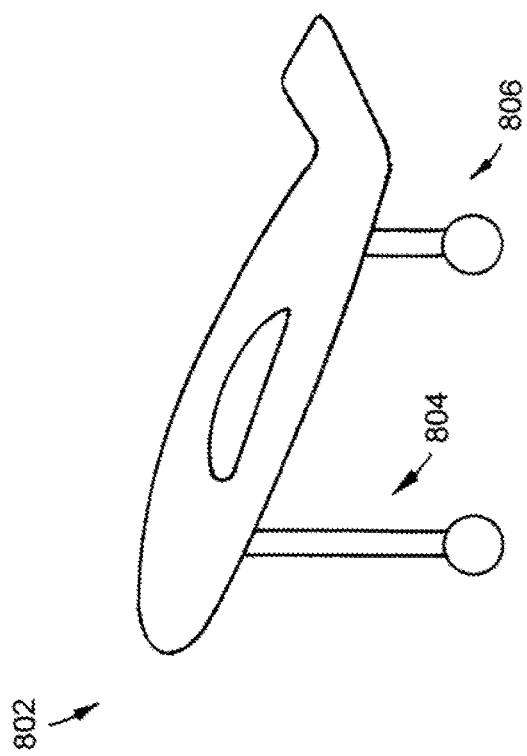

FLUID SYSTEMS THAT INCLUDE A CO-FLOW JET

RELATED APPLICATIONS

This application claims the benefit of U.S. Provisional Application No. 62/579,429, filed Oct. 31, 2017, U.S. Provisional Application No. 62/646,960, filed Mar. 23, 2018, U.S. Provisional Application No. 62/649,703, filed Mar. 29, 2018, and U.S. Provisional Application No. 62/687,835, filed Jun. 21, 2018. The entire disclosure of each of these related applications is hereby incorporated into this disclosure by reference.

FIELD

The disclosure relates generally to the field of fluid systems. More particularly, the disclosure relates to fluid systems that include a co-flow jet.

BACKGROUND

Transportation vehicles, such as aircraft, have traditionally made use of propellers or jet engine propulsion systems to generate thrust and wings to generate lift to support the weight of the aircraft. Generally, the propulsion and lift-generating systems have been addressed as separate systems. Some airfoil systems have been developed that combine these systems by utilizing a conduit that is in communication with outlet and inlet openings defined on the wing of the aircraft. However, these systems do not provide alternatives for altering the fluid flow through the conduit to achieve greater propulsion and/or lift.

Therefore, a need exists for new and useful fluid systems.

SUMMARY OF SELECTED EXAMPLE EMBODIMENTS

Various fluid systems are described herein.

An example fluid system includes a first body portion, a second body portion, a fluid pressurizer, and a duct. The first body portion has a leading edge, a trailing edge, a first intermediate edge, a second intermediate edge, and a main body that defines a recess, a recess base, and a first opening. The first intermediate edge is disposed between the leading edge and the second intermediate edge. The second intermediate edge is disposed between the first intermediate edge and the trailing edge. The recess extends into the main body of the first body portion from the first opening to the recess base. The first opening extends from the first intermediate edge to the second intermediate edge. The second body portion is disposed within the recess defined by the main body of the first body portion. The first body portion and the second body portion cooperatively define an injection opening, a suction opening, and a channel that extends from the injection opening to the suction opening. The fluid pressurizer is disposed within the channel cooperatively defined by the first body portion and the second body portion and has a port. The duct is attached to the port of the fluid pressurizer and is disposed within the channel. The duct has a first end, a second end, a first portion, a second portion, and a main body that defines a first duct opening at the first end, a second duct opening at the second end, and a passageway that extends from the first duct opening to the second duct opening. The first portion extends from the first end toward the second end. The second portion extends from the second end toward the first end. The first portion is disposed at an angle relative to the second portion. The angle is less than about 130 degrees.

Additional understanding of the exemplary fluid systems can be obtained by review of the detailed description, below, and the appended drawings.

BRIEF DESCRIPTION OF THE DRAWINGS

FIG. 4 is a perspective view of a duct included in the fluid system illustrated in FIG. 1.

FIG. 5 is a top view of the duct illustrated in FIG. 4.

FIG. 6 is a side view of the duct illustrated in FIG. 4.

FIG. 7 is a perspective view of the duct illustrated in FIG. 4 subjected to a fluid flow field.

FIG. 8 is a perspective view of another example duct that can be included in a fluid system.

FIG. 9 is a top view of the duct illustrated in FIG. 8.

FIG. 10 is a side view of the duct illustrated in FIG. 8.

FIG. 11 is a perspective view of the duct illustrated in FIG. 8 subjected to a fluid flow field.

FIG. 12 is a side view of the duct illustrated in FIG. 11.

FIG. 18 is a side view of a first example aircraft that includes a fluid system. The landing gear is illustrated in a first configuration.

FIG. 19 is another side view of the aircraft illustrated in FIG. 18. The landing gear is illustrated in a second configuration.

DETAILED DESCRIPTION

Figure 1:
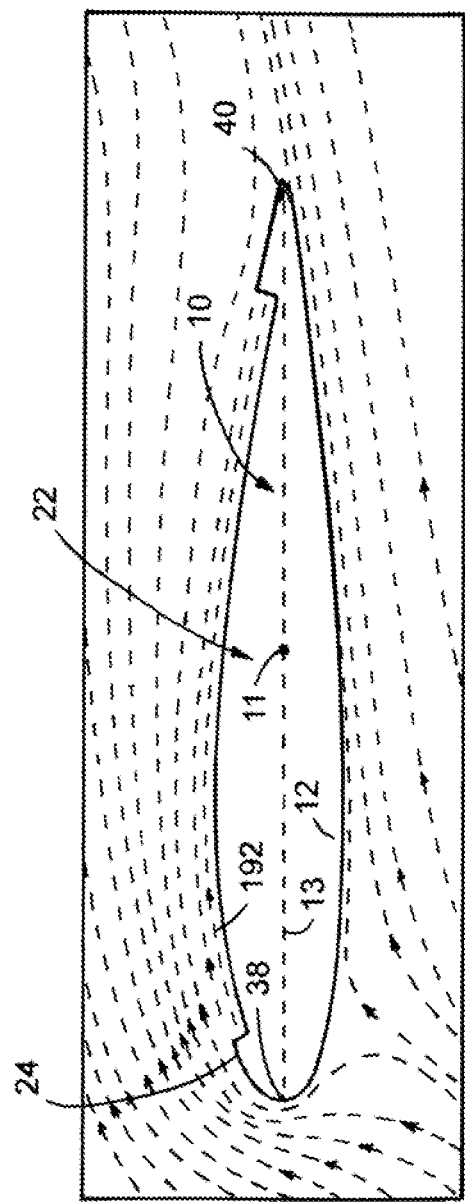
FIG. 1 is a side view of a first example fluid system subjected to a fluid flow field.

The following detailed description and the appended drawings describe and illustrate various example embodiments of fluid systems. The description and illustration of these examples are provided to enable one skilled in the art to make and use a fluid system. They are not intended to limit the scope of the claims in any manner.

As used herein, the phrase "chord length" refers to the length extending from the leading edge of an element to the trailing edge of the element. The phrase "chord length" does not limit the structural configuration of the element and can be used to describe the length of any element.

FIGS. 1, 2, 3, 4, 5, 6, and 7 illustrate a first example fluid system 10. The fluid system 10 has a lengthwise axis 11, a first body portion 12, a chord length 13, a second body portion 14, a plurality of supports 16, a plurality of fluid pressurizers 18, and a plurality of ducts 20. In the illustrated embodiment, the fluid system 10 is included on the airfoil 22 of a wing 24 of an aircraft. The lengthwise axis 11 is considered an axis that extends along the span of the wing 24.

The first body portion 12, the second body portion 14, and the plurality of supports 16 can have any suitable structural configuration and selection of a suitable structural configuration can be based on various considerations, including the intended use of a fluid system. Examples of suitable structural configurations for a first body portion, a second body portion, a plurality of supports, and other elements, features, and/or components that can be included in a fluid system described herein include those illustrated and described in U.S. patent application Ser. No. 15/426,084 by Zha and filed on Feb. 7, 2017, which is incorporated by reference herein in its entirety, and/or U.S. patent application Ser. No. 15/255,523 by Zha and filed on Sep. 2, 2016, which is incorporated by reference herein in its entirety.

In the illustrated embodiment, the first body portion 12 has a leading edge 38, a trailing edge 40, a first intermediate edge 42, a second intermediate edge 44, a front surface 46, a rear surface 48, a bottom surface 50, and a main body 52 that defines a recess 54, an inner surface 56, and a first opening 58. The chord length 13 extends from the leading edge 38 to the trailing edge 40 along a hypothetical plane. The leading edge 38 is the portion of the first body portion 12 (e.g., the front of the first body portion 12) that interacts with fluid first when the fluid system 10 is traveling through a fluid in a forward direction (e.g., in the direction indicated by arrow 39). The trailing edge 40 is the portion of the first body portion 12 (e.g., the rear of the first body portion 12) that interacts with fluid last when the fluid system 10 is traveling through a fluid in a forward direction (e.g., in the direction indicated by arrow 39).

Figure 2:
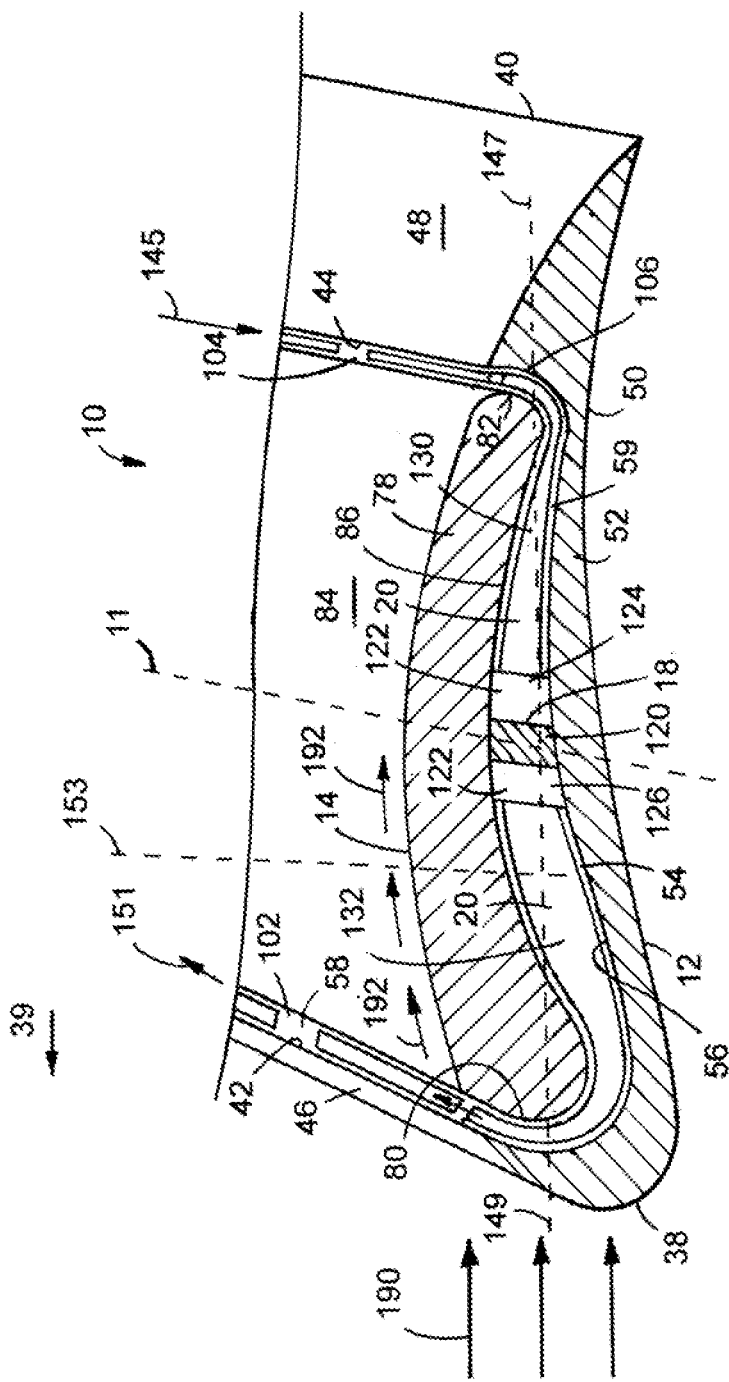
FIG. 2 is a partial perspective cross-sectional view of the fluid system illustrated in FIG. 1 taken along a plane that is orthogonal to the lengthwise axis of the fluid system.

The first intermediate edge 42 is disposed between the leading edge 38 and the trailing edge 40 and the second intermediate edge 44 is disposed between the first intermediate edge 42 and the trailing edge 40. The first intermediate edge 42 and the second intermediate edge 44 define the first opening 58. The front surface 46 extends from the leading edge 38 toward the trailing edge 40 to the first intermediate edge 42 and curves away from the chord length 13. The rear surface 48 extends from the second intermediate edge 44 away from the leading edge 38 to the trailing edge 40 and curves toward the chord length 13. The bottom surface 50 extends from the leading edge 38 to the trailing edge 40 and extends toward the chord length 13 along a first portion of the bottom surface 50 and away from the chord length 13 along a second portion of the bottom surface 50, as shown in FIG. 2. Alternative embodiments, however, can include a front surface, a rear surface, and a bottom surface that has any suitable structural configuration.

The recess 54 extends into the main body 52 between the leading edge 38 and the trailing edge 40 (e.g., between the front surface 46 and the rear surface 48), from the first opening 58, and toward the bottom surface 50 to a recess base 59. The recess 54 is sized and configured to receive the second body portion 14 (a portion of the second body portion 14, the entirety of the second body portion 14), each pressurizer of the plurality of fluid pressurizers 18, and each duct of the plurality of ducts 20, as described in more detail herein. The recess 54 has a first width between the first intermediate edge 42 and the second intermediate edge 44 and a second width between the first opening 58 and the recess base 59. The first width is measured along a first hypothetical line that extends from the first intermediate edge 42 to the second intermediate edge 44 and on a plane that is orthogonal to the lengthwise axis 11. The second width is measured along a second hypothetical line that is different than, and disposed parallel to, the first hypothetical line and extends across the recess 54. The second width is greater than the first width. However, alternative embodiments can include a recess that has any suitable first width and/or second width, such as those that are equal, or different from one another (e.g., second width is less than a first width).

The second body portion 14 is disposed within the recess 54 defined by the first body portion 12 and has a main body 78, a front edge 80, a rear edge 82, a top surface 84, and a bottom surface 86. While the first body portion 12 and second body portion 14 have been illustrated as having a particular structural arrangement (e.g., defining the wing of an aircraft) and as being separate structures attached to one another, a first body portion and second body portion can have any suitable structural arrangement and be attached to one another using any suitable technique or method of attachment. Selection of a suitable structural arrangement for a first body portion and/or second body portion and of a suitable technique or method of attachment can be based on various considerations, such as the desired fluid flow through a channel cooperatively defined by a first body portion and second body portion. Examples of techniques and methods of attachment considered suitable between a first body portion and a second body portion include welding, fusing, using adhesives, mechanical connectors, and/or forming a first body portion and a second body portion as an integrated component such that the first body portion and the second body portion are formed as a single body portion. In the illustrated embodiment, the first body portion 12 is attached to the second body portion 14 by welding the supports 16 to each of the first body portion 12 and the second body portion 14, as described in more detail herein.

In the illustrated embodiment, the first body portion 12 and the second body portion 14 cooperatively define an injection opening 102, a suction opening 104, and a channel 106. The first intermediate edge 42 and the second body portion 14 cooperatively define the injection opening 102. The second intermediate edge 44 and the second body portion 14 cooperatively define the suction opening 104. The injection opening 102 is disposed between the leading edge 38 and the suction opening 104 and the suction opening 104 is disposed between the injection opening 102 and the trailing edge 40 such that the injection opening 102 is disposed upstream from the suction opening 104 when the fluid system 10 is traveling in a forward direction, shown by arrow 39. The channel 106 extends from the injection opening 102 to the suction opening 104 such that the injection opening 102 is in communication with the suction opening 104. During movement of the fluid system 10 in a forward direction, as shown by arrow 39, fluid exterior to the fluid system 10 flows into the channel 106 from the suction opening 104, through the channel 106, and exits at the injection opening 102.

While the channel 106 has been illustrated as having a particular structural configuration and a depth that varies along the length of the channel 106, a channel can have any suitable structural configuration and selection of a suitable structural configuration for a channel can be based on various considerations, such as the desired fluid flow through the channel. For example, the depth of a channel can be constant along a portion, or the entirety, of its length or vary along a portion, or the entirety, of its length. Examples of cross-sectional configurations considered suitable for a channel include circular cross-sectional configurations, rectangular cross-sectional configurations, oval cross-sectional configurations, hexagonal cross-sectional configurations, multi-faceted cross-sectional configurations, and any other cross-sectional configuration considered suitable for a particular embodiment.

While the injection opening 102 and the suction opening 104 have been illustrated as being disposed at particular angles relative to the chord length 13, as having particular lengths, and as being disposed at particular distances from the leading edge 38, an injection opening and a suction opening included in a fluid system can be disposed at any suitable angle relative to the chord length, can have any suitable length, and can be disposed at any suitable distance from the leading edge of a first body portion. Selection of a suitable angle to position an injection opening and/or suction opening relative to the chord length, a suitable length for an injection opening and/or suction opening, and/or a suitable distance to position an injection opening and/or suction opening from the leading edge of a first body portion can be based on various considerations, such as the desired fluid flow across, or through, a fluid system. Examples of angles considered suitable to disposed an injection opening and/or a suction opening include angles that are tangential to an upper surface, or top surface, of the structure on which a fluid system is disposed (e.g., airfoil), and any other angle considered suitable for a particular embodiment.

Each support of the plurality of supports 16 is disposed between the first body portion 12 and the second body portion 14 and has a first end 112 attached to the second body portion 14 and a second end 114 attached to the first body portion 12. Each support of the plurality of supports 16 can be attached to the first body portion 12 and the second body portion 14 using any suitable technique or method of attachment. Selection of a suitable technique or method of attachment between a support and a first body portion and/or second body portion can be based on various considerations, including the material(s) that forms the support, the first body portion, and/or the second body portion. Examples of techniques and methods of attachment considered suitable between a support and a body portion include welding, fusing, using adhesives, mechanical connectors, and/or forming the first body portion, second body portion, and each support as an integrated component. In the illustrated embodiment, each support of the plurality of supports 16 is welded to both the first body portion 12 and the second body portion 14.

While each support of the plurality of supports 16 has been illustrated as disposed at a particular location between the first body portion 12 and the second body portion 14, a support can be disposed at any suitable location between the first body portion and the second body portion of a fluid system and/or within the channel of a fluid system. Selection of a suitable position for a support can be based on various considerations, including the structural configuration between the first body portion and the second body portion. While each support of the plurality of supports 16 has been illustrated as having a particular structural configuration, a support can have any suitable structural configuration and selection of a suitable structural configuration for a support can be based on various considerations, including the desired velocity at which fluid is intended to flow through a channel. For example, a support can be formed such that it is cylindrical, cuboidal, such that it defines an airfoil oriented toward the first body portion, second body portion, leading edge, and/or trailing edge, or such that it forms a portion of a wall that defines a channel.

While the fluid system 10 has been illustrated as including a plurality of supports 16, a fluid system can include any suitable number of supports and selection of a suitable number of supports to include in a fluid system can be based on various considerations, including the desired velocity at which fluid is intended to flow through a channel defined through the fluid system. Examples of numbers of supports considered suitable to include in a fluid system include zero, one, at least one, two, a plurality, three, four, five, and any other number considered suitable for a particular embodiment. For example, alternative to including a support, or a plurality of supports, a fluid system can include a second body portion that is directly attached to a first body portion.

A fluid pressurizer included in a fluid system can comprise any suitable device, system, or component capable of pressurizing fluid and selection of a suitable fluid pressurizer can be based on various considerations, such as the structural arrangement of a channel cooperatively defined by a first body portion and second body portion. Examples of fluid pressurizers considered suitable to include in a fluid system include electric pumps, pneumatic pumps, hydraulic pumps, micro-pumps, fans, compressors, micro-compressors, vacuums, blowers, and any other fluid pressurizer considered suitable for a particular embodiment. In the illustrated embodiment, each fluid pressurizer of the plurality of fluid pressurizers 18 is a micro-compressor.

In the illustrated embodiment, each fluid pressurizer of the plurality of fluid pressurizers 18 is disposed (e.g., entirely) within the channel 106 and is in communication with a suction duct 130 and an injection duct 132, as described in more detail herein. Each fluid pressurizer 18 is moveable between an off state and an on state and comprises a pump 120, and a plurality of ports 122. In the illustrated embodiment, the plurality of ports 122 includes a suction port 124 and a discharge port 126. It is considered advantageous to include a plurality of fluid pressurizers 18 at least because the inclusion of a plurality of fluid pressurizers provides a mechanism for pressurizing fluid passing through the plurality of ducts 20 and forming one or more jets 192 as the fluid exits the injection opening 102. Each fluid pressurizer of the plurality of fluid pressurizers can be operatively connected to any suitable portion of the device, system, or component on which the fluid system is disposed to provide power to the fluid pressurizer (e.g., battery, electric motor) and to provide a mechanism for moving the fluid pressurizer between the off state and the on state (e.g., one or more switches). Alternative embodiments can include a fluid pressurizer that can vary the degree to which fluid is pressurized through the ducts to which the fluid pressurizer is attached.

Each fluid pressurizer of the plurality of fluid pressurizers 18 is attached to both the first body portion 12 and the second body portion 14 and is positioned such that the suction port 124 is directed toward a first portion of the channel 106 that extends from the suction opening 104 to the fluid pressurizer (e.g., the suction port 124 is directed toward the suction opening 104) and the discharge port 126 is directed toward a second portion of the channel 106 that extends from the injection opening 102 to the fluid pressurizer (e.g., the discharge port 126 is directed toward the injection opening 102). In the off state, each fluid pressurizer of the plurality of fluid pressurizers 18 does not draw any fluid through the ducts. In the on state, each fluid pressurizer of the plurality of fluid pressurizers 18 draws fluid through the suction opening 104 and a suction duct 130, through the fluid pressurizer, and pushes fluid out of an injection duct 132 and the injection opening 102.

A fluid pressurizer can be attached to a first body portion and/or second body portion using any suitable technique or method of attachment and selection of a suitable technique or method of attachment between a fluid pressurizer and a first body portion and/or second body portion can be based on various considerations, including the material(s) that forms the fluid pressurizer, the first body portion, and/or the second body portion. Examples of techniques and methods of attachment considered suitable include welding, fusing, using adhesives, mechanical connectors, and any other technique or method considered suitable for a particular embodiment. In the illustrated embodiment, each fluid pressurizer of the plurality of fluid pressurizers 18 is fastened to the first body portion 12 and the second body portion 14 using mechanical connectors (e.g., screws, bolts). Alternative embodiments, however, can include one or more fluid pressurizers that are only attached to a first body portion or a second body portion.

In the illustrated embodiment, the plurality of ducts 20 includes a set of suction ducts 130 and a set of injection ducts 132. Each duct of the plurality of ducts 20 is attached to a port of the fluid pressurizer 18, is entirely disposed within the channel 106, and, as best shown in FIGS. 4, 5, and 6, has a first end 134, a second end 136, a first portion 138, a second portion 140, and a main body 142 that defines a first opening 144 at the first end 134, a second opening 146 at the second end 136, a passageway 148 that extends from the first opening 144 to the second opening 146, and a curve 150 between the first end 134 and the second end 136. Each of the suction ducts 130 is attached to the suction port 124 of a fluid pressurizer of the plurality of fluid pressurizers 18 and extends from the fluid pressurizer toward the suction opening 104. Each of the injection ducts 132 is attached to the discharge port 126 of a fluid pressurizer of the plurality of fluid pressurizers 18 and extends from the fluid pressurizer toward the injection opening 102. The first portion 138 extends from the first end 134 toward the second end 136 and the second portion 140 extends from the second end 136 toward the first end 134. The first portion 138 is disposed at an angle 131 relative to the second portion 140 that is less than 90 degrees. However, other angles can be utilized, such as angles that are between about 80 degrees and about 100 degrees, between about 70 degrees and about 110 degrees, between about 45 degrees and about 80 degrees, between about 60 degrees and about 120 degrees, between about 0 degrees and about 180 degrees, angles less than about 130 degrees, angles less than about 120 degrees, angles less than about 110 degrees, angles less than about 100 degrees, angles greater than, equal to, or about 130 degrees, and any other angle considered suitable for a particular embodiment.

Each duct of the plurality of ducts 20 is attached to both the first body portion 12 and the second body portion 14. A duct can be attached to a first body portion and/or second body portion using any suitable technique or method of attachment and selection of a suitable technique or method of attachment between a duct and a first body portion and/or second body portion can be based on various considerations, including the material(s) that forms duct, the first body portion, and/or the second body portion. Examples of techniques and methods of attachment considered suitable include welding, fusing, using adhesives, mechanical connectors, and any other technique or method considered suitable for a particular embodiment. In the illustrated embodiment, each duct of the plurality of ducts 20 is fastened to the first body portion 12 and the second body portion 14 using mechanical connectors (e.g., screws, bolts). Alternative embodiments, however, can include one or more ducts that are only attached to a first body portion or a second body portion.

The first opening 144 has a first opening length 133, a first opening height 135, and a first opening cross-sectional area and the second opening 146 has a second opening length 137, a second opening height 139, and a second opening cross-sectional area that is less than the first opening cross-sectional area. The first opening length 133 is equal to the first opening height 135, less than the second opening length 137, and greater than the second opening height 139. The second opening height 139 is less than the second opening length 137, less than the first opening length 133, and less than the first opening height 135. The second opening height 139 is equal to between about 0.01% and about 100% of the first opening height 135. The second opening length 137 is equal to between about 10% of the first opening length 133 and about 10 times the first opening length 133. The term "about" allowing for a 10% variation in listed value.

Alternative embodiments, however, can include a second opening that has a second opening height that is about 2% of a first opening height, about 10% of a first opening height, between about 2% and about 10% of a first opening height, between about 2% and about 50% of a first opening height, a second opening length that is about 10% of a first opening length, between about 50% and about 5 times a first opening length, between about 100% and about 2 times a first opening length, and any other height and/or length considered suitable for a particular embodiment. The second opening cross-sectional area can be equal to any suitable value, such as equal to between about 10% and about 100% of the first opening cross-sectional area, between about 0.01% and about 10% of the first opening cross-sectional area, between about 0.01% and 200% of the first opening cross-sectional area, and any other suitable value. In the illustrated embodiment, the length of the passageway 148 increases from the first end 124 to the second end 126 and the height of the passageway 148 decreases from the first end 124 to the second end 126. In the illustrated embodiment, the first opening 144 is centered relative to the second opening 146 such that the center of the first opening 144 is disposed on a plane 155 that extends through the entire passageway 148 and contains the center of the second opening 146. Alternative embodiments, however, can include a first opening that is offset relative to the center of a second opening such that the center of the first opening is disposed on a first plane that extends through the passageway and is disposed parallel to a second plane that contains the center of the second opening and extends through the passageway.

As shown in FIGS. 4, 5, and 6, the first opening 134 has a first structural configuration and the second opening 136 has a second structural configuration that is different than the first structural configuration. As shown best in FIG. 4, the first opening 134 is circular and the second opening 136 is rectangular such that the cross-sectional configuration of the passageway 148 transitions from the first end 134 to the second end 136. While the first opening 134 has been illustrated as being circular and the second opening 136 has been illustrated as being rectangular, a first opening and a second opening of a duct can have any suitable structural configuration relative to one another. Selection of a suitable structural configuration for a first opening and a second opening of a duct can be based on various considerations, including the intended use of the fluid system. Examples of structural configurations considered suitable for a first opening and/or a second opening of a duct include those that are the same, those that are different from one another, rectangular, square, circular, oval, elliptical, and/or any other structural arrangement considered suitable for a particular embodiment.

Figure 3:
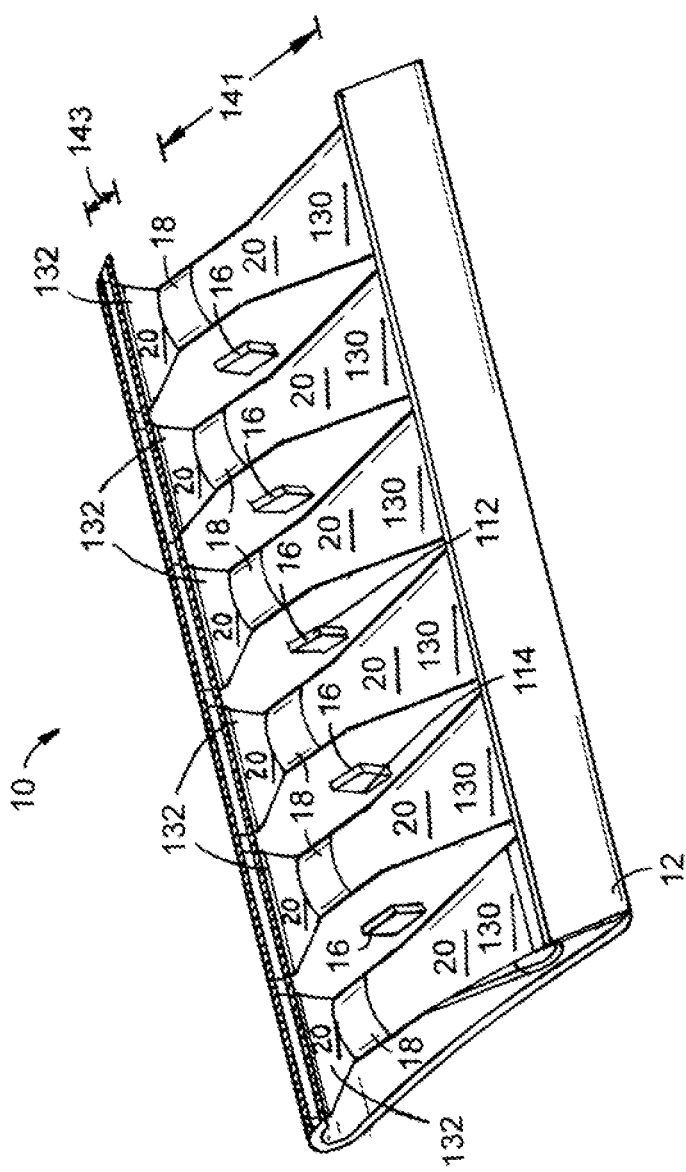
FIG. 3 is a partial perspective view of a first body portion, a plurality of supports, a plurality of fluid pressurizers, and a plurality of ducts included in the fluid system illustrated in FIG. 1.

As shown in FIG. 3, each duct in the set of suction ducts 130 has a length 141 that extends from the first end 134 to the curve 150 and that is greater than the length 143 of each duct in the set of injection ducts 132 that extends from the first end 134 to the curve 150. Each duct in the set of suction ducts 130 is configured to allow a fluid to pass through the passageway 148 from the second opening 146 to the first opening 144 such that the fluid enters the passageway 148 at the second end 136 at an angle 145, as shown in FIG. 2, that is directed toward a plane 147 that extends through the first opening 144 and a portion of the passageway 148 that extends from the first opening 144 toward the second opening 146. In the illustrated embodiment, the suction ducts 130 are sized and configured to prevent fluid from traveling through channel 106 (e.g., such that fluid can only pass through suction ducts 130 to the fluid pressurizers). Each duct in the set of injection ducts 132 has a lengthwise axis 149 that extends through the first opening 144 and the first portion 138. Each duct in the set of injection ducts 132 is configured to allow a fluid to pass through the passageway 148 from the first opening 144 to the second opening 146 such that the fluid exits the passageway 148 at the second end 146 at an angle 151, as shown in FIG. 2, that is directed toward a plane 153 that is orthogonal to the lengthwise axis 149 and away from the second end 136 and the leading edge 38.

While the plurality of ducts 20 has been illustrated as separate members attached to the first and second body portions 12, 14, a duct can be attached to a first body portion and/or second body portion using any suitable technique or method of attachment. Selection of a suitable technique or method of attachment between a duct and a first body portion and/or a second body portion can be based on various considerations, such as the desired fluid flow through a duct. Examples of techniques and methods of attachment considered suitable between a duct and a first body portion and/or a second body portion include welding, fusing, using adhesives, mechanical connectors, and/or forming a duct as an integrated component of a first body portion and/or a second body portion. In the illustrated embodiment, each duct of the plurality of ducts 20 is attached to the first body portion 12 and the second body portion 14 by welding the ducts to each of the first body portion 12 and the second body portion 14.

While the fluid system 10 has been illustrated as including a plurality of fluid pressurizers 18 having a particular structural arrangement and a plurality of ducts 20 having a particular structural arrangement, a fluid system can include any suitable number of fluid pressurizers and ducts having any suitable structural arrangement. Selection of a suitable number of fluid pressurizers and/or ducts to include in a fluid system can be based on various considerations, including the intended use of the fluid system. Examples of numbers of fluid pressurizers considered suitable to include in a fluid system include zero, one, at least one, two, a plurality, three, four, five, more than five, more than ten, and any other number considered suitable for a particular embodiment. Examples of numbers of ducts considered suitable to include in a fluid system include zero, one, at least one, two, a plurality, three, four, five, more than five, more than ten, one for each fluid pressurizer, two for each fluid pressurizer, a suction duct and an injection duct for one or more fluid pressurizers, or each fluid pressurizer, and any other number considered suitable for a particular embodiment. For example, a fluid system can include one or more injection ducts and omit the inclusion of any suctions ducts, or vice versa, or the type of duct included in the fluid system could alternate along the length of the fluid system. With respect to the structural arrangement of a duct, alternative embodiments can include a duct that defines a bend, or another feature, to position a first portion of a duct at an angle relative to a second portion of a duct. While the fluid system 10 has been illustrated as including a plurality of ducts 20 that are entirely disposed within the channel 106, a fluid system can include any suitable number of ducts having any suitable portion disposed within a channel. Selection of a suitable position to locate a duct can be based on various considerations, including the desired fluid flow through a fluid system. Examples of suitable positions to locate a duct include those in which the entire duct is positioned within a channel, a portion of a duct is positioned within a channel (e.g., the second end is disposed in an environment exterior to a channel), and any other position considered suitable for a particular embodiment. While each duct of the plurality of ducts 20 has been illustrated as being included in fluid system 10, a duct, as described herein, can be included in any suitable system, or provided separately, and used for any suitable purpose.

As shown in FIGS. 1 and 2, the fluid flow 190 interacts with the fluid system 10 such that the fluid, which in this example is air, travels around, and through, the fluid system 10. The fluid travels into the suction opening 104, through the set of suction ducts 130, is pressurized by the plurality of fluid pressurizers 18, travels through the set of injection ducts 132, exits at the injection opening 102, and is injected into the fluid flow as a plurality of jets 192 over the top surface 84 of the second body portion 14. Depending on the number of ducts, fluid pressurizers, and/or channels included in a fluid system, alternative embodiments can form a single jet over the top surface of the second body portion. In the illustrated embodiment, the plurality of jets 192 of fluid is substantially tangential to the top surface 84 of the second body portion 14 downstream of the injection opening 102. The one or more jets 192 are co-flow jets in that they form a stream of fluid that is injected into a separate fluid, or fluid flow. However, alternative embodiments can include one or more jets that are not tangential to the top surface of a second body portion.

The first body portion 12, the second body portion 14, the plurality of supports 16, the plurality of fluid pressurizers 18, the plurality of ducts 20, and any other feature, element, or component described herein and included in the fluid system 10 can be formed of any suitable material and manufactured using any suitable technique. Selection of a suitable material to form a first body portion, a second body portion, a plurality of fluid pressurizers, a plurality of ducts, and any other feature, element, or component described herein and included in a fluid system and a suitable technique to manufacture a first body portion, a second body portion, a plurality of supports, a plurality of fluid pressurizers, a plurality of ducts, and any other feature, element, or component described herein and included in a fluid system can be based on various considerations, including the intended use of the fluid system. Examples of materials considered suitable to form a first body portion, a second body portion, a plurality of supports, a plurality of fluid pressurizers, a plurality of ducts, and/or any other feature, element, or component described herein include conventional materials, metals, steel, aluminum, alloys, plastics, combinations of metals and plastics, composite materials, and any other material considered suitable for a particular embodiment.

Examples of methods of manufacture considered suitable to manufacture a first body portion, a second body portion, a plurality of supports, a plurality of fluid pressurizers, a plurality of ducts, and/or any other feature, element, or component described herein include convention methods and techniques, injection molding, machining, 3D printing, and/or any other method or technique considered suitable for a particular embodiment. For example, a first body portion and second body portion of a fluid system can be formed of a first material and each duct included in the fluid system can be formed of a second material that is different than the first material.

While the first body portion 12, the second body portion 14, the plurality of supports 16, the plurality of fluid pressurizers 18, and the plurality of ducts 20, and any other feature, element, or component described herein and included in the fluid system 10 has been illustrated as having a particular structural configuration, a first body portion, a second body portion, a plurality of supports, a plurality of fluid pressurizers, a plurality of ducts, and any other feature, element, or component described herein and included in a fluid system can have any suitable structural arrangement. Selection of a suitable structural arrangement for a first body portion, a second body portion, a plurality of supports, a plurality of fluid pressurizers, a plurality of ducts, and any other feature, element, or component described herein and included in a fluid system can be based on various considerations, including the intended use of the fluid system.

The embodiments described herein are considered advantageous for use in any type of system, device, or component used to accomplish flight, including subsonic (e.g., less than about Mach 0.7), transonic flights (e.g., between about Mach 0.6 and about 0.95), and/or supersonic flights (e.g., greater than Mach 1.0). When included on aircraft that will be completing transonic flights, or on aircrafts in which a shock wave may be created on the upper surface of the airfoil, an injection opening and/or suction opening can be disposed between a leading edge and a trailing edge, upstream or downstream from where a shock wave may be created, or between the trailing edge and where the shock wave may be created.

FIGS. 8, 9, 10, 11, and 12 illustrate another example duct 220 that can be included in a fluid system, such as the fluid systems described herein. The duct 220 (e.g., injection duct, suction duct) is similar to the duct 20 illustrated in FIGS. 2, 3, 4, 5, 6, and 7 and described above, except as detailed below. The duct 220 has a first end 234, a second end 236, a first portion 238, a second portion 240, and a main body 242 that defines a first opening 244 at the first end 234, a second opening 246 at the second end 236, a passageway 248 that extends from the first opening 244 to the second opening 246, and a curve 250 between the first end 234 and the second end 236.

In the illustrated embodiment, the duct includes a center body 252 attached to the inner surface of the main body 242 of the duct 220 within the passageway 248. The center body 252 has a first end 254, a second end 256, and a main body 258 and is centered within the first opening 244 of the duct 220 (e.g., an axis that extends through the center of the first end 254 and the second end 256 of the center body 252 is coaxial with an axis that extends through the center of the first end 234, or first opening 244, of the duct 220). The center body 252 is a solid member and is attached to the inner surface of the main body 242 of the duct 220 by two supports 266 that are each attached at one end to the center body 252 and at the other end to the inner surface of the main body 242 of the duct 220. Optionally, a center body can define a passageway that extends from an opening on the first end of the center body to a second opening defined on the second end of the center body. If included, a passageway allows a portion of fluid to travel through the center body during use of a duct. A center body included in a duct can have any suitable structural arrangement and selection of a suitable structural arrangement can be based on various considerations, including the desired fluid flow through a duct. In the illustrated embodiment, the center body 252 has a duck-billed configuration such that a first end portion that extends from the first end 254 toward the second end 256 is cylindrical and a second end portion that extends from the second end 256 toward the first end 254 is trapezoidal prism. It is considered advantageous to include a center body, such as center body 252, to create unique flow paths through a duct and avoid, or minimize, flow separation.

Figure 13B:
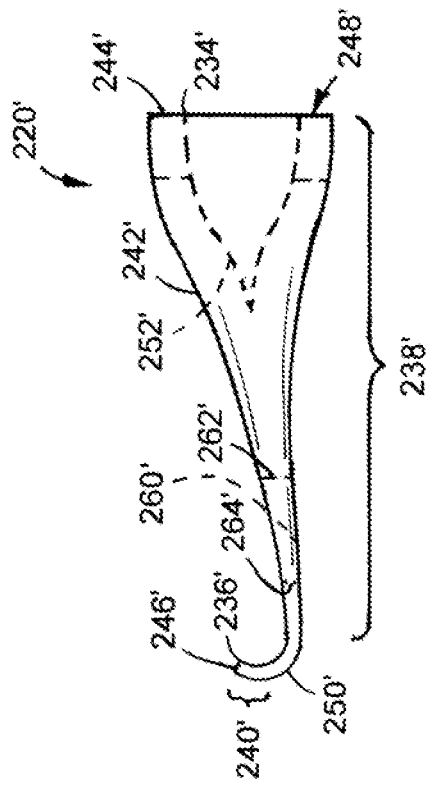
FIG. 13B is a side view of the duct illustrated in FIG. 13A.
Figure 13A:
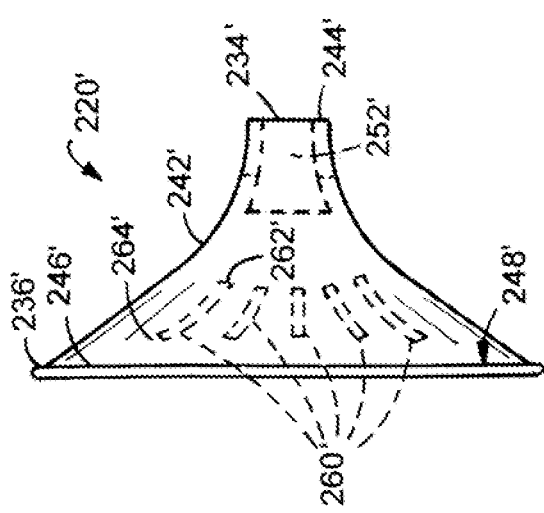
FIG. 13A is a top view of another example duct that can be included in a fluid system.

FIGS. 13A and 13B illustrate another example duct 220' that can be included in a fluid system, such as the fluid systems described herein. The duct 220' is similar to the duct 220 illustrated in FIGS. 8, 9, 10, 11, and 12 and described above, except as detailed below. The duct 220' has a first end 234', a second end 236', a first portion 238', a second portion 240', and a main body 242' that defines a first opening 244' at the first end 234', a second opening 246' at the second end 236', a passageway 248' that extends from the first opening 244' to the second opening 246', a curve 250' between the first end 234' and the second end 236', and has a center body 252'.

In the illustrated embodiment, the duct 220' includes a plurality of vanes 260' disposed within the passageway 248' and each vane is sized and configured to direct fluid flow through the passageway 248'. Each vane of the plurality of vanes 260' has a first end 262' directed toward the first end 234' (e.g., fluid flow when the duct 220' is an injection duct), a second end 264' directed toward a side of the duct 220', except the center vane, and is attached to the main body 242' using any suitable technique or method of attachment, such as those described herein. In the illustrated embodiment, the plurality of vanes 260' direct fluid flow through the passageway 248' that travels from the first end 234' to the second end 236' such that the fluid is directed toward a side of the duct 220' at the second end 264' of each vane 260', except for the center vane which is centered on the lengthwise axis of the duct 220'. The center vane, however, can be omitted, or have an orientation that is directed toward a side of a duct, depending on desired fluid flow characteristics. It is considered advantageous to include a plurality of vanes 260' at least because the vanes provide a mechanism for producing a more uniform fluid flow out of the second opening 246'. While a plurality of vanes 260' have been illustrated, any suitable number of vanes can be included in a duct, such as one, at least one, two, a plurality, three, four, five, six, seven, eight, nine, ten, more than ten, between one vane and twenty vanes, twenty vanes, more than twenty vanes, and any other number considered suitable for a particular embodiment. While some of the vanes have been illustrated as defining a curve, an embodiment can include vanes such that each vane, or most vanes, defines a curve directing flow toward a side of a duct and/or such that each vane, or most vanes, are planer or twisted in the vertical direction such that they meet the flow at a favorable angle of attack, avoid flow separation, and are attached to a main body of a duct at an angle. A vane, or a plurality of vanes, can be included on any suitable duct, such as those described herein.

Figure 15:
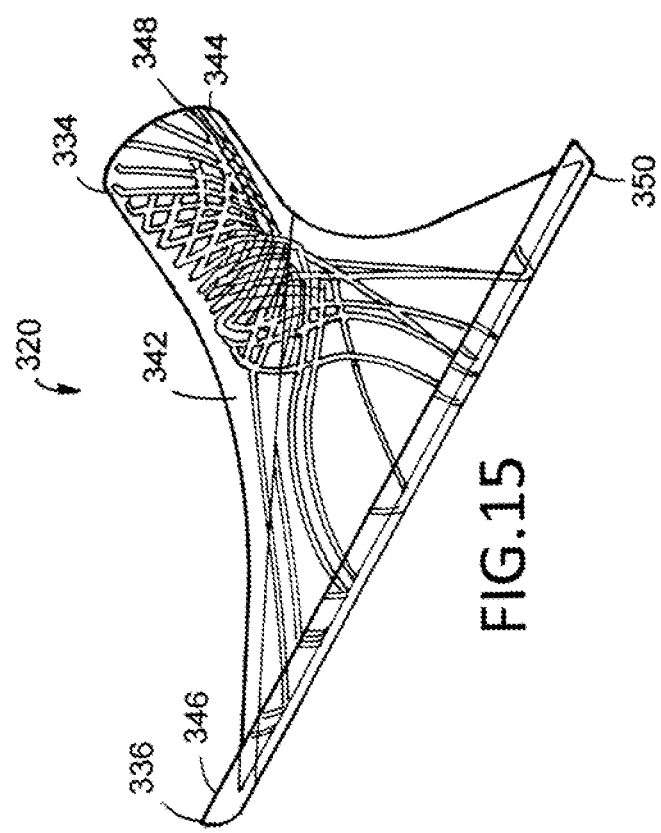
FIG. 15 is a perspective view of the duct illustrated in FIG. 14 subjected to a fluid flow field.
Figure 14:
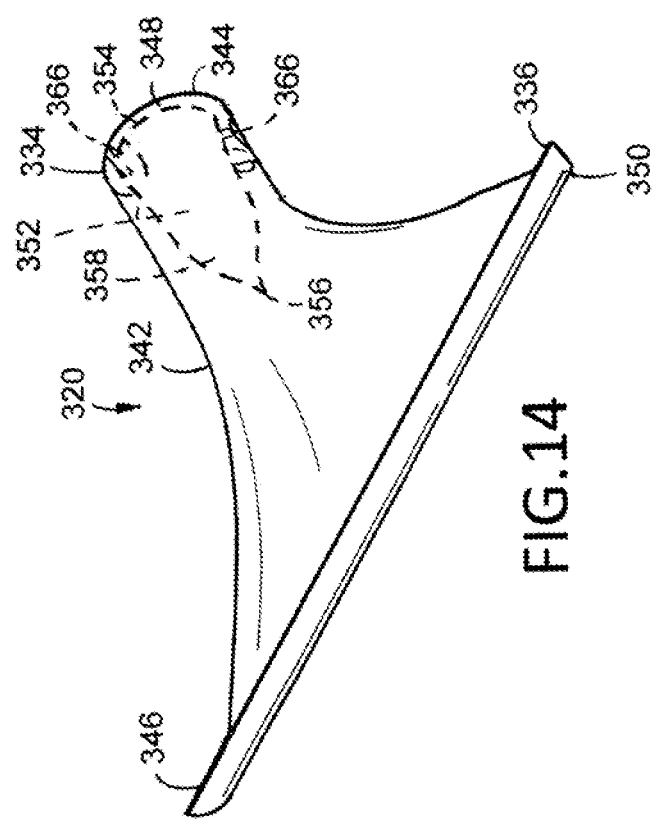
FIG. 14 is a perspective view of another example duct that can be included in a fluid system.

FIGS. 14 and 15 illustrate another example duct 320 that can be included in a fluid system, such as the fluid systems described herein. The duct 320 is similar to the duct 20 illustrated in FIGS. 8, 9, 10, 11, and 12 and described above, except as detailed below. The duct 320 has a first end 334, a second end 336, and a main body 342 that defines a first opening 344 at the first end 334, a second opening 346 at the second end 336, a passageway 348 that extends from the first opening 344 to the second opening 346, a curve 350 between the first end 334 and the second end 336, and a center body 352.

In the illustrated embodiment, the center body 352 is attached to the inner surface of the main body 342 of the duct 320. The center body 352 has a first end 354, a second end 356, and a main body 358 and is centered within the first opening 344 of the duct 320 (e.g., an axis that extends through the center of the first end 354 and the second end 356 of the center body 352 is coaxial with an axis that extends through the center of the first end 334 of the duct 320). The center body 352 is attached to the inner surface of the main body 342 of the duct 320 by two supports 366 that are each attached at one end to the center body 352 and at the other end to the inner surface of the main body 342 of the duct 320. A center body included in a duct can have any suitable structural arrangement and selection of a suitable structural arrangement can be based on various considerations, including the desired fluid flow through a duct. In the illustrated embodiment, the center body 352 has a tapered funnel configuration such that a first end portion that extends from the first end 354 toward the second end 356 is cylindrical and a second end portion that extends from the second end 356 toward the first end 354 diverges and increases to the outer diameter of the first end portion. It is considered advantageous to include a center body, such as center body 352, to create unique flow paths through a duct and avoid, or minimize, flow separation.

While the center bodies 252, 252', and 352 have been illustrated as being centered within a first opening of a duct, a center body can be disposed at any suitable position within a first opening of a duct. Selection of a suitable position to locate a center body within a first opening of a duct can be based on various considerations, including the desired fluid flow around the center body. For example, a center body can be positioned within a first opening of a duct such that an axis that extends through the center of the first end and the second end of the center body is not coaxial with an axis that extends through the center of the first end of the duct (e.g., the center body is offset relative to the center of the first opening of the duct).

Figure 16:
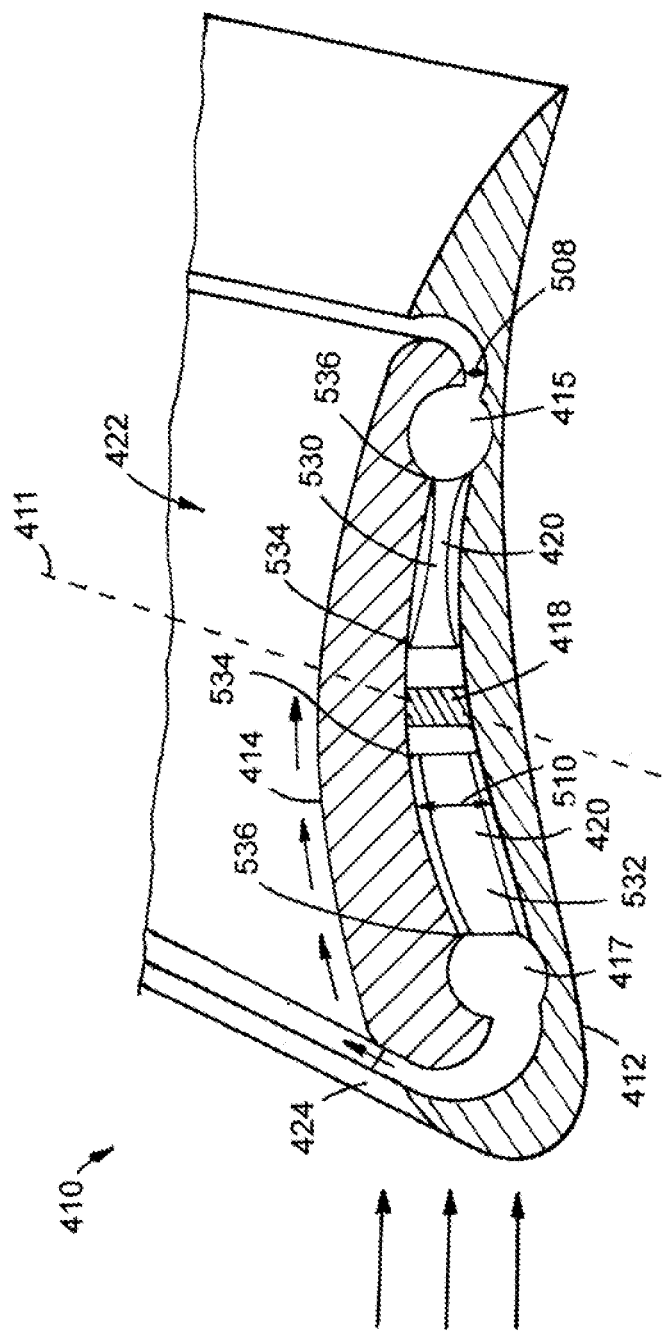
FIG. 16 is a partial perspective cross-sectional view of a second example fluid system taken along a plane that is orthogonal to the lengthwise axis of the fluid system.

FIG. 16 illustrates a second example fluid system 410. The fluid system 410 is similar to the fluid system 10 illustrated in FIGS. 1, 2, 3, 4, 5, 6, and 7 and described above, except as detailed below. The fluid system 410 has a lengthwise axis 411, a first body portion 412, a chord length, a second body portion 414, a plurality of supports, a plurality of fluid pressurizers 418, and a plurality of ducts 420. In the illustrated embodiment, the fluid system 410 is included on the airfoil 422 of a wing 424 of an aircraft.

In the illustrated embodiment, the first body portion 412 and the second body portion 414 cooperatively define a suction chamber 415 and an injection chamber 417. Each of the suction chamber 415 and the injection chamber 417 extends along the length of the first body portion 412 and the second body portion 414 and have depths that are greater than a first depth 508 of the channel 506 and a second depth 510 of the channel 506. Each suction duct 530 extends from a fluid pressurizer 418 to the suction chamber 415 and each injection duct 532 extends from a fluid pressurizer 418 to the injection chamber 417. Each duct of the plurality of ducts 420 omits a curve (e.g., curve 150) and tapers from the first end 534 to the second end 536.

The inclusion of a suction chamber 415 and an injection chamber 417 is considered advantageous at least because it provides a mechanism for multiple fluid pressurizers to be in communication with the same chamber such that an increase in mass flow rate can be achieved relative to embodiments that do not include a suction chamber and/or injection chamber.

While fluid system 410 has been illustrated as including a single suction chamber and a single injection chamber, a fluid system can include more than one suction chamber and/or injection chamber. Selection of a suitable number of suction chambers and/or injection chambers to include in a fluid system can be based on various considerations, including the desired fluid flow through a fluid system. Examples of numbers of suction chambers and/or injection chambers considered suitable to include in a fluid system include zero, one, at least one, two, a plurality, three, four, five, more than five, more than ten, and any other number considered suitable for a particular embodiment. Alternative embodiments could omit one or more suction chambers and include one or more injection chambers, or vice versa.

Figure 17:
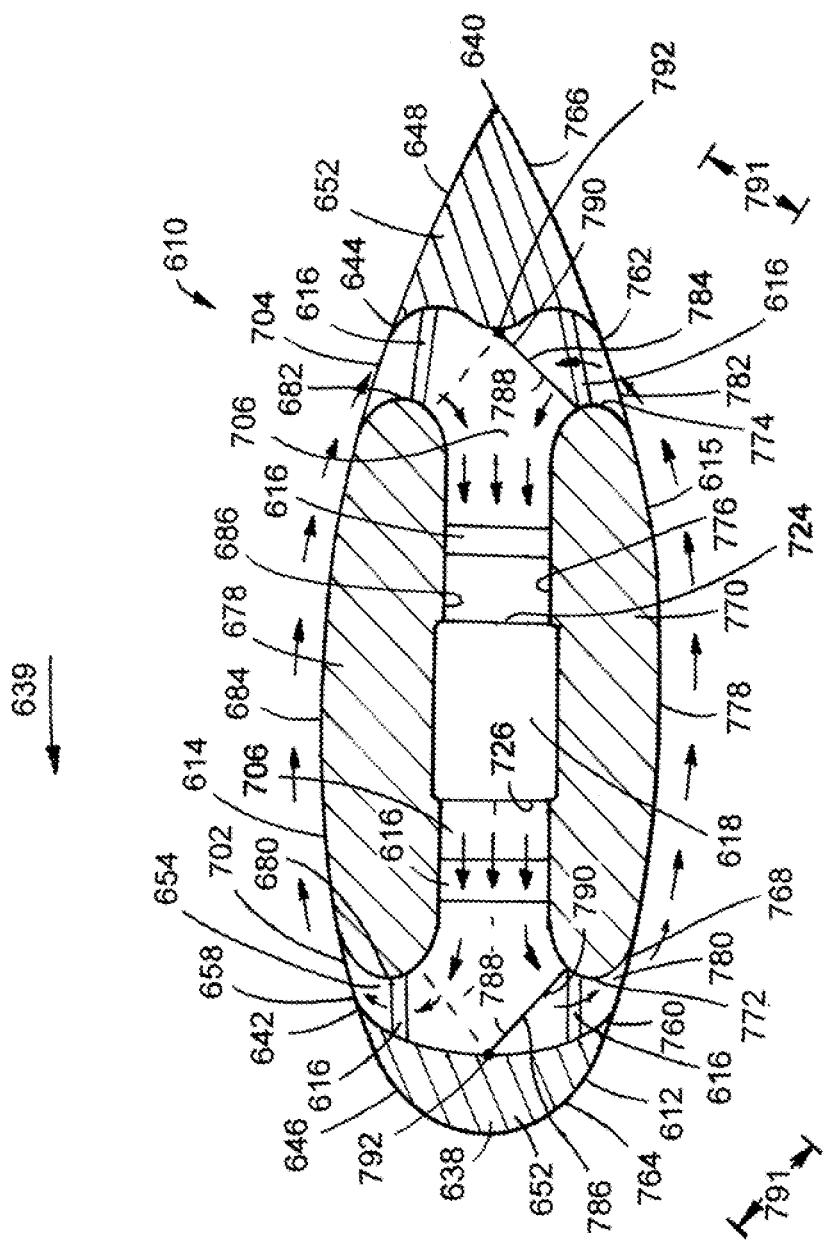
FIG. 17 is a cross-sectional view of a third example fluid system taken along a plane that is orthogonal to the lengthwise axis of the fluid system.

FIG. 17 illustrates a third example fluid system 610. The fluid system 610 is similar to the fluid system 10 illustrated in FIGS. 1, 2, 3, 4, 5, 6, and 7 and described above, except as detailed below. The fluid system 610 has a lengthwise axis, a first body portion 612, a chord length, a second body portion 614, a third body portion 615, a plurality of supports 616, a plurality of fluid pressurizers 618, a first valve 784, and a second valve 786.

In the illustrated embodiment, the first body portion 612 has a leading edge 638, a trailing edge 640, a first intermediate edge 642, a second intermediate edge 644, a third intermediate edge 760, a fourth intermediate edge 762, a first front surface 646, a first rear surface 648, a second front surface 764, a second rear surface 766, and a main body 652 that defines a passageway 654, a first opening 658, and a second opening 768.

The first intermediate edge 642 is disposed between the leading edge 638 and the trailing edge 640, the second intermediate edge 644 is disposed between the first intermediate edge 642 and the trailing edge 640, the third intermediate edge 760 is disposed between the leading edge 638 and the trailing edge 640, and the fourth intermediate edge 762 is disposed between the third intermediate edge 760 and the trailing edge 640. The first intermediate edge 642 and the second intermediate edge 644 define the first opening 658. The third intermediate edge 760 and the fourth intermediate edge 762 define the second opening 768. The first front surface 646 extends from the leading edge 638 toward the trailing edge 640 to the first intermediate edge 642 and curves away from the chord length. The first rear surface 648 extends from the second intermediate edge 644 away from the leading edge 638 to the trailing edge 640 and curves toward the chord length. The second front surface 764 extends from the leading edge 638 toward the trailing edge 640 to the third intermediate edge 760 and curves away from the chord length. The second rear surface 766 extends from the fourth intermediate edge 762 away from the leading edge 638 to the trailing edge 640 and curves toward the chord length.

The passageway 654 extends through the main body 652 between the leading edge 638 and the trailing edge 640, and from the first opening 658 to the second opening 768. The passageway 654 is sized and configured to receive the second body portion 614 (a portion of the second body portion 614, the entirety of the second body portion 614), the third body portion 615 (a portion of the third body portion 615, the entirety of the third body portion 615), and each pressurizer of the plurality of fluid pressurizers 618, as described in more detail herein. In alternative embodiments, one or more ducts can be disposed, entirely or partially, within a passageway defined by a first body portion.

The second body portion 614 is disposed within the passageway 654 defined by the first body portion 612 and has a main body 678, a front edge 680, a rear edge 682, a top surface 684, and a bottom surface 686. The third body portion 615 is disposed within the passageway 654 defined by the first body portion 612 and has a main body 770, a front edge 772, a rear edge 774, a top surface 776, and a bottom surface 778.

While the first body portion 612, the second body portion 614, and the third body portion 615 have been illustrated as having a particular structural arrangement (e.g., defining the wing of an aircraft) and as being separate structures attached to one another, a first body portion, a second body portion, and a third body portion can have any suitable structural arrangement and be attached to one another using any suitable technique or method of attachment. Selection of a suitable structural arrangement for a first body portion, a second body portion, and/or a third body portion and of a suitable technique or method of attachment can be based on various considerations, such as the desired fluid flow through a channel cooperatively defined by a first body portion, a second body portion, and a third body portion. Examples of techniques and methods of attachment considered suitable between a first body portion, a second body portion, and/or a third body portion include welding, fusing, using adhesives, mechanical connectors, and/or forming a first body portion, a second body portion, and a third body portion as an integrated component. In the illustrated embodiment, the first body portion 612 is attached to the second body portion 614 by welding the supports 616 to each of the first body portion 612 and the second body portion 614, the first body portion 612 is attached to the third body portion 615 by welding the supports 616 to each of the first body portion 612 and the third body portion 615, and the second body portion 614 is attached to the third body portion 615 by welding the supports 616 to each of the second body portion 614 and the third body portion 615. Each support of a first set of the plurality of supports 616 is disposed between, and attached to, the first body portion 612 and the second body portion 614, each support of a second set of the plurality of supports 616 is disposed between, and attached to, the first body portion 612 and the third body portion 615, and each support of a third set of the plurality of supports is disposed between, and attached to, the second body portion 614 and the third body portion 615.

In the illustrated embodiment, the first body portion 612, the second body portion 614, and the third body portion 616 cooperatively define a first injection opening 702, a second injection opening 780, a first suction opening 704, a second suction opening 782, and a channel 706. The first intermediate edge 642 and the second body portion 614 cooperatively define the first injection opening 702. The third intermediate edge 760 and the third body portion 615 cooperatively define the second injection opening 780. The second intermediate edge 644 and the second body portion 614 cooperatively define the first suction opening 704. The fourth intermediate edge 762 and the third body portion 615 cooperatively define the second suction opening 782. The first injection opening 702 is disposed between the leading edge 638 and the first suction opening 704, the second injection opening 780 is disposed between the leading edge 638 and the second suction opening 782, the first suction opening 704 is disposed between the first injection opening 702 and the trailing edge 640, and the second suction opening 782 is disposed between the second injection opening 780 and the trailing edge 640 such that the injection openings 702, 780 are disposed upstream from the suction openings 704, 782 when the fluid system 610 is traveling in a forward direction, shown by arrow 639. The channel 706 extends from the injection openings 702, 780 to the suction openings 704, 782 such that the injection openings 702, 780 are in communication with the suction openings 704, 782, as described in more detail herein. In the illustrated embodiment, each fluid pressurizer of the plurality of fluid pressurizers 618 is disposed (e.g., entirely) within the channel 706 and is in communication with the injection openings 702, 780 and the suction openings 704, 782. Each fluid pressurizer of the plurality of fluid pressurizers 618 is attached to both the second body portion 614 and the third body portion 615 and is positioned such that the suction port 724 is directed toward a first portion of the channel 606 that extends from the suction openings 704, 782 to the fluid pressurizer (e.g., the suction port 724 is directed toward the suction openings 704, 782) and the discharge port 726 is directed toward a second portion of the channel 706 that extends from the injection openings 702, 780 to the fluid pressurizer (e.g., the discharge port 726 is directed toward the injection openings 702, 780). In the off state, each fluid pressurizer of the plurality of fluid pressurizers 618 does not draw any fluid through the channel 706. In the on state, each fluid pressurizer of the plurality of fluid pressurizers 618 draws fluid through the suction openings 704, 782, through the channel 706, through the fluid pressurizer, and pushes fluid through the channel 706 and out of the injection openings 702, 780, depending on the location of the valves 784, 786, as described in more detail herein.

A fluid pressurizer can be attached to a second body portion and/or third body portion using any suitable technique or method of attachment and selection of a suitable technique or method of attachment between a fluid pressurizer and a second body portion and/or third body portion can be based on various considerations, including the material(s) that forms the fluid pressurizer, the second body portion, and/or the third body portion. Examples of techniques and methods of attachment considered suitable include welding, fusing, using adhesives, mechanical connectors, and any other technique or method considered suitable for a particular embodiment.

In the illustrated embodiment, each of the valves 784, 786 is moveably attached to the first body portion 612 within the channel 706 and has a first surface 788, a second surface 790, a thickness that extends from the first surface 788 to the second surface 790, and a length 791. Each of the valves 784, 786 has a first configuration, as shown in solid lines in FIG. 17, a second configuration, as shown in dashed lines in FIG. 17, a third configuration, and is moveable between these configurations via actuators 792. In the first configuration, each of the valves 784, 786 is disposed between, and extends from, the first body portion 612 and the third body portion 615 (e.g., completely seals the channel between the first body portion 612 and the third body portion 615), the first surface 788 is directed toward the channel 706 cooperatively defined by the first body portion 612, the second body portion 614, and the third body portion 615, and the second surface 790 is directed toward the portion of the channel 706 cooperatively defined by the first body portion 612 and the third body portion 615. In the second configuration, each of the valves 784, 786 is disposed between, and extends from, the first body portion 612 and the second body portion 614 (e.g., completely seals the channel between the first body portion 612 and the second body portion 614), the first surface 788 is directed toward the portion of the channel 706 cooperatively defined by the first body portion 612 and the second body portion 614, and the second surface 790 is directed toward the channel 706 cooperatively defined by the first body portion 612, the second body portion 614, and the third body portion 615. In the third configuration, each of the valves 784, 786 is disposed between the second body portion 614 and the third body portion 615 such that it does not seal the channel between the first body portion 612 and the second body portion 614 or the channel between the first body portion 612 and the third body portion 615 and the end of the valve is directed toward a fluid pressurizer of the plurality of fluid pressurizers 618.

Each of the actuators 792 is moveable between an off state, a first state, and a second state and comprises the various components necessary to move a valve between a first configuration, a second configuration, and a third configuration. Each of the actuators 792 can be operatively connected to any suitable portion of the device, system, or component on which the fluid system is attached to provide power to the actuator (e.g., battery, electric motor) and to provide a mechanism for moving the second actuator between the off state, the first state, and the second state (e.g., one or more switches).

In the off state, the actuators 792 position each of the valves 784, 786 such that it is in the third configuration and fluid can flow through each of the first and second injection openings 702, 780 and each of the first and second suction openings 704, 782. In the first state, the actuators 792 position each of the valves in the first configuration such that fluid can flow through each of the first injection opening 702 and the first suction opening 704 but is prevented from passing through each of the second injection opening 780 and the second suction opening 782. In the second state, each of the actuators 792 positions each of the valves in the second configuration such that fluid can flow through each of the second injection opening 780 and the second suction opening 782 but is prevented from passing through each of the first injection opening 702 and the first suction opening 704.

A valve and an actuator included in a fluid system can comprise any suitable valve and actuator and selection of a suitable valve and actuator can be based on various considerations, such as the structural arrangement of a body portion included in a fluid system on which a valve is disposed and/or the material that forms a body portion included in a fluid system. Examples of valves considered suitable to include in a fluid system include elongate plates, butterfly valves, diaphragm valves, any valve that is sized and configured to interact with a body portion to completely, or partially, seal a passageway, or channel, defined by one or more body portions, and/or any other valve considered suitable for a particular embodiment. Examples of actuators considered suitable to include in a fluid system include electric motors, pneumatic actuators, hydraulic actuators, actuators that produce rotational movement around the lengthwise axis of an attached shaft, actuators that produce axial movement of a shaft along the lengthwise axis of the shaft, linear actuators, and any other actuator considered suitable for a particular embodiment.

While each of the valves 784, 786 and actuators 792 has been illustrated as having a particular structural arrangement and as being positioned at a particular location on the fluid system, a valve and an actuator can have any suitable structural arrangement and be positioned at any suitable location on a fluid system. Selection of a suitable structural arrangement and/or position to locate a valve and an actuator can be based on various considerations, such as the desired flow around a fluid system and/or the desired flow through a channel defined through a fluid system. For example, alternative embodiments can include a valve and an actuator in each duct included in a fluid system to accomplish flow as described with respect to FIG. 17. For example, a suction duct can be attached to one or more fluid pressurizers and extend to, or near, the rear edge of the second body portion and/or the third body portion and/or an injection duct can be attached to one or more fluid pressurizers and extend to, or near, the front edge of the second body portion and/or the third body portion. Any of the embodiments described herein, such as the fluid system 610, can include any suitable component of a conventional wing of an aircraft. For example, any of the embodiments described herein, such as fluid system 610, can include a flap and/or elevator (e.g., which can be moveable relative to the first body portion) that provides enhanced lift to the wing during flight.

FIGS. 18 and 19 illustrate an example aircraft 802 that includes front landing gear 804 and rear landing gear 806. In the illustrated embodiment, each of the front landing gear 804 and the rear landing gear 806 has an adjustable length such that the length of the landing gear can be adjusted during takeoff and/or landing. It is considered advantageous to include adjustable landing gear such that a high angle of attack can be achieved during takeoff. For example, as illustrated in FIG. 19, the front landing gear 804 has a length that is greater than the length of the rear landing gear 806 such that a high angle of attack is achieved. The aircraft 802 can include any suitable fluid system, such as those described herein, to provide additional lift when desired.

Figure 20:
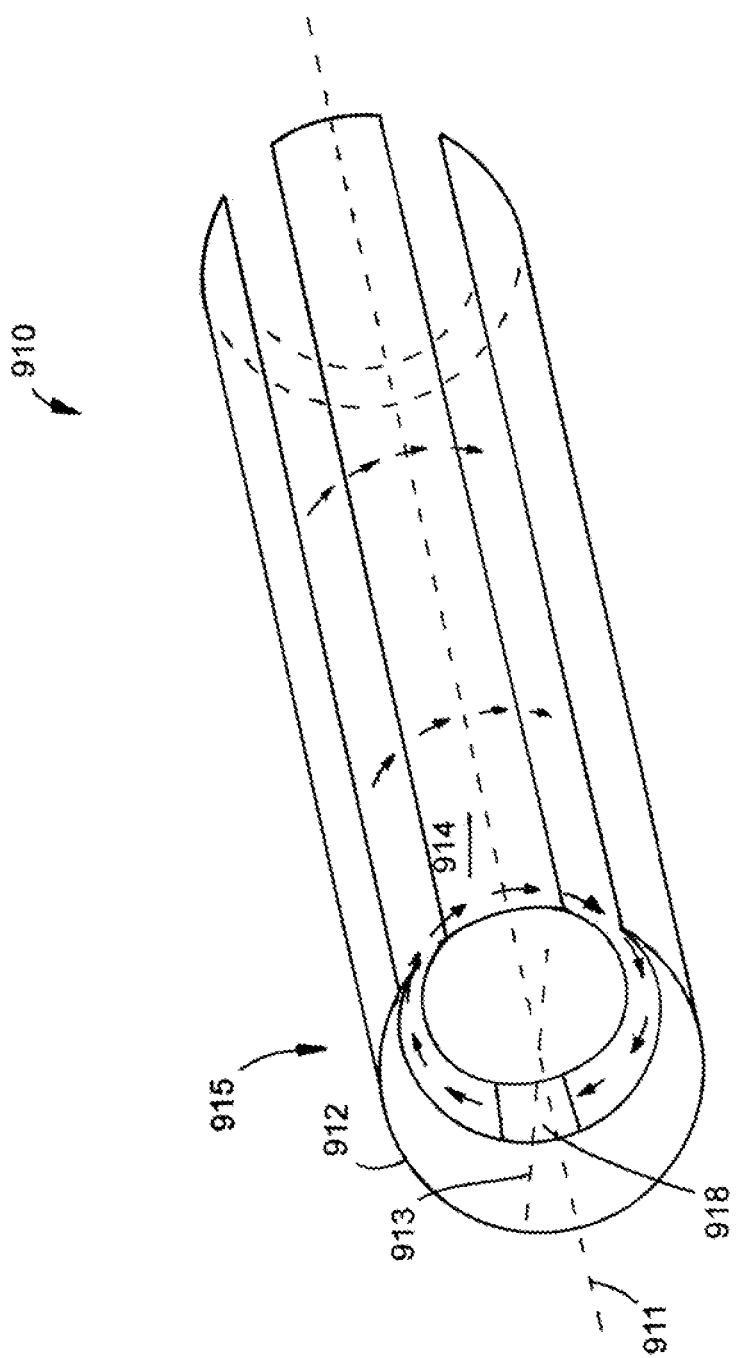
FIG. 20 is a perspective view of a fourth example fluid system.
Figure 21:
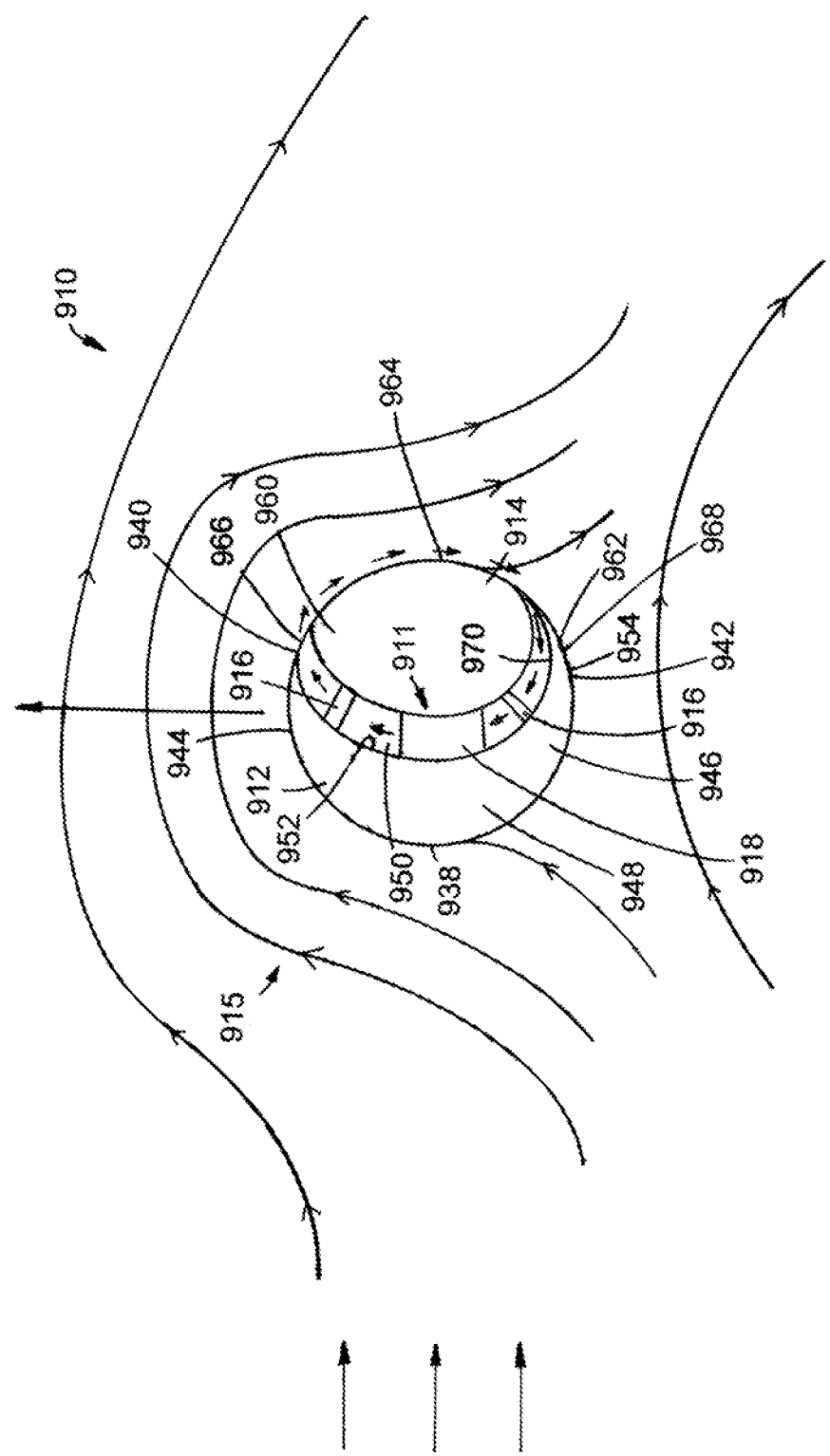
FIG. 21 is a side view of the fluid system illustrated in FIG. 20 subjected to a fluid flow field.
Figure 22:
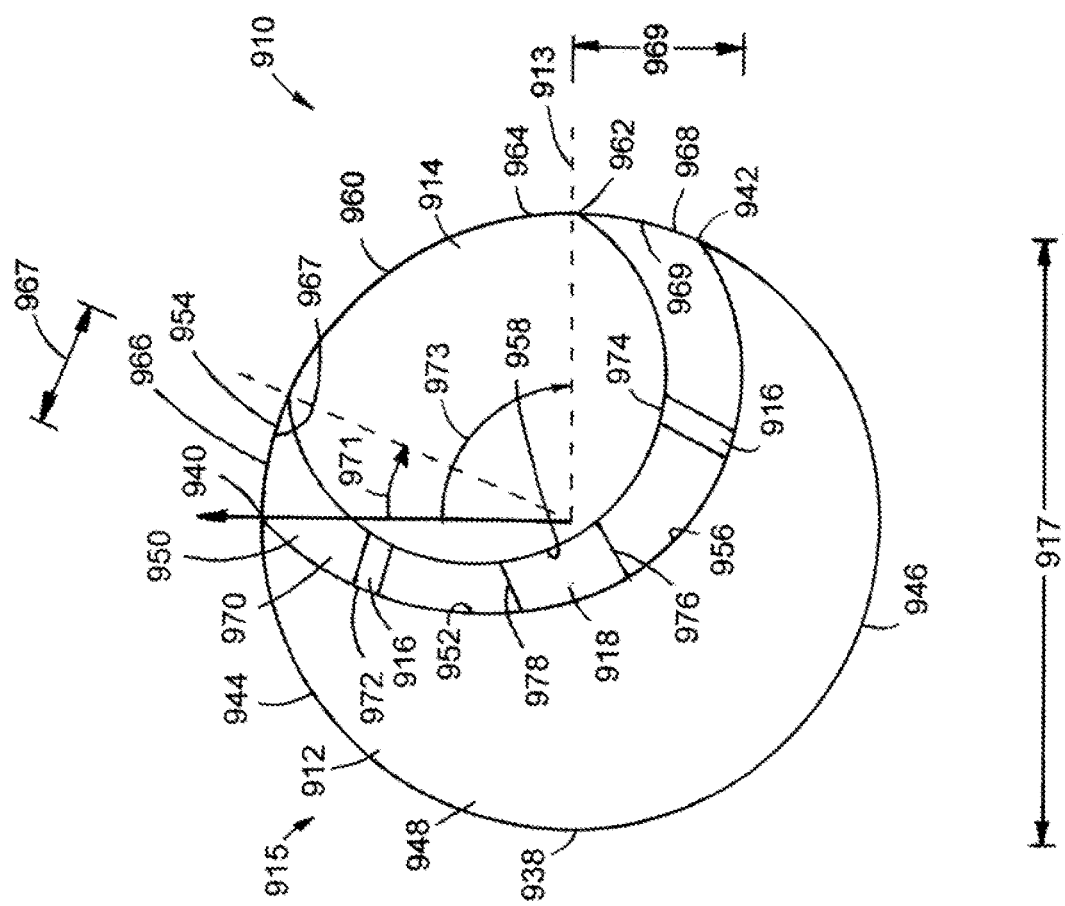
FIG. 22 is another side view of the fluid system illustrated in FIG. 20.

FIGS. 20, 21, and 22 illustrate a fourth example fluid system 910. The fluid system 910 is similar to the fluid system 10 illustrated in FIGS. 1, 2, 3, 4, 5, 6, and 7 and described above, except as detailed below. The fluid system 910 has a lengthwise axis 911, a first body portion 912, a chord length 913, a second body portion 914, a plurality of supports 916, and plurality of fluid pressurizers 918.

As shown in FIGS. 21 and 22, the first body portion 912 has a leading edge 938, a first trailing edge 940, a second trailing edge 942, a top surface 944, a bottom surface 946, and a main body 948 that defines a recess 950, an inner surface 952, and a first opening 954. The chord length 913 extends from the leading edge 938 to the center of a planar surface that extends from the first trailing edge 940 to the second trailing edge 942.

The first trailing edge 940 and the second trailing edge 942 define the first opening 954. The top surface 944 extends from the leading edge 938 to the first trailing edge 940 and curves away from the chord length 913. The bottom surface 946 extends from the leading edge 938 to the second trailing edge 942 and curves away from the chord length 913. The recess 950 extends into the main body 948 between the first trailing edge 940 and the second trailing edge 942, from the first opening 954, and toward the leading edge 938 to a recess base 956. The recess 950 is sized and configured to receive a portion of the second body portion 914 and each pressurizer of the plurality of fluid pressurizers 918, as described in more detail herein.

The second body portion 914 is partially disposed within the recess 950 defined by the first body portion 912 and has a front edge 958, a top edge 960, a bottom edge 962, and a trailing edge 964. In the illustrated embodiment, the first body portion 912 and the second body portion 914 cooperatively define a cylinder 915 that has a length 917 that extends from the leading edge 938 to the trailing edge 964. While the first body portion 912 and second body portion 914 have been illustrated as having a particular structural arrangement and as being separate structures attached to one another, a first body portion and second body portion can have any suitable structural arrangement and be attached to one another using any suitable technique or method of attachment. Selection of a suitable structural arrangement for a first body portion and/or second body portion and of a suitable technique or method of attachment can be based on various considerations, such as the desired fluid flow through a channel cooperatively defined by a first body portion and second body portion. Examples of techniques and methods of attachment considered suitable between a first body portion and a second body portion include welding, fusing, using adhesives, mechanical connectors, and/or forming a first body portion and a second body portion as an integrated component. In the illustrated embodiment, the first body portion 912 is attached to the second body portion 914 by welding the supports 916 to each of the first body portion 912 and the second body portion 914, as described in more detail herein. While the first and second body portions 912, 914 have been illustrated as cooperatively defining a cylinder, a first body portion and a second body portion can cooperatively define any suitable structure, such as elliptical prisms, airfoils, blades, such as those included on wind turbines, and any other structure considered suitable for a particular embodiment.

In the illustrated embodiment, the first body portion 912 and the second body portion 914 cooperatively define an injection opening 966, a suction opening 968, and a channel 970. The first trailing edge 940 and the second body portion 914 cooperatively define the injection opening 966. The second trailing edge 942 and the second body portion 914 cooperatively define the suction opening 968. The injection opening 966 is disposed between the leading edge 938 and the trailing edge 964 of the second body portion 914 and the suction opening 968 is disposed between the leading edge 938 and the trailing edge 964 of the second body portion 914. The injection opening 966 has an injection opening length 967 that is measured along an axis that extends from the first trailing edge 940 and is tangential to the exterior surface of the second body portion 914 (e.g., contacts the top edge 960). The suction opening 968 has a suction opening length 969 that is measured along an axis that extends from the second trailing edge 942 and is tangential to the exterior surface of the second body portion 914 (e.g., contacts the bottom edge 962). In the illustrated embodiment, each of the injection opening length 967 and suction opening length 969 is between about 0.0001% to about 30% of the length 917 of the structure cooperatively defined by the first and second body portion 912, 914. Alternatively, each of the injection opening length 967 and suction opening length 969 is between about 0.01% to about 5% of the length 917 of the structure cooperatively defined by the first and second body portion 912, 914.

The channel 970 extends from the injection opening 966 to the suction opening 968 such that the injection opening 966 is in communication with the suction opening 968. When a fluid pressurizer of the plurality of fluid pressurizers 918, or each fluid pressurizer of the plurality of fluid pressurizers 918, is in an on state, fluid exterior to the fluid system 910 flows into the channel 970 from the suction opening 968, through the channel 970, and exits at the injection opening 966.

While the channel 970 has been illustrated as having a particular structural configuration and a depth that varies along the length of the channel 970, a channel can have any suitable structural configuration and selection of a suitable structural configuration for a channel can be based on various considerations, such as the desired fluid flow through the channel. Examples of cross-sectional configurations considered suitable for a channel include circular cross-sectional configurations, rectangular cross-sectional configurations, oval cross-sectional configurations, hexagonal cross-sectional configurations, multi-faceted cross-sectional configurations, and any other cross-sectional configuration considered suitable for a particular embodiment. For example, a channel can have the same depth along a portion, or the entirety, of its length.

As shown in FIG. 22, the injection opening 966 is positioned at an angle 971 relative to a plane that is orthogonal to the chord length 913 and the suction opening 968 is positioned at an angle 973 relative to a plane that is orthogonal to the chord length 913 (e.g., relative to the direction of travel). Each angle is positive when traveling in a clockwise direction relative to the plane that is orthogonal to the chord length 913 and is negative when traveling in a counterclockwise direction relative to the plane that is orthogonal to the chord length 913. In the illustrated embodiment, the angle 971 is between about −90 degrees and about 90 degrees (e.g., the injection opening 966 is located within the first quadrant or the second quadrant of the structure cooperatively defined by the first and second body portions 912, 914) and the angle 973 is between about 90 degrees and about 270 degrees (e.g., the suction opening 968 is located within the fourth quadrant or the third quadrant of the structure cooperatively defined by the first and second body portions 912, 914).

While the injection opening 966 and the suction opening 968 have been illustrated as being disposed at particular angles relative to a plane that is orthogonal to the chord length 913 and as having particular lengths, an injection opening and a suction opening included in a fluid system can be disposed at any suitable angle relative to the chord length and can have any suitable length. Selection of a suitable angle to position an injection opening and/or suction opening relative to the chord length and a suitable length for an injection opening and/or suction opening can be based on various considerations, such as the desired fluid flow across, or through, a fluid system. For example, alternative angles that are considered suitable include angles between about 0 degrees and about 90 degrees for an injection opening, between about 0 degrees and about 20 degrees for an injection opening, angles between about 90 degrees and 180 degrees for a suction opening, angles between about 90 degrees and about 110 degrees for a suction opening, and any other angle considered suitable for a particular embodiment. Examples of alternative lengths considered suitable include lengths between about 0.001% and about 3.5% of a chord length, lengths equal to about 2.5% of a chord length, and any other length considered suitable for a particular embodiment.

Each support of the plurality of supports 916 is disposed between the first body portion 912 and the second body portion 914 and has a first end 972 attached to the first body portion 912 and a second end 974 attached to the second body portion 914.

In the illustrated embodiment, each fluid pressurizer of the plurality of fluid pressurizers 918 is a micro-compressor. Each fluid pressurizer of the plurality of fluid pressurizers 918 is disposed within the channel 970 and is in communication with the injection opening 966 and the suction opening 968, as described in more detail herein. Each fluid pressurizer 918 is moveable between an off state and an on state, as described herein. In the illustrated embodiment, each fluid pressurizer of the plurality of fluid pressurizers 918 is attached to both the first body portion 912 and the second body portion 914 and is positioned such that the suction port 976 is directed toward a first portion of the channel 970 that extends from the suction opening 968 to the fluid pressurizer (e.g., the suction port 976 is directed toward the suction opening 968) and the discharge port 978 is directed toward a second portion of the channel 970 that extends from the injection opening 966 to the fluid pressurizer (e.g., the discharge port 978 is directed toward the injection opening 966). In the off state, each fluid pressurizer of the plurality of fluid pressurizers 918 does not draw any fluid through the channel. In the on state, each fluid pressurizer of the plurality of fluid pressurizers 918 draws fluid through the suction opening 968, through the channel 970, through the fluid pressurizer, and pushes fluid out of the injection opening 966.

Figure 23:
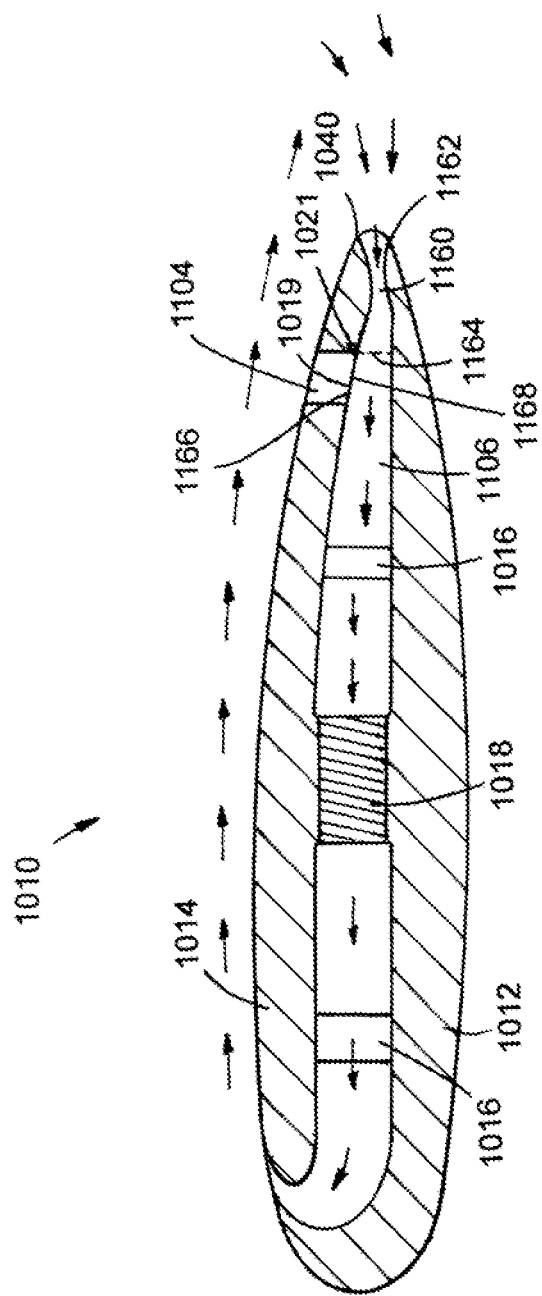
FIG. 23 is a cross-sectional view of a fifth example fluid system taken along a plane that is orthogonal to the lengthwise axis of the fluid system.

FIG. 23 illustrates a fourth example fluid system 1010. The fluid system 1010 is similar to the fluid system 10 illustrated in FIGS. 1, 2, 3, 4, 5, 6, and 7 and described above, except as detailed below. The fluid system 1010 has a lengthwise axis, a first body portion 1012, a chord length, a second body portion 1014, a plurality of supports 1016, a plurality of fluid pressurizers 1018, a valve 1019, and an actuator 1021.

In the illustrates embodiment, the first body portion 1012 defines a passageway 1160 that extends from a first opening 1162 that is defined at the trailing edge 1040 to a second opening 1164 that is defined between the suction opening 1104 and the plurality of fluid pressurizers 1018 and is in communication with the channel 1106. The passageway 1160 can have any suitable size and configuration, such as those described with respect to injection openings and/or suction openings.

In the illustrated embodiment, the valve 1019 is moveably attached to the first body portion 1012 within the channel 1106 and has a first surface 1166 and a second surface 1168. The valve 1019 has a first configuration, as shown in solid lines in FIG. 23, a second configuration, as shown in dashed lines in FIG. 23, a third configuration, and is moveable between these configurations via actuator 1021. In the first configuration, the valve 1019 is disposed between the first body portion 1012 and the second body portion 1014 (e.g., seals the channel 1106 between the first body portion 1012 and the second body portion 1014), the first surface 1166 is directed toward the suction opening 1104, and the second surface 1168 is directed toward the channel 1106 such that fluid can flow through the passageway 1160 and into the channel 1106 and fluid is prevented from flowing through the suction opening 1104 and to a fluid pressurizer. In the second configuration, the valve 1019 seals the passageway 1160 defined by the first body portion 1012, the first surface 1166 is directed toward the channel 1106, and the second surface 1168 is directed toward the passageway 1160 such that fluid can flow through the suction opening 1104 and to a fluid pressurizer and fluid is prevented from flowing through the passageway 1160 to the channel 1106. In the third configuration, the valve 1019 is disposed between the first configuration and the second configuration such that it does not seal the channel between the first body portion 1012 and the second body portion 1014 or the passageway 1160 defined by the first body portion 1012 such that fluid can flow through the suction opening 1104 to a fluid pressurizer and fluid can flow through the passageway 1160 to a fluid pressurizer. In the off state, the actuator 1021 positions the valve 1019 such that it is in the second configuration. In the first state, the actuator 1021 positions the valve 1019 in the first configuration. In the second state, the actuator 1021 positions the valve 1019 in the third configuration.

Figure 24:
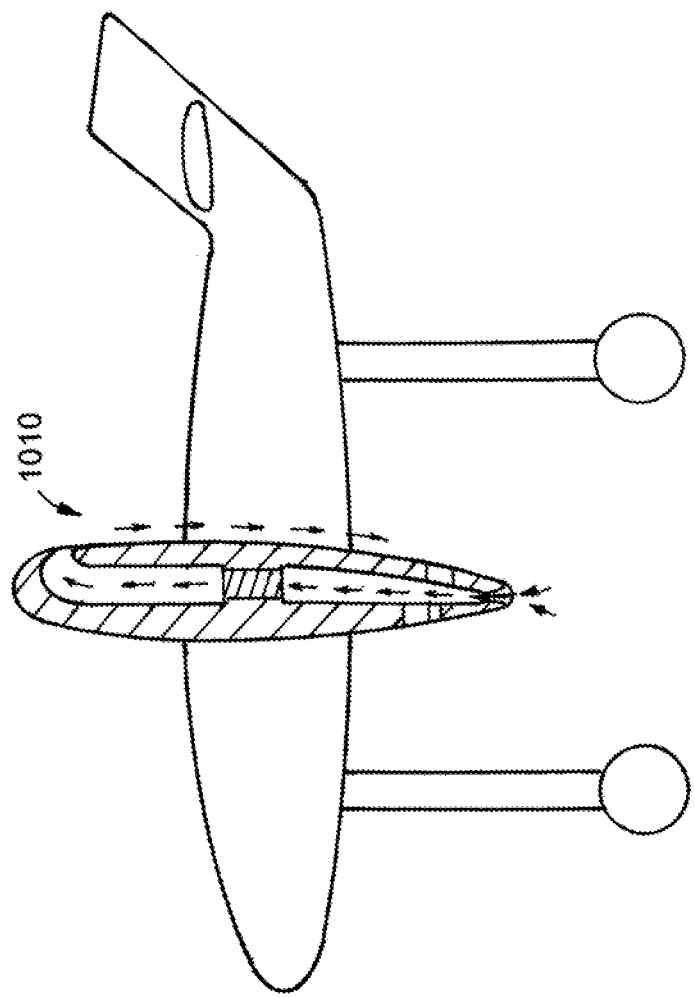
FIG. 24 is a partial cross-sectional view of the fluid system illustrated in FIG. 23 included on an example aircraft during takeoff. The landing gear is illustrated in a first configuration.

The structural arrangement illustrated in FIG. 23 is considered advantageous at least because it provides a mechanism for producing thrust when the velocity of the fluid system 1010 is close to, below, or about, the speed necessary to accomplish a takeoff. In addition, the structural arrangement illustrated in FIG. 23 is considered advantageous for vertical takeoffs. For example, each of the elements included in the fluid system 1010 can be rotated 90 degrees, or the entire wing of an aircraft on which a fluid system, such as fluid system 1010, is included can be rotated 90 degree, in the clockwise direction and utilized for a vertical takeoff and/or landing, as shown in FIG. 24. In an alternative embodiment, the opening 1162 and/or the valve 1019 can be omitted such that the system can be used for vertical takeoff and/or landing. Alternatively, any of the fluid systems described herein, such as the fluid system 10 illustrated in FIGS. 1, 2, 3, 4, 5, 6, and 7, can be used to achieve vertical takeoff and/or landing. In embodiments in which a fluid system is being utilized to achieve a vertical takeoff and/or landing, a wing, or other portion of an aircraft on which a fluid system is disposed, can be rotated relative to an axis that passes through the lengthwise axis of the aircraft, or relative to a fuselage of the aircraft, any suitable angle. When activated, the fluid system will generate a reactionary force directed upward, or vertical, relative to the lengthwise axis of the aircraft, or fuselage, resulting in lift. Examples of angles considered suitable to rotate a wing, or other portion of an aircraft, on which a fluid system is disposed relative to an axis that passes through the lengthwise axis of the aircraft, or relative to a fuselage of the aircraft, include angles equal to, greater than, less than, or about 90 degrees (e.g., such that the wing, or other portion of the aircraft, is vertical or substantially vertical), between about 90 degrees and about 135 degrees, and any other angle considered suitable for a particular embodiment.

While the valve 1019 and actuator 1021 have been illustrated as having a particular structural arrangement and as being positioned at a particular location on the fluid system, a valve and an actuator can have any suitable structural arrangement and be positioned at any suitable location on a fluid system. Selection of a suitable structural arrangement and/or position to locate a valve and an actuator can be based on various considerations, such as the desired flow around a fluid system and/or the desired flow through a channel defined through a fluid system. For example, alternative embodiments can include a valve and an actuator in each duct included in a fluid system (e.g., a suction duct can define an opening in communication with a passageway defined by a first body portion (e.g., passageway 1160)).

While fluid system 1010 has been illustrated as including only one valve 1019 and one actuator 1021, a fluid system can include any suitable number of valve and actuators to accomplish a desired fluid flow through the system. Selection of a suitable number of valves and actuators to include in a fluid system can be based on various considerations, including the intended use of a fluid system within which a valve and actuator is a component. Examples of numbers of valves and actuators considered suitable to include in a fluid system include one, at least one, two, a plurality, three, four, five, more than five, more than ten, and any other number considered suitable for a particular embodiment. For example, a fluid system can optionally include a valve that is controlled by, and connected to, an actuator that can be moved between a first configuration in which it seals the first opening of a passageway (e.g., passageway 1160) defined by a first body portion (e.g., when it is not desired for fluid to pass through the passageway (e.g., the valve 1019 is in the second configuration) and a second configuration in which it allows fluid to pass through the first opening.

While the first opening 1162 of the passageway 1160 has been illustrated as being defined on the trailing edge 1040, a first opening of a passageway can be defined at any suitable location on a first body portion. Selection of a suitable location to position a first opening of a passageway can be based on various considerations, including the desired fluid flow through a channel cooperatively defined by first and second body portions. Examples of locations considered suitable to position a first opening of a passageway include on a rear surface, which extends from a suction opening to the trailing edge, on a bottom surface, at any location on a first body portion such that the opening is directed toward the trailing edge, or toward a plane that contains the trailing edge, and any other location considered suitable for a particular embodiment.

Figure 25:
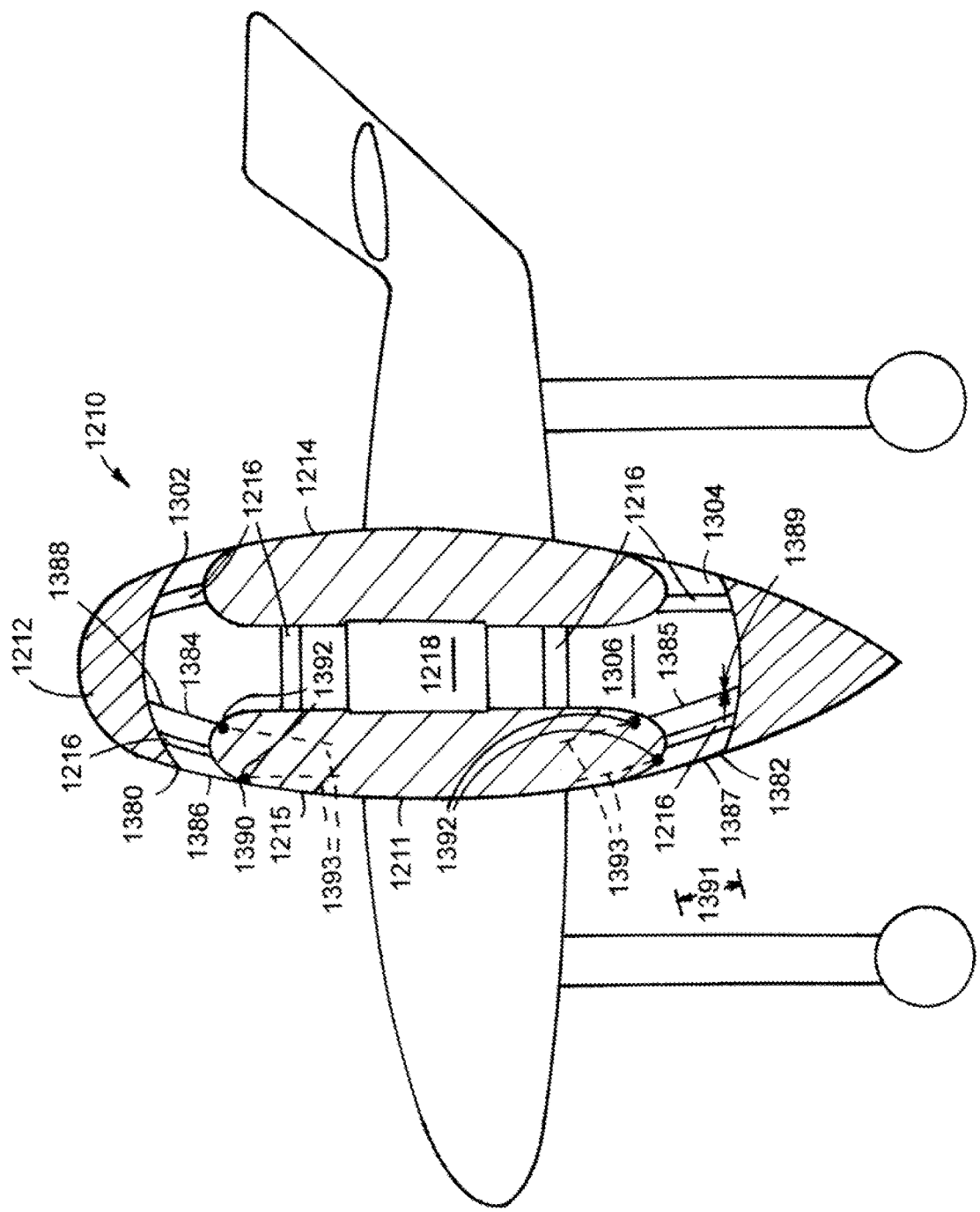
FIG. 25 is a partial cross-sectional view of a sixth example fluid system taken along a plane that is orthogonal to the lengthwise axis of the fluid system. The fluid system is included on an example aircraft during takeoff and the landing gear is illustrated in a first configuration.

FIG. 25 illustrates a sixth example fluid system 1210. The fluid system 1210 is similar to the fluid system 610 illustrated in FIG. 17 and described above, except as detailed below. The fluid system 1210 has a lengthwise axis, a first body portion 1212, a chord length, a second body portion 1214, a third body portion 1215, a plurality of supports 1216, a plurality of fluid pressurizers 1218, a first valve 1384, a second valve 1385, a third valve 1386, and a fourth valve 1387.

In the illustrated embodiment, the first body portion 1212, the second body portion 1214, and the third body portion 1215 cooperatively define a first injection opening 1302, a second injection opening 1380, a first suction opening 1304, a second suction opening 1382, and a channel 1306. The channel 1306 extends from the injection openings 1302, 1380 to the suction openings 1304, 1382 such that the injection openings 1302, 1380 are in communication with the suction openings 1304, 1382, as described in more detail herein.

In the illustrated embodiment, each of the valves 1384, 1385, 1386, 1387 is moveably attached to the third body portion 1215 within the channel 1306 and has a first surface 1388, a second surface 1390, a thickness 1389 that extends from the first surface 1388 to the second surface 1390, and a length 1391. Each of the valves 1384, 1385, 1386, 1387 has a first configuration, as shown in dashed lines in FIG. 25, a second configuration, as shown in solid lines in FIG. 25, a third configuration, and is moveable between these configurations via an actuator 1392 in communication with the valve. In the first configuration, the valve is disposed within a recess 1393 defined by the third body portion 1215 such that each of the valves 1384, 1385, 1386, 1387 is free from the channel 1306 and does not obstruct any fluid passing through the channel 1306. In the second configuration, the valve is disposed between the first body portion 1212 and the third body portion 1215 (e.g., completely seals the channel between the first body portion 1212 and the third body portion 1215). In the second configuration, the first surface 1388 of the first valve 1384 and the second valve 1385 is directed toward the channel 1306 cooperatively defined by the first body portion 1212, the second body portion 1214, and the third body portion 1215, and the second surface 1390 is directed toward the portion of the channel 1306 cooperatively defined by the first body portion 1212 and the third body portion 1215. In the second configuration, the first surface 1388 of the third valve 1386 and the fourth valve 1387 is directed toward the channel 1306 cooperatively defined by the first body portion 1212 and the third body portion 1215 and the second surface 1390 is directed toward an environment exterior to the channel 1306. In the third configuration, the valve is disposed between the first position and the second position such that a portion of the valve is disposed within the channel 1306.

Each of the actuators 1392 is moveable between an off state, a first state, and a second state and comprises the various components necessary to move a valve between a first configuration, a second configuration, and a third configuration. Each of the actuators 1392 can be operatively connected to any suitable portion of the device, system, or component on which the fluid system is attached to provide power to the actuator (e.g., battery, electric motor) and to provide a mechanism for moving the second actuator between the off state, the first state, and the second state (e.g., one or more switches).

Figure 26:
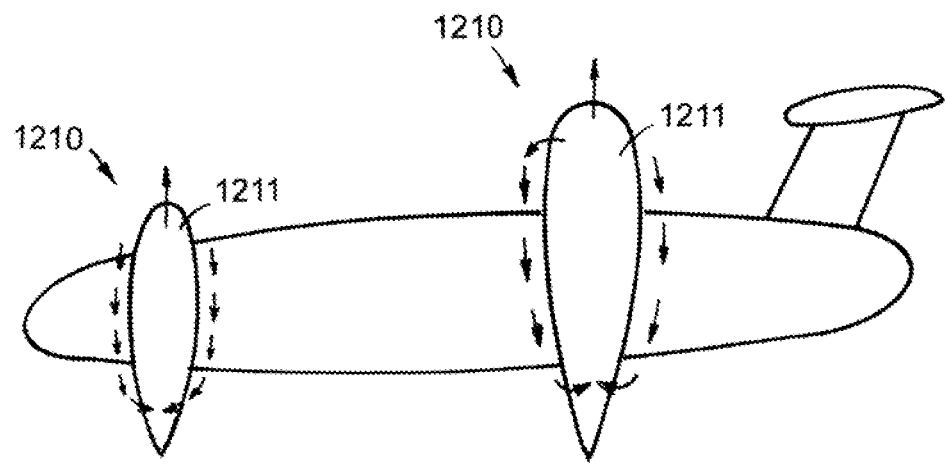
FIG. 26 is a side view of the fluid system illustrated in FIG. 25 included on another example aircraft during takeoff. The landing gear is illustrated in a second configuration.
Figure 27:
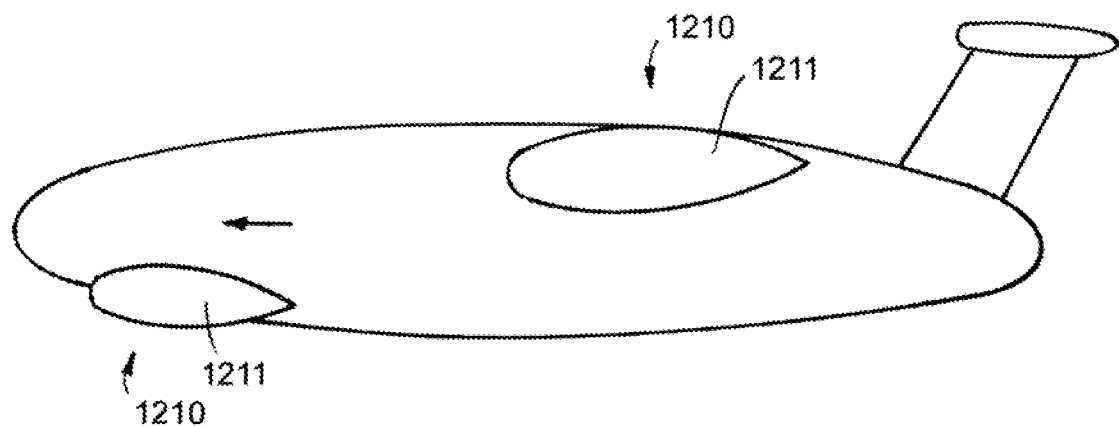
FIG. 27 is a side view of the fluid system and aircraft illustrated in FIG. 26 during cruise flight. The landing gear is illustrated in a second configuration.

In the off state, the actuators 1392 position each of the valves 1384, 1385, 1386, 1387 such that it is in the first configuration and fluid can flow through each of the first and second injection openings 1302, 1380 and each of the first and second suction openings 1304, 1382. This configuration is considered advantageous during lift-off and landing since the fluid system 1210 creates lift when the wings 1211 of the aircraft are disposed vertical, as shown in FIGS. 25 and 26. The lift created by fluid system 1210 is increased relative to the fluid system 1010 illustrated in FIG. 24 based on the inclusion of a second injection opening 1380 and a second suction opening 1382. In the first state, the actuators 1392 position each of the valves in the second configuration such that fluid is prevented from passing through each of the second injection opening 1380 and the second suction opening 1382. This configuration is considered advantageous during flight, as shown in FIG. 27, since the requirement for lift is reduced relative to take-off and landing. Therefore, after an aircraft takes off, the portions of the aircraft that include a fluid system (e.g., wings) can be rotated such that the leading edge is directed toward the direction of flight and the valves can be positioned in the second configuration. In addition, when an aircraft is preparing to land or is taking off, the portions of the aircraft that include a fluid system (e.g., wings) can be rotated such that the leading edge is upward, or at an angle between the direction of travel and vertical, or vertical, and the valves can be positioned in the first configuration. In the second state, each of the actuators 1392 positions each of the valves in the third configuration such that fluid can flow can partially flow through each of the second injection opening 1380 and the second suction opening 1382.

While each of the valves 1384, 1385, 1386, 1387 and actuators 1392 has been illustrated as having a particular structural arrangement and as being positioned at a particular location on the fluid system, a valve and an actuator can have any suitable structural arrangement and be positioned at any suitable location on a fluid system. Selection of a suitable structural arrangement and/or position to locate a valve and an actuator can be based on various considerations, such as the desired flow around a fluid system and/or the desired flow through a channel defined through a fluid system. While each of the valves 1384, 1385, 1386, 1387 has been illustrated as moveably attached to the third body portion 1215 within the channel 1306 and disposed within a recess 1393 defined by the third body portion 1215 in the first configuration, a valve can be attached to any suitable portion of a fluid system to achieve the configurations described herein. For example, a valve can be moveably attached to a first body portion or a second body portion such that the valve is disposed within a recess defined by the first body portion or the second body portion in the first configuration. Any of the embodiments described herein, such as the fluid system 1210, can be included on any suitable component of a conventional aircraft. For example, any of the embodiments described herein, such as fluid system 1210, can be included on a flap and/or elevator (e.g., which can be moveable relative to the first body portion) that provides enhanced lift to the wing during flight.

Figure 28:
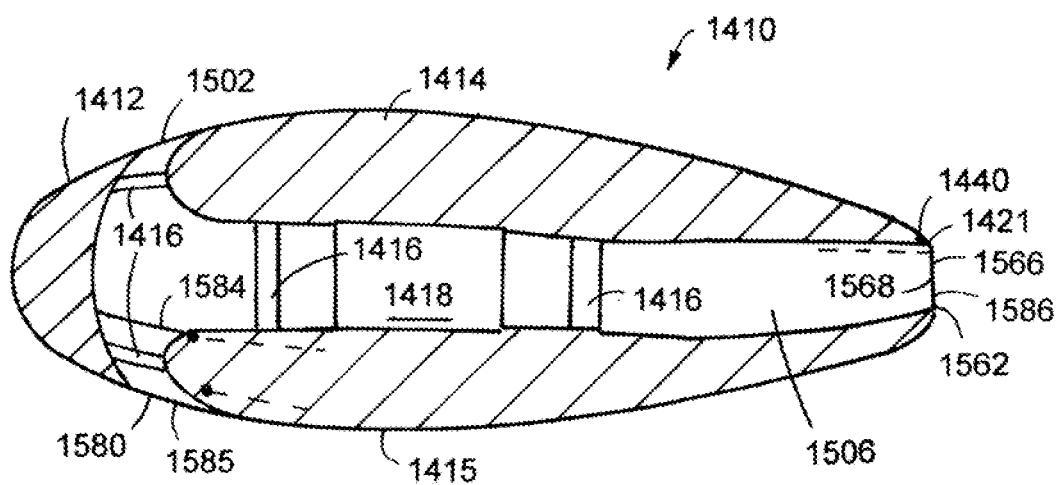
FIG. 28 is a cross-sectional view of a seventh example fluid system taken along a plane that is orthogonal to the lengthwise axis of the fluid system.

FIG. 28 illustrates a seventh example fluid system 1410. The fluid system 1410 is similar to the fluid system 1210 illustrated in FIG. 25 and described above, except as detailed below. The fluid system 1410 has a lengthwise axis, a first body portion 1412, a chord length, a second body portion 1414, a third body portion 1415, a plurality of supports 1416, a plurality of fluid pressurizers 1418, a first valve 1584, a second valve 1585, and a third valve 1586. The first valve 1584 is similar to the first valve 1384 described above, except as detailed below. The second valve 1585 is similar to the third valve 1386 described above, except as detailed below.

In the illustrates embodiment, the fluid system 1410 omits the inclusion of first and second suction openings and the first body portion 1412 defines a first opening 1562 that is defined at the trailing edge 1440 and provides access to the channel 1506, which extends from the first opening 1562 to the first injection opening 1502 and the second injection opening 1580. The first opening 1562 can have any suitable size and configuration, such as those described with response to injection openings and/or suction openings.

In the illustrated embodiment, the third valve 1586 is moveably attached to the second body portion 1414 within the channel 1506 and has a first surface 1566 and a second surface 1568. The third valve 1586 has a first configuration, as shown in solid lines in FIG. 28, a second configuration, as shown in dashed lines in FIG. 28, a third configuration, and is moveable between these configurations via actuator 1421. In the first configuration, the third valve 1586 is disposed over the first opening 1562 (e.g., seals the first opening 1562), the first surface 1566 is directed toward an environment exterior to the channel 1506, and the second surface 1568 is directed toward the channel 1506 such that fluid is prevented from flowing into the channel 1506 through the first opening 1562. In the second configuration, the third valve 1586 is disposed adjacent to the second body portion 1414, the first surface 1566 is directed toward the channel 1506, and the second surface 1568 is directed toward the second body portion 1414 such that fluid can flow through the passageway 1560 and to a fluid pressurizer 1418. In the third configuration, the third valve 1586 is disposed between the first configuration and the second configuration such that it does not seal the channel between the first body portion 1412 and the second body portion 1414 or the first opening 1562 such that fluid can flow through the passageway 1560 to a fluid pressurizer 1418. In the off state, the actuator 1421 positions the third valve 1586 such that it is in the second configuration. In the first state, the actuator 1421 positions the third valve 1586 in the first configuration. In the second state, the actuator 1421 positions the third valve 1586 in the third configuration.

FIGS. 29, 30, 31, and 32 illustrate an example aircraft 1627 that includes an eighth example fluid system 1610. The fluid system 1610 is similar to the fluid system 10 illustrated in FIGS. 1, 2, 3, 4, 5, 6, and 7 and described above, except as detailed below. A fluid system 1610 is included on a first airfoil 1622 of a first wing 1624, a second airfoil 1623 of a second wing 1625, a third airfoil 1751 of a first canard 1750, and a fourth 1753 airfoil of a second canard 1752. Each fluid system 1610 has a lengthwise axis 1611, a first body portion 1612, a chord length 1613, a second body portion 1614, a plurality of supports, a plurality of fluid pressurizers, a plurality of ducts, and a plurality of propellers, as described in more detail herein.

Figure 29:
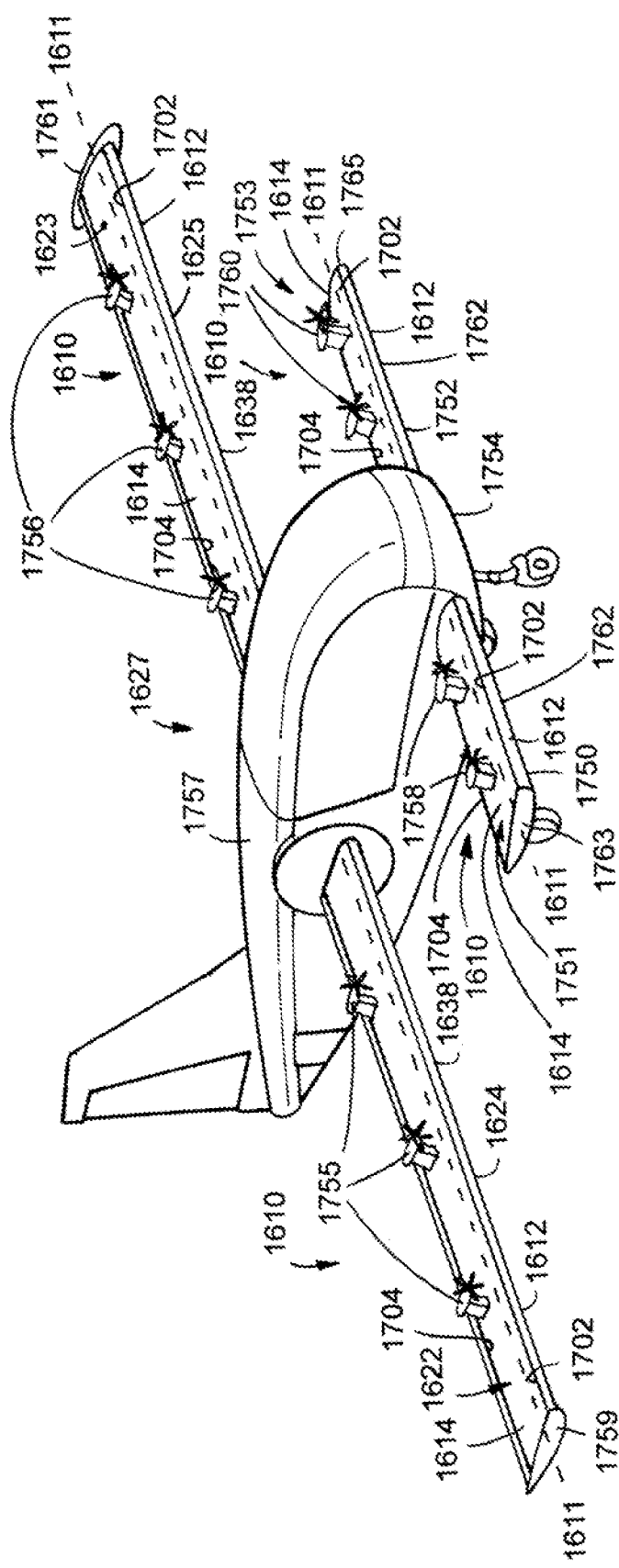
FIG. 29 is a perspective view of another example aircraft that includes an eighth example fluid system.
Figure 30:
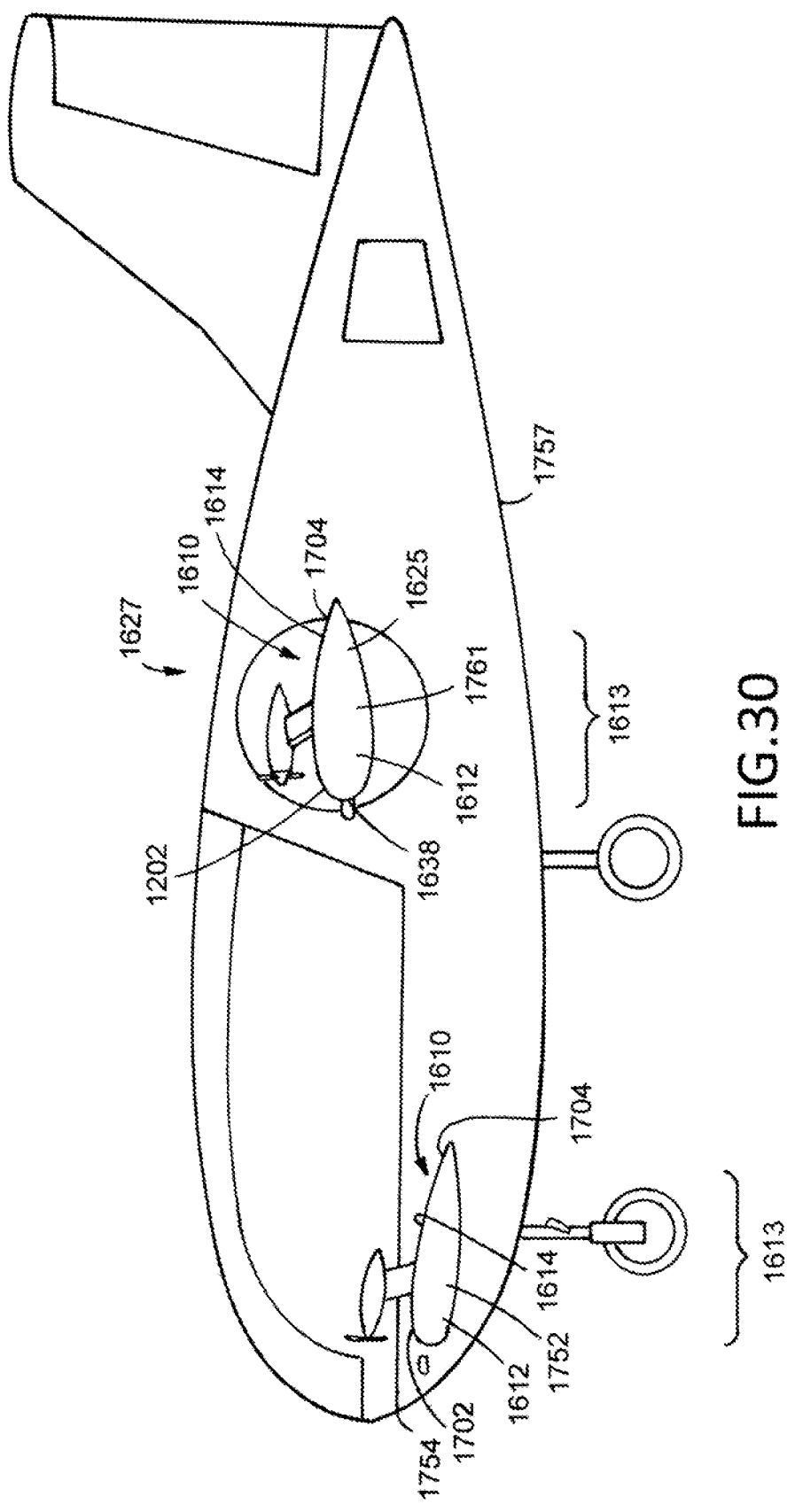
FIG. 30 is a side view of the aircraft illustrated in FIG. 29.
Figure 31:
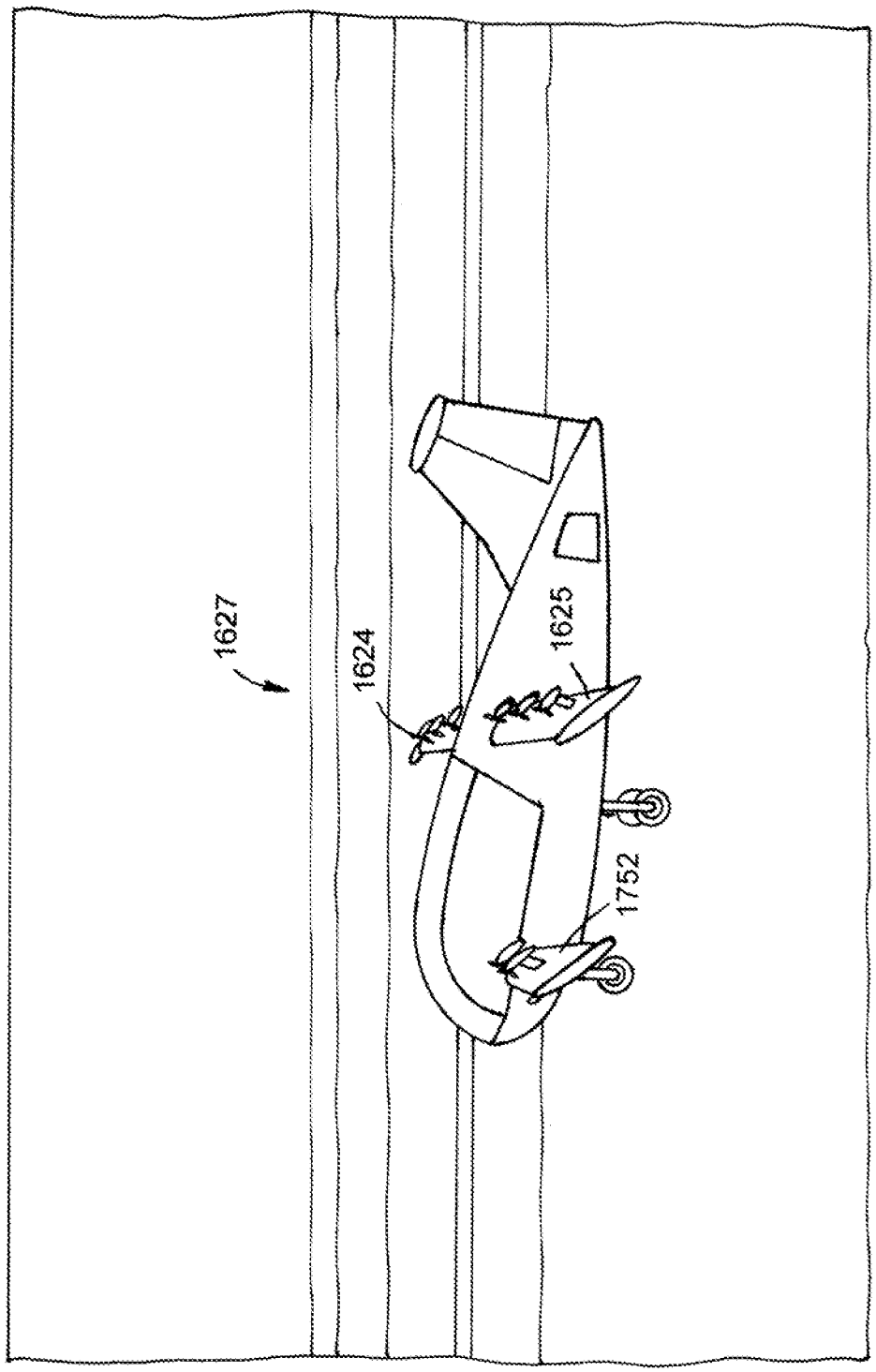
FIG. 31 is a side view of the aircraft illustrated in FIG. 29 during takeoff.

In the illustrated embodiment, the first canard 1750 is positioned between the first wing 1624 and the nose 1754 of the aircraft 1627 and the second canard 1752 is positioned between the second wing 1625 and the nose 1754 of the aircraft 1627. Each of the first wing 1624, the second wing 1625, the first canard 1750, and the second canard 1752 is rotatable between a first, substantially horizontal position, as shown in FIGS. 29 and 30, and a second, rotated position, as shown in FIG. 31. Each of the first wing 1624, the second wing 1625, the first canard 1750, and the second canard 1752 can be rotated between about −10 degrees and about 135 degrees from the first position to the second position. A negative angle indicates that the chord length (or average chord length for twisted wings) of a wing or canard is below a hypothetical horizontal plane and a positive angle indicates that the chord length (or average chord length for twisted wings) of a wing or canard is above a hypothetical horizontal plane.

A first plurality of propellers 1755 is positioned on the first wing 1624 between the fuselage 1757 and the end 1759 of the first wing 1624 such that each propeller of the first plurality of propellers 1755 is equally spaced from an adjacent propeller of the first plurality of propellers 1755. A second plurality of propellers 1756 is positioned on the second wing 1625 between the fuselage 1757 and the end 1761 of the second wing 1625 such that each propeller of the second plurality of propellers 1756 is equally spaced from an adjacent propeller of the second plurality of propellers 1756. A third plurality of propellers 1758 is positioned on the first canard 1750 between the fuselage 1757 and the end 1763 of the first canard 1750 such that each propeller of the third plurality of propellers 1758 is equally spaced from an adjacent propeller of the third plurality of propellers 1758. A fourth plurality of propellers 1760 is positioned on the second canard 1752 between the fuselage 1757 and the end 1765 of the second canard 1752 such that each propeller of the fourth plurality of propellers 1760 is equally spaced from an adjacent propeller of the fourth plurality of propellers 1760.

In the illustrated embodiment, the first plurality of propellers 1755 is disposed between the injection opening 1702 and the suction opening 1704 on the first wing 1624 (e.g., about 10% of the chord length downstream or upstream of the leading edge 1638), the second plurality of propellers 1756 is disposed between the injection opening 1702 and the suction opening 1704 on the second wing 1625 (e.g., about 10% of the chord length downstream or upstream of the leading edge 1638), the third plurality of propellers 1758 is disposed between the injection opening 1702 and the suction opening 1704 on the first canard 1750 (e.g., about 10% of the chord length downstream or upstream of the leading edge 1762 of the first canard 1750), and the fourth plurality of propellers 1760 is disposed between the injection opening 1702 and the suction opening 1704 on the second canard 1752 (e.g., about 10% of the chord length downstream or upstream of the leading edge 1762 of the second canard 1752). In use, each of the propellers included on the first wing 1624, the second wing 1625, the first canard 1750, and the second canard 1752 generates freestream flow for the fluid system 1610 (e.g., at an angle of attack (or wing chord angle about horizontal), such as 45 degrees, or between about 45 degrees and about 80 degrees). Enhanced by the freestream induced by the propellers, the fluid system 1610 is capable of generating a high lift coefficient relative to aircrafts that do not include a combination of propellers and a fluid system, such as those described herein. This results in a system in which some, or most, of the lift is generated by the fluid system 1610 (e.g., for vertical takeoff and landing). In addition, it results in a system in which the propeller disk loading is substantially lower than conventional vertical takeoff and landing aircrafts since it is not the sole generator of vertical lift, which reduces the noise level and energy consumption.

Figure 32:
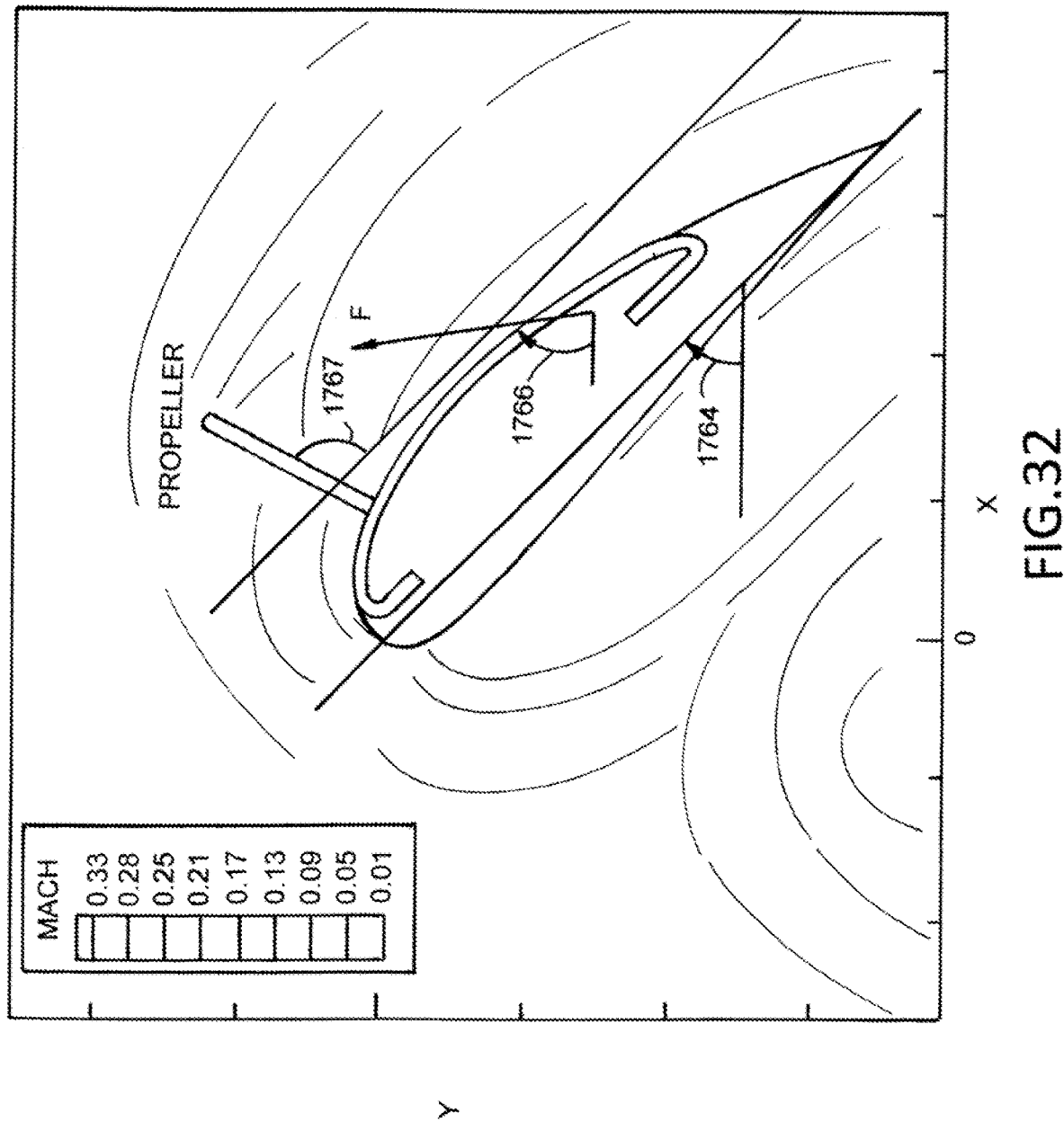
FIG. 32 is a side view of a wing of the aircraft illustrated in FIG. 29.
Figure 33:
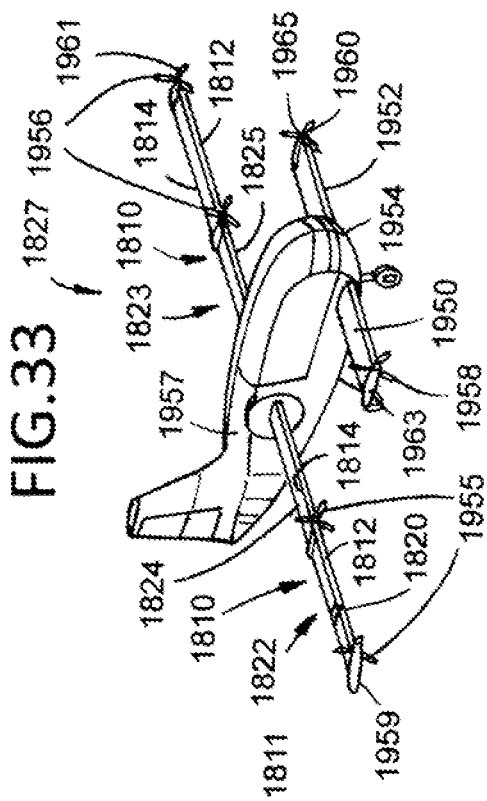
FIG. 33 is a partially broken away perspective view of another example aircraft that includes a ninth example fluid system.
Figure 36:
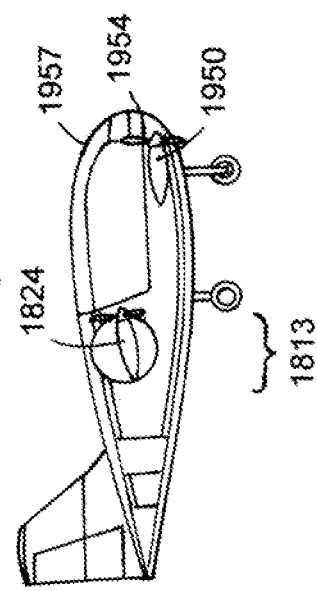
FIG. 36 is a side view of the aircraft illustrated in FIG. 33.
Figure 34:
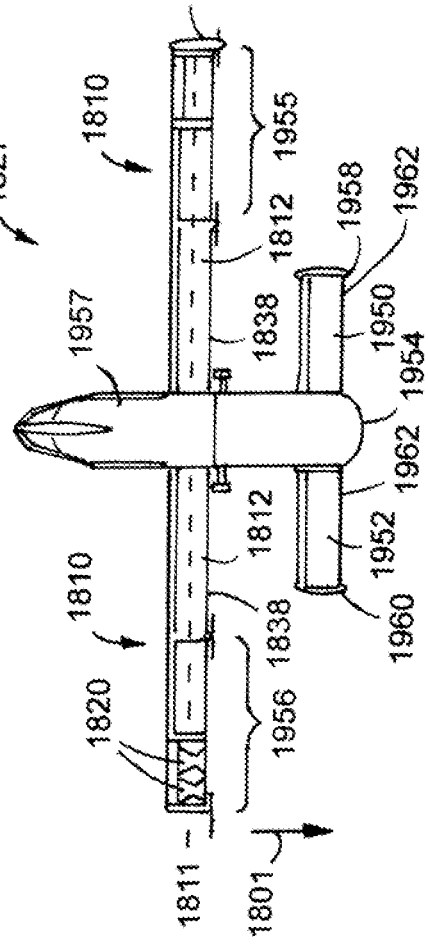
FIG. 34 is a partially broken away top view of the aircraft illustrated in FIG. 33.
Figure 35:
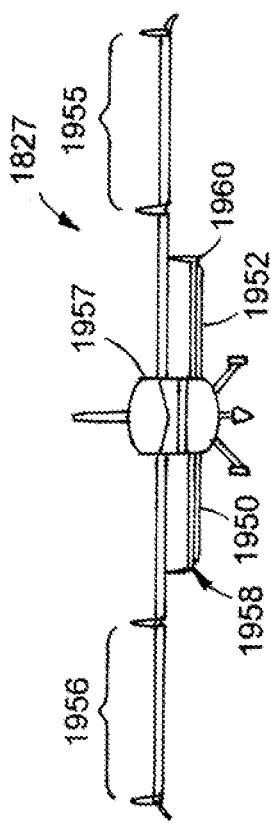
FIG. 35 is a front view of the aircraft illustrated in FIG. 33.

In use, as shown in FIG. 32, 1764 represents an angle between the chord length 1613 and the horizontal and 1766 represents an angle between the resultant force F of the fluid system 1610 and the horizontal. The resultant force F is the sum of the force provided by the fluid system 1610 and each of the propellers included on a wing. The airfoil, which includes the fluid system 1610, generates most of the vertical component of F, which reduces the disk loading of the propeller, the noise, and the improves the efficiency of the system. When the angle 1764 is increased, the angle 1766 is generally also increased. The angle 1766 determines the degree of the lift component, which is in the vertical direction. For example, if the angle 1766 is 90 degrees, the resultant force is in the lift direction. The closer the angle 1764 to 90 degrees, the more lift is generated from the propellers alone and less is generated from the fluid system 1610, which reduces the efficiency of the system and results in a higher power loading. Power loading is defined as how much power is needed to lift per unit weight. The angle 1766 is determined by the strength of the co-flow jet of the fluid system 1610 and the propeller disking loading. The preferred angle 1764 is between about 45 degrees and about 80 degrees for both takeoff and landing, which results in increased lift and efficiency, but it can be in any suitable angle between about 0 degrees and about 135 degrees. At vertical takeoff and landing, the preferred angle between a plane that extends through a propeller blade and a chord length is between about 40 degrees and about 150 degrees. At cruise, a plane that extends through a propeller blade can be rotated such that it is perpendicular to the flight direction. For a vertical takeoff, the angle 1766 does not need to be 90 degrees. For example, an aircraft could takeoff without using a runway when angle 1764 is about 70 degrees. However, at landing, the angle 1766 of about 90 degrees or larger can assist with landing. FIG. 31 illustrates the wings 1624, 1625 and canards 1750, 1752 disposed at an angle equal to about 45 degrees. After an aircraft takes off using a fluid system (e.g., when cursing), such as fluid system 1610, the wings and/or canards can rotate back to the first position (e.g., substantially horizontal), or a position between the first position and the second position, such that an optimum angle of attack (e.g., the angle between the wing chord and flight direction) is achieved resulting in decreased drag and optimum aerodynamic efficiency. Any suitable cruise angle of attack can be utilized by a wing and/or canard, such as angles between about −10 degrees and about 15 degrees, angles between about −2 degrees and about 8 degrees, and any other angle considered suitable.

While the plurality of propellers 1755, 1756, 1758, 1760 have been illustrated as being fixed to a wing or a canard, a propeller attached to a wing or a canard can be moveable relative to the wing or the canard. For example, as shown in FIG. 32, an angle 1767 can be disposed between a plane that extends through a propeller blade and a chord length. The angle 1767 can be any suitable angle including angles between about 40 degrees and about 150 degrees during a vertical takeoff or vertical landing, or equal to, greater than, less than, or about 180 degrees while the vehicle is at cruise altitude.

While the fluid system 1610 has been illustrated as including a plurality of propellers located at specific locations on a wing and a canard, a fluid system can include any suitable number and type of propulsion devices positioned at any suitable location on a wing and/or canard. Selection of a suitable number and type of propulsion devices, and position to locate a propulsion device, can be based on various considerations, including the intended use of the aircraft on which the fluid system is included. Examples of suitable propulsion devices considered suitable to include in a fluid system include propellers, jet engines, unducted fans, ducted fans, open rotors, any device of system that generates thrust, and any other propulsion device considered suitable for a particular embodiment. Examples of positions considered suitable to locate a propulsion device on a wing and/or canard include between a tip of an aircraft and a leading edge of a wing and/or canard, between a leading edge and a trailing edge of a wing and/or canard, between a trailing edge of a wing and/or canard and a tail of an aircraft, at the tip of a wing or canard, at an end of wing or canard, such that each propulsion device in a plurality of propulsion devices is equal spaced from an adjacent propulsion device of the plurality of propulsion devices, such that each propulsion device in a plurality of propulsion devices is distributed along a wing and/or canard (e.g., equally spaced, or variably spaced), such that the tip or outer perimeter of the propulsion device is spaced relative to the outer surface of a wing and/or a canard between about 0.01% of the wing or canard chord length and about 100% of the wing or canard chord length taken along a plane that is vertical, such that the tip or outer perimeter of the propulsion device is spaced relative to the outer surface of a wing and/or a canard between about 1% of the wing or canard chord length and about 10% of the wing or canard chord length taken along a plane that is vertical, such that a propulsion device is in front of the leading edge of a wing or a canard (e.g., between the leading edge and the nose, in front of the leading edge and nose), at a leading edge, at a trailing edge, and any other location considered suitable for a particular embodiment. Examples of numbers of propulsion devices considered suitable to include on a wing and/or canard include zero, one, at least one, two, a plurality, three, four, five, six, seven, eight, more than eight, and any other number considered suitable for a particular embodiment.

It is considered advantageous to include one or more propulsion devices in a fluid system included on an aircraft, such as those described herein, to increase the lift, increase the efficiency, and reduce the noise relative to conventional direct vertical takeoff and landing vehicles. For example, the inclusion of fluid system 1610 on aircraft 1627 results in an aircraft 1627 that includes both direct vertical takeoff and landing technology as well as a fluid system, as described herein, which, when the wings 1624, 1625 and canards 1750, 1752 are rotated to an angle as described herein (e.g., vertical, between about 45 degrees and about 135 degrees), create greater lift relative to vertical takeoff technology that does not include a fluid system. In addition, the inclusion of a fluid system on a wing, or a plurality of wings, and/or a canard, or a plurality of canards, of an aircraft assists with the generation of lift during takeoff, landing, and/or while cruising.

While fluid system 1610 is similar to the fluid system 10 illustrated in FIGS. 1, 2, 3, 4, 5, 6, and 7 and described above, any of the features, components, and/or devices described with respect to fluid system 1610 (e.g., propellers, propulsion devices) can be included on any suitable fluid system and selection of a feature, component, and/or device to include in a fluid system can be based on various considerations, including the intended use of the fluid system. For example, any of the features, components, and/or devices described herein, such as with respect to fluid system 1610 and aircraft 1627 (e.g., canard) can be included in any suitable fluid system, such as those described herein, those described in U.S. patent application Ser. No. 15/426,084 by Zha and filed on Feb. 7, 2017, which is incorporated by reference herein in its entirety, and/or those described in U.S. patent application Ser. No. 15/255,523 by Zha and filed on Sep. 2, 2016, which is incorporated by reference herein in its entirety.

While the aircraft 1627 has been illustrated as including a first canard 1750 and a second canard 1752 at specific locations on the aircraft 1627 and each of the canards 1750, 1752 includes a fluid system, an aircraft can omit the inclusion of one or more canards, position one or more canards at other locations on the aircraft (e.g., between a first wing and a tail of the aircraft, between a second wing and a tail of the aircraft, on the top, middle, or bottom of a tail, at the nose of the aircraft, in front of the nose of an aircraft, and/or at any other suitable location along the length of a fuselage), and/or include one or more canards and/or wings that omit a fluid system. While each wing and canard of aircraft 1627 has been illustrated as being rotatable 90 degrees, a wing and/or canard included on an aircraft can be rotatable any suitable angle relative to a lengthwise axis of the wing or canard and can be based on various considerations, including the intended use of the aircraft. Examples of angles considered suitable to rotate a wing and/or canard included on an aircraft include angles between about 0 degrees and about 90 degrees, angles between 0 degrees and 180 degrees, angles between about 0 degrees and about 270 degrees, angles between 0 degrees and about 360 degrees, angles greater than, less than, equal to, or about 90 degrees, and any other angle considered suitable for a particular embodiment.

FIGS. 33, 34, 35, and 36 illustrate an example aircraft 1827 that includes a ninth example fluid system 1810. The fluid system 1810 is similar to the fluid system 1610 illustrated in FIGS. 29, 30, 31, and 32 and described above, except as detailed below. The fluid system 1810 has a lengthwise axis 1811, a first body portion 1812, a chord length 1813, a second body portion 1814, a plurality of supports, a plurality of fluid pressurizers, a plurality of ducts 1820, a first canard 1950, a second canard 1952, a first plurality of propellers 1955, a second plurality of propellers 1956, a propeller 1958 disposed on the first canard 1950, and a propeller 1960 disposed on the second canard 1952.

In the illustrated embodiment, a fluid system 1810 is included on a first airfoil 1822 of a first wing 1824 of an aircraft 1827, a second airfoil 1823 of a second wing 1825 of an aircraft 1827, and, during use, a forward flying direction is illustrated by arrow 1801. A fluid system is not included on the first canard 1950 or the second canard 1952. However, alternative embodiments could include a fluid system on a canard.

The first plurality of propellers 1955 is positioned on the first wing 1824 between the fuselage 1957 and the end 1959 of the first wing 1824 such that a first propeller is disposed at about the middle of the first wing 1824 and a second propeller is disposed near the end 1959 of the first wing 1824. The second plurality of propellers 1956 is positioned on the second wing 1825 between the fuselage 1959 and the end 1961 of the second wing 1825 such that a first propeller is disposed at about the middle of the second wing 1825 and a second propeller is disposed near the end 1961 of the second wing 1825. The propeller 1958 is positioned on the first canard 1950 near the end 1963 of the first canard 1950. The propeller 1960 is positioned on the second canard 1952 near the end 1965 of the second canard 1952.

In the illustrated embodiment, the first plurality of propellers 1955 is disposed between the leading edge 1838 of the first wing 1824 and the nose 1954 of the aircraft 1827 (e.g., upstream of the leading edge 1838), the second plurality of propellers 1956 is disposed between the leading edge 1838 of the second wing 1825 and the nose 1954 of the aircraft 1827 (e.g., upstream of the leading edge 1838), the propeller 1958 is disposed between the leading edge 1962 of the first canard 1950 and the nose 1954 of the aircraft 1827 (e.g., upstream of the leading edge 1962), and the propeller 1960 is disposed between the leading edge 1962 of the second canard 1952 and the nose 1954 of the aircraft 1827 (e.g., upstream of the leading edge 1962).

Figure 37:
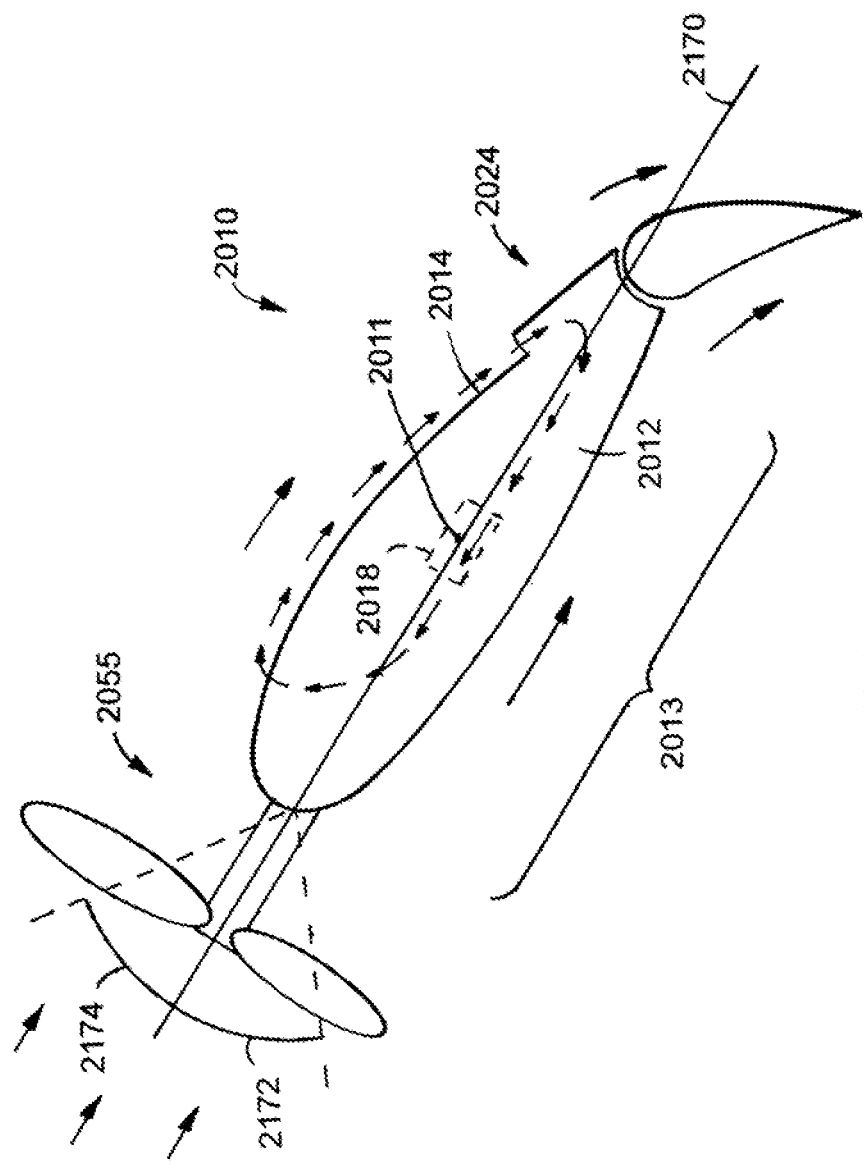
FIG. 37 is a side view of a tenth example fluid system included on the wing of an aircraft subjected to a fluid flow field.

FIG. 37 illustrates a tenth example fluid system 2010 included on the wing 2024 of an aircraft subjected to a fluid flow field. The fluid system 2010 is similar to the fluid system 1810 illustrated in FIGS. 33, 34, 35, and 36 and described above, except as detailed below. The fluid system 2010 has a lengthwise axis 2011, a first body portion 2012, a chord length 2013, a second body portion 2014, a plurality of supports, a plurality of fluid pressurizers 2018, a plurality of ducts, and a first plurality of propellers 2055.

In the illustrated embodiment, each propeller of the first plurality of propellers 2055 is moveable relative to an axis 2170 that contains the chord length 2013 in a first direction such that it is disposed at a first angle 2172 relative to the axis 2170 and in a second direction such that it is disposed at a second angle 2174 relative to the axis 2170. Each of the first angle 2172 and the second angle 2174 can be any suitable angle between about 0 degrees and about 20 degrees.

It is considered advantageous to include a propulsion device that is moveable relative to an axis that contains a chord length and/or a plane that contains the lengthwise axis of a portion of an aircraft (e.g., wingspan) at least because it provides a mechanism for increasing the efficiency of a fluid system. For example, a propulsion device can be moved along a plane at any suitable angle, or relative to a plane at any suitable angle. Any propulsion device, such as a propeller, included in a fluid system can be moveable as described herein. While angles 2172, 2174 have been illustrated as being between about 0 degrees and about 20 degrees, a propulsion device can be moveable at any suitable angle relative to a plane that contains a lengthwise axis of a wingspan, a chord length, or any other portion of an aircraft. Examples of angles considered suitable to move a propulsion device relative to a plane or an axis include angles equal to, greater than, less than, or about 5 degrees, 10 degrees, 20 degrees, 30 degrees, 40 degrees, 50 degrees, 90 degrees, between about 0 degrees and about 50 degrees, between about 0 degrees and about 90 degrees, and any other angle considered suitable for a particular embodiment.

Figure 38:
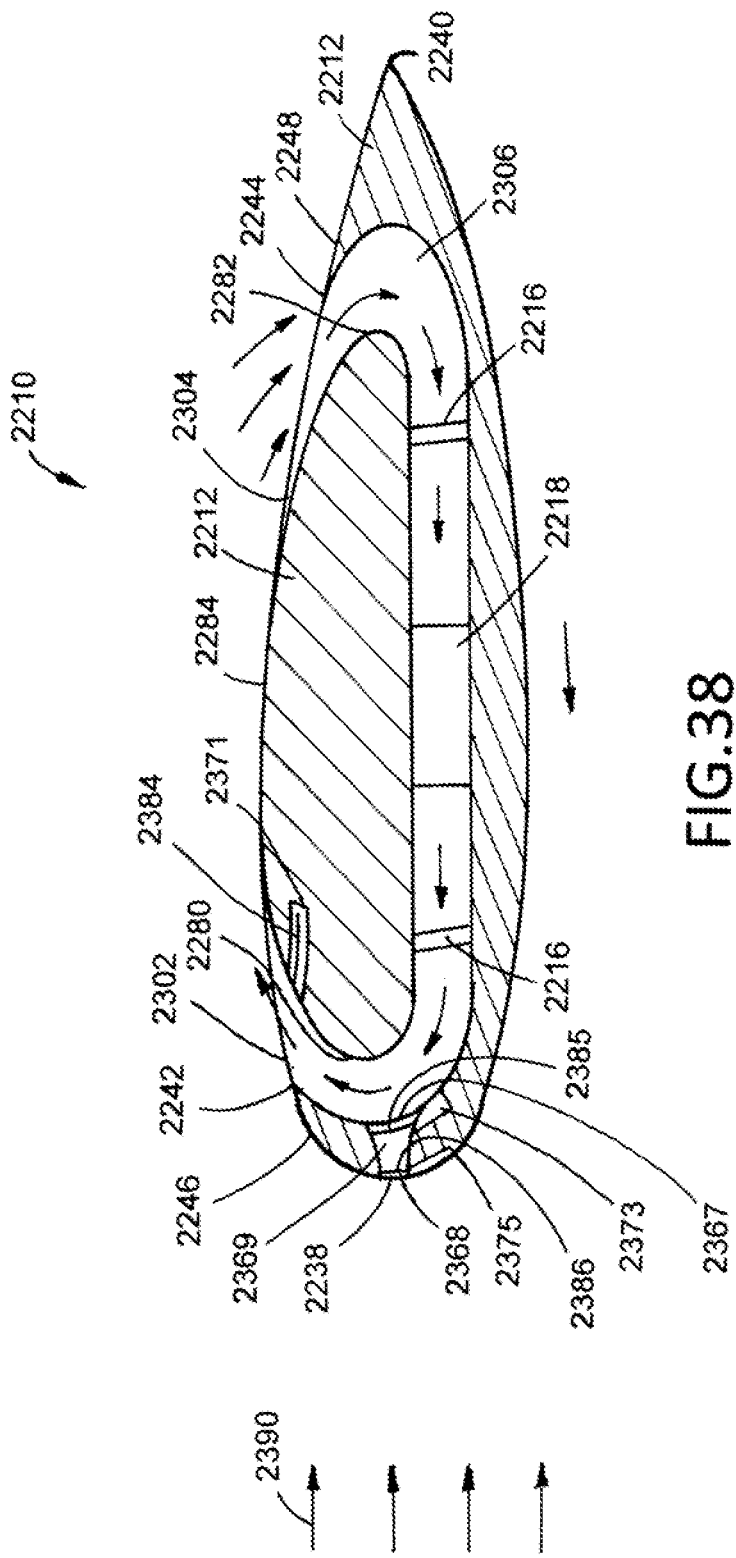
FIG. 38 is a cross-sectional view of an eleventh example fluid system taken along a plane that is passes through the lengthwise axis of the fluid system.
Figure 39:
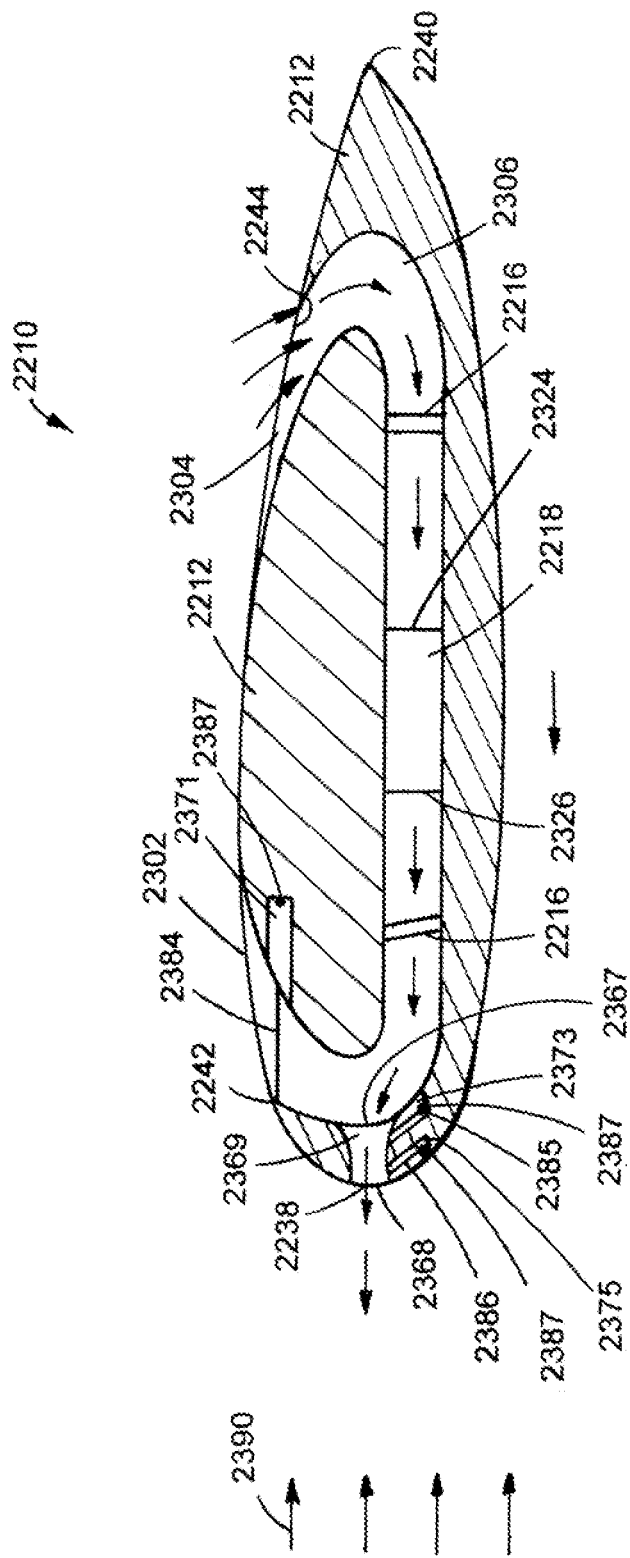
FIG. 39 is another cross-sectional view of the fluid system illustrated in FIG. 38.

FIGS. 38 and 39 illustrate an eleventh example fluid system 2210. The fluid system 2210 is similar to the fluid system 10 illustrated in FIGS. 1, 2, 3, 4, 5, 6, and 7 and described above, except as detailed below. The fluid system 2210 has a lengthwise axis, a main body 2212, a chord length, a plurality of supports 2216, a plurality of fluid pressurizers 2218, a first valve 2384, a second valve 2385, and a third valve 2386.

In the illustrated embodiment, the main body 2212 has a leading edge 2238, a trailing edge 2240, a first intermediate edge 2242, a second intermediate edge 2244, a front surface 2246, a rear surface 2248, a third intermediate edge 2280, a fourth intermediate edge 2282, a top surface 2284, and defines a first opening 2367, second opening 2368, a passageway 2369, a first recess 2371, a second recess 2373, and a third recess 2375.

The first intermediate edge 2242 is disposed between the leading edge 2238 and the trailing edge 2240 and the second intermediate edge 2244 is disposed between the first intermediate edge 2242 and the trailing edge 2240. The front surface 2246 extends from the leading edge 2238 toward the trailing edge 2240 to the first intermediate edge 2242. The rear surface 2248 extends from the second intermediate edge 2244 away from the leading edge 2238 to the trailing edge 2240 and curves toward the chord length. The third intermediate edge 2280 is disposed between the leading edge 2238 and the fourth intermediate edge 2282 and the fourth intermediate edge 2282 is disposed between the third intermediate edge 2280 and the trailing edge 2240. In the illustrated embodiment, the channel 2306 extends from the suction opening 2304 to the injection opening 2302.

The first opening 2367 is defined within the channel 2306 and is in fluid communication with the channel 2306 and the passageway 2369. The second opening 2368 is defined on the leading edge 2238 and is in fluid communication with the passageway 2369 and an environment exterior to the passageway 2369 and the channel 2306. The passageway 2369 extends through the main body 2212 from the first opening 2367 to the second opening 2368 and converges from the first opening 2367 to the second opening 2368. In some embodiments, this structural arrangement of the passageway 2369 provides a mechanism for accelerating fluid flow through a passageway. Alternative embodiments, however, can include a passageway that has any suitable structural arrangement, such as a constant inside diameter, a passageway that converges from the second end to the first end, and any other arrangement considered suitable for a particular embodiment. While the openings 2367, 2368 and the passageway 2369 have been illustrated as being positioned at specific locations on the fluid system 2210, an opening and passageway defined by a main body can be positioned at any suitable location. Selection of a suitable location to position an opening and/or passageway can be based on various considerations, including the desired fluid flow through the opening and/or passageway. For example, a passageway can have a linear, or curved structural configuration.

Each of the first recess 2371, the second recess 2373, and the third recess 2375 is sized and configured to receive and house a valve 2384, 2385, 2386. The first recess 2371 is sized and configured to receive the first valve 2384, which is attached to the main body 2212 such that it can obstruct the channel 2306 and is disposed adjacent the injection opening 2302. The second recess 2373 is sized and configured to receive the second valve 2385, which is attached to the main body 2212 such that it can obstruct fluid moving through the channel 2306 and into the passageway 2369 and is disposed adjacent the first opening 2367. The third recess 2375 is sized and configured to receive the third valve 2386, which is attached to the main body 2212 such that it can obstruct fluid moving through the passageway 2369 to an environment exterior to the passageway 2369 and is disposed adjacent the second opening 2368.

In the illustrated embodiment, each fluid pressurizer of the plurality of fluid pressurizers 2218 is disposed within the channel 2306 and is in communication with the injection openings 2302 and the suction opening 2304. Each fluid pressurizer of the plurality of fluid pressurizers 2218 is attached to the main body 2212 and is positioned such that the suction port 2324 is directed toward a first portion of the channel 2306 that extends from the suction opening 2304 to the fluid pressurizer (e.g., the suction port 2324 is directed toward the suction opening 2304) and the discharge port 2326 is directed toward a second portion of the channel 2306 that extends from the injection opening 2302 to the fluid pressurizer (e.g., the discharge port 2326 is directed toward the injection opening 2302). In the off state, each fluid pressurizer of the plurality of fluid pressurizers 2218 does not draw any fluid through the channel 2306. In the on state, each fluid pressurizer of the plurality of fluid pressurizers 2218 draws fluid through the suction opening 704, through the channel 2306, through the fluid pressurizer, and pushes fluid through the channel 2306 and out of the injection opening 2302 and/or out of the second opening 2368 through the passageway 2369, depending on the position of the valves 2384, 2385, and 2386 as described in more detail herein.

A fluid pressurizer can be attached to a main body using any suitable technique or method of attachment and selection of a suitable technique or method of attachment between a fluid pressurizer and a main body can be based on various considerations, including the material(s) that forms the fluid pressurizer, and/or the main body. Examples of techniques and methods of attachment considered suitable include welding, fusing, using adhesives, mechanical connectors, and any other technique or method considered suitable for a particular embodiment.

In the illustrated embodiment, each of the valves 2384, 2385, 2386 is moveably attached to the main body 2212 and has a first surface, a second surface, a thickness that extends from the first surface to the second surface, and a length. Each of the valves 2384, 2385, 2386 has a first configuration, as shown in FIG. 38, a second configuration, as shown in FIG. 39, and is moveable between these configurations via actuators 2387. In the first configuration, the first valve 2384 is positioned within the first recess 2371 such that fluid can flow through the channel 2306 out of the injection opening 2302 to an environment exterior to the channel 2306 (e.g., in the first configuration the first valve 2384 is positioned such that it does not seal the injection opening 2302). In the second configuration, the first valve 2384 is positioned such that fluid is prevented from flowing through the injection opening 2302 (e.g., in the second configuration the first valve 2384 seals the injection opening 2302). In the first configuration, the second valve 2385 is positioned such that fluid is prevented from flowing through the first opening 2367 and into the passageway 2369 (e.g., in the first configuration the second valve 2385 seals the first opening 2367). In the second configuration, the second valve 2385 is positioned within the second recess 2373 such that fluid can flow through the first opening 2367 and into the passageway 2369 (e.g., in the second configuration the second valve 2385 is positioned such that it does not seal the first opening 2367). In the first configuration, the third valve 2386 is positioned such that fluid is prevented from flowing through the second opening 2368 and out of the passageway 2369 (e.g., in the first configuration the third valve 2386 seals the second opening 2368). In the second configuration, the third valve 2386 is positioned within the third recess 2375 such that fluid can flow through the second opening 2368 and through passageway 2369 to an environment exterior to the passageway 2369 (e.g., in the second configuration the third valve 2386 is positioned such that it does not seal the second opening 2368).

Each of the actuators 2387 is moveable between an off state and an on state and comprises the various components necessary to move a valve between a first configuration and a second configuration. Each of the actuators 2387 can be operatively connected to any suitable portion of the device, system, or component on which the fluid system is attached to provide power to the actuator (e.g., battery, electric motor) and to provide a mechanism for moving the actuator between the off state and the on state (e.g., one or more switches). In the off state, the actuators 2387 position each of the valves 2384, 2385, 2386 such that it is in the first configuration. In the on state, the actuators 2387 position each of the valves 2384, 2385, 2386 such that it is in the second configuration.

A valve and an actuator included in a fluid system can comprise any suitable valve and actuator and selection of a suitable valve and actuator can be based on various considerations, such as the structural arrangement of a main body included in a fluid system on which a valve is disposed and/or the material that forms a main body included in a fluid system. Examples of valves considered suitable to include in a fluid system include elongate plates that are sized and configured to interact with a main body to completely, or partially, seal a passageway, or channel, defined by one or more main bodies, butterfly valves, diaphragm valves, and any other valve considered suitable for a particular embodiment. Examples of actuators considered suitable to include in a fluid system include electric motors, pneumatic actuators, hydraulic actuators, actuators that produce rotational movement around the lengthwise axis of an attached shaft, actuators that produce axial movement of a shaft along the lengthwise axis of the shaft, linear actuators, and any other actuator considered suitable for a particular embodiment.

While each of the valves 2384, 2385, 2386 and actuators 2387 has been illustrated as having a particular structural arrangement and as being positioned at a particular location on the fluid system, a valve and an actuator can have any suitable structural arrangement and be positioned at any suitable location on a fluid system. Selection of a suitable structural arrangement and/or position to locate a valve and an actuator can be based on various considerations, such as the desired flow around a fluid system and/or the desired flow through a channel defined through a fluid system. For example, a valve and an actuator included in a fluid system can be positioned within a channel and/or passageway, be pivotably attached to a main body, positioned downstream from an end of a duct (e.g., an injection duct that terminates downstream from a passageway), or at any other location that achieves the sealing as described herein.

Generally, when a conventional aircraft lands it utilizes a reverse thrust with airflow from the engines to shorten the distance required to stop the aircraft. In the embodiment illustrated in FIGS. 38 and 39, when the valves 2384, 2385, 2386 are in the second configuration, the fluid traveling through the channel 2306 is ejected out of the passageway 2369 and in a direction that is opposite of the main flow of air 2390 around the fluid system 2210 such that a reverse thrust is generated in a direction that is opposite of the main flow of air 2390. When the valves 2384, 2385, 2386 are in the second configuration, the fluid system 2210 also provides a mechanism for interrupting airfoil flow such that lift is reduced, which can increase the friction between the wheels of an aircraft and the ground to shorten the distance required to come to a stop. In use, the valves 2384, 2385, 2386 can be positioned in the first configuration when the embodiment illustrated in FIGS. 38 and 39 is included on a wing of an aircraft and the aircraft is in flight and can be positioned in the second configuration when the aircraft is landing and/or attempting to stop.

While the fluid system 2210 has been illustrated as including a passageway 2369 and valves 2384, 2385, 2386, any of the features, elements, and/or structure illustrated with respect to fluid system 2210 can be included at multiple locations along a length of a fluid system. For example, multiple passageways and a plurality of valves can be distributed along a length of an airfoil such that discrete second openings are defined along the length of the airfoil. Alternatively, a second opening can be elongated and a single valve, or multiple valves, can be used to move the opening between an open and closed configuration. In embodiments in which multiple valves are used, each valve can be used in combination, or separately from one another, to achieve a complete, or partial seal, of a second opening.

While various elements, features, and components have been illustrated as disposed on a plane that is orthogonal to the lengthwise axis of a fluid system, the various elements, features, and components included in a fluid system can be disposed in any suitable orientation relative to one another. Selection of a suitable orientation to position various elements, features, and components of a fluid system relative to one another can be based on various considerations, including the desired flow characteristics of fluid flowing through the fluid system. For example, one or more passageways, openings, and/or channels, or portions thereof, can be disposed on a first plane that extends through a lengthwise axis of a fluid system (e.g., orthogonally) and one or more passageways, openings, and/or channels, or portions thereof, can be disposed on a second plane that is different than the first plane and that extends through the lengthwise axis of the fluid system (e.g., orthogonally). Each of the first plane and the second plane can be disposed any suitable angle relative to the lengthwise axis and the second plane can be disposed at any suitable angle relative to the first plane (e.g., parallel, coplanar). The first plane can be the same as, or different than, the second plane.

Figure 40:
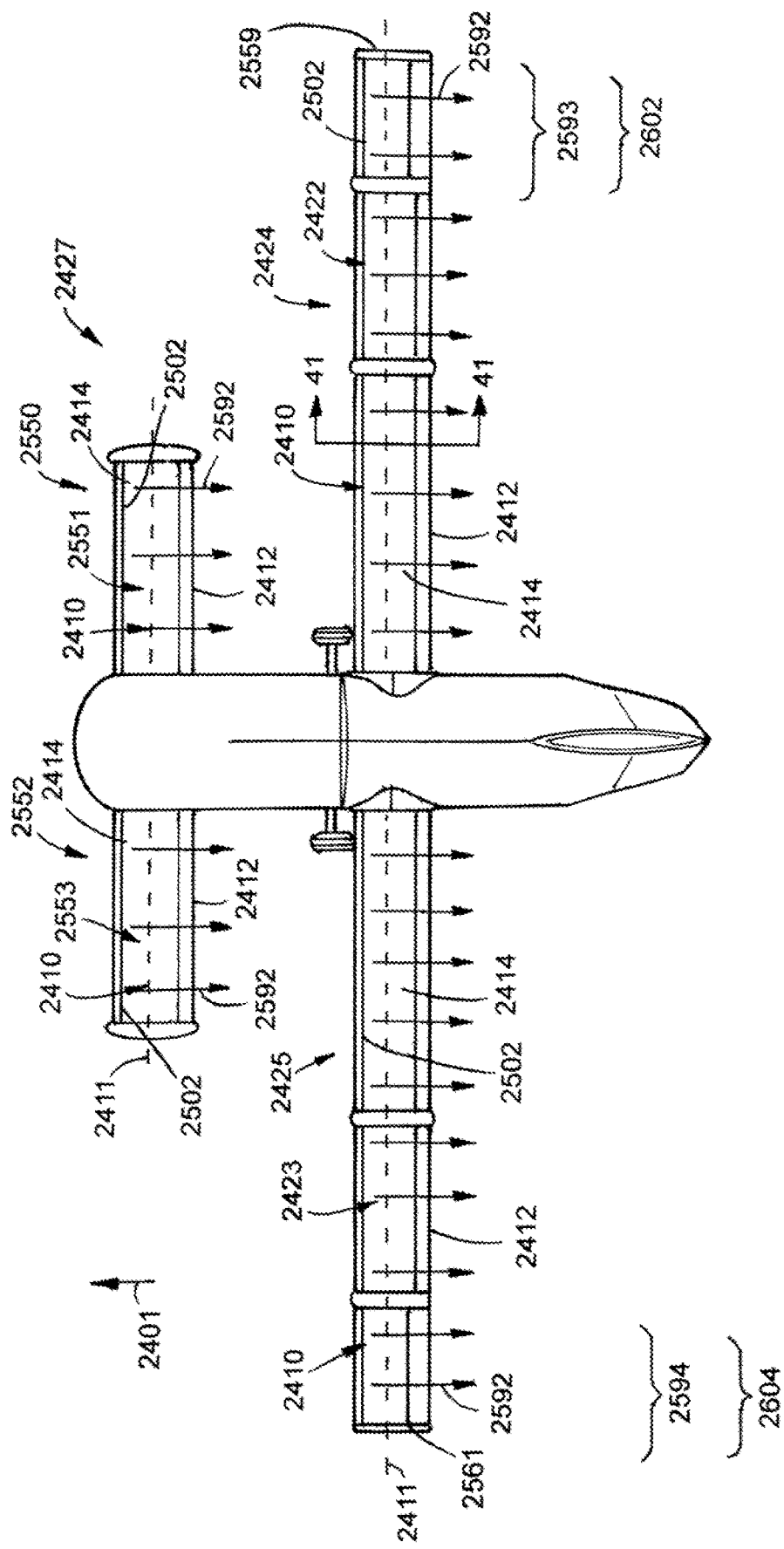
FIG. 40 is a top view of another example aircraft that includes an example fluid system.
Figure 41:
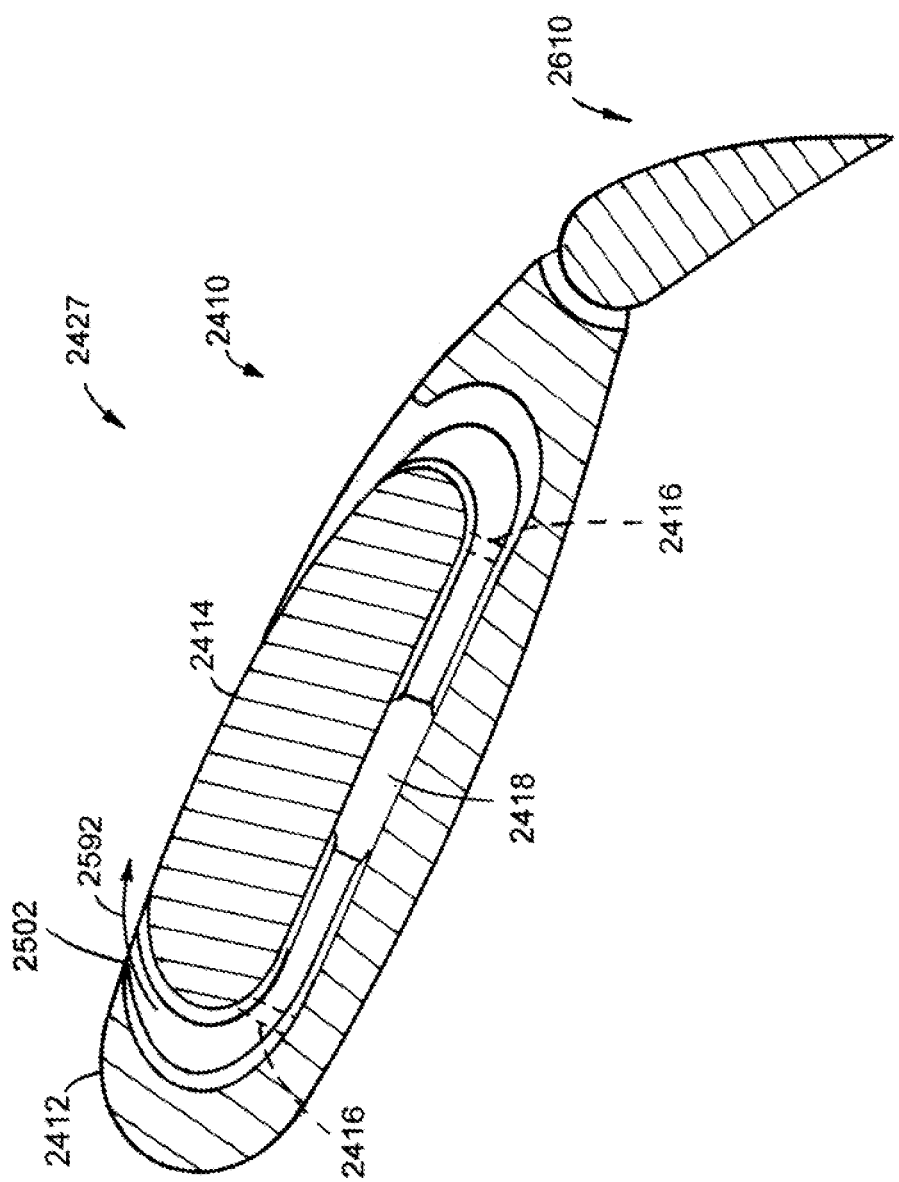
FIG. 41 is a cross-sectional view of a wing of the aircraft illustrated in FIG. 40 taken along line 41-41 shown in FIG. 40.

FIGS. 40 and 41 illustrate an example aircraft 2427 that includes an example fluid system 2410. The aircraft 2427 is similar to the aircraft 1627 illustrated in FIGS. 29, 30, 31, and 32 and described above, except as detailed below. A fluid system 2410 is included on a first airfoil 2422 of a first wing 2424, a second airfoil 2423 of a second wing 2425, a third airfoil 2551 of a first canard 2550, a fourth 2553 airfoil of a second canard 2552, and, during use, a forward flying direction is illustrated by arrow 2401. Each fluid system 2410 is similar to the fluid system 10 illustrated in FIGS. 1, 2, 3, 4, 5, 6, and 7 and described above, except as detailed below. The fluid system 2410 has a lengthwise axis 2411, a first body portion 2412, a chord length, a second body portion 2414, a plurality of supports 2416, a plurality of fluid pressurizers 2418, and a flap 2610. In the illustrated embodiment, the aircraft 2427 omits the inclusion of a plurality of propellers and includes first and second canards 2550, 2552. However, alternative embodiments can include one or more propellers, as described herein, and/or omit one or more canards.

Conventional aircrafts include ailerons, a rudder, elevators, spoilers, flaps, and other components to assist with flight control. For example, flap 2610 can be utilized to generate, or increase, lift without requiring rotation of a wing 2424, 2425. Similar structure can optionally be utilized on end portions of a wing (e.g., first portion 2602, first portion 2604, as described in more detail herein) as ailerons. Embodiments of the fluid systems described herein can also be utilized to assist with flight control. For example, during use, fluid system 2410 produces jets of fluid 2592 exiting the injection opening 2502. The strength of the velocity of the jets of fluid 2592 exiting an injection opening 2502 is based on the type, size, and/or location of each fluid pressurizer of the plurality fluid pressurizers, the amount of power being supplied to a fluid pressurizer, the structural configuration of each duct of the plurality of ducts, the structural configuration of a channel, or plurality of channels, defined by a main body or cooperatively defined by first and second main body portions, the size and configuration of an injection opening, the size and configuration of a suction opening, and/or any other feature, element, and/or component of a fluid system. While the fluid systems 2410 have been illustrated as including a plurality of ducts, a plurality of ducts, or a portion of a plurality of ducts, can be omitted from a fluid system.

Different flight control effects can be imparted onto the aircraft 2427 by manipulating the velocity of the jets of fluid 2592 being ejected from the injection opening 2502 and/or rotating a portion of one or more of the wings 2424, 2425. For example, if it is desired to impart roll control onto the aircraft 2427, a first set of fluid pressurizers 2593 and a second set of fluid pressurizers 2594 can be utilized. The first set of fluid pressurizers 2593 is positioned on a first portion 2602 of the first wing 2424 that extends from the end 2559 to a point located a fourth of the length of the first wing 2424 from the end 2559. The second set of fluid pressurizers 2594 is positioned on a first portion 2604 of the second wing 2425 that extends from the end 2561 to a point located a fourth of the length of the second wing 2425 from the end 2561. Alternatively, or in addition to increasing or decreasing the velocity of fluid exiting one or fluid pressurizers, a portion of one or more wings 2424, 2425 can be rotated. In the illustrated embodiment, the first portion 2602 of the first wing 2424 and the first portion 2604 of the second wing is rotatable about the lengthwise axis 2411 in both a counterclockwise and clockwise direction. By rotating one, or both, of portions 2602, 2604, an increase or decrease in lift can be achieved on each wing 2424, 2425 such that the difference of the lift between the two wings 2424, 2425 generates a rolling moment. Depending on the type of roll control intended to be achieved, one of the first set of fluid pressurizers 2593, or a portion thereof, or second set of fluid pressurizers 2594, or a portion thereof, can increase or decrease the velocity of fluid exiting the fluid pressurizer(s) such that the rolling moment can be altered. A fluid system utilized in this manner can be used as a control separately from, or in combination with, one or more ailerons. Alternatively, or in addition to increasing or decreasing the velocity of fluid exiting a fluid pressurizer and/or rotating a portion of one or more wings, the cross-sectional area of one or more injection openings and/or suction openings can be manipulated to achieve manipulation of the rolling moment.

Depending on the type of yaw control intended to be achieved, one of the first set of fluid pressurizers 2593, or a portion thereof, or second set of fluid pressurizers 2594, or a portion thereof, can increase or decrease the velocity of fluid exiting the injection opening 2502 to generate drag or thrust on a wing such that the yaw moment can be altered. For example, by altering the velocity of the fluid exiting the injection opening 2502 on one, or both, of the wings 2424, 2425, an increase or decrease in drag or thrust can be achieved a wing 2424, 2425 such that a yaw moment is generated. A fluid system utilized in this manner can be used as a control separately from, or in combination with, a rudder. Alternatively, or in addition to increasing or decreasing the velocity of fluid exiting an injection slot, the cross-sectional area of one or more injection openings and/or suction openings can be manipulated to achieve manipulation of the yaw moment.

While manipulation of a set, or sets, of fluid pressurizers on one or more wings has been described as altering the roll, yaw, and/or pitch of an aircraft, alternative embodiments can include a set of fluid pressurizers on one or more canards that can be utilized in combination with, or separately from, one or more sets of fluids pressurizers on one or more wings to accomplish manipulation of the roll, yaw, and/or pitch of an aircraft.

Figure 42:
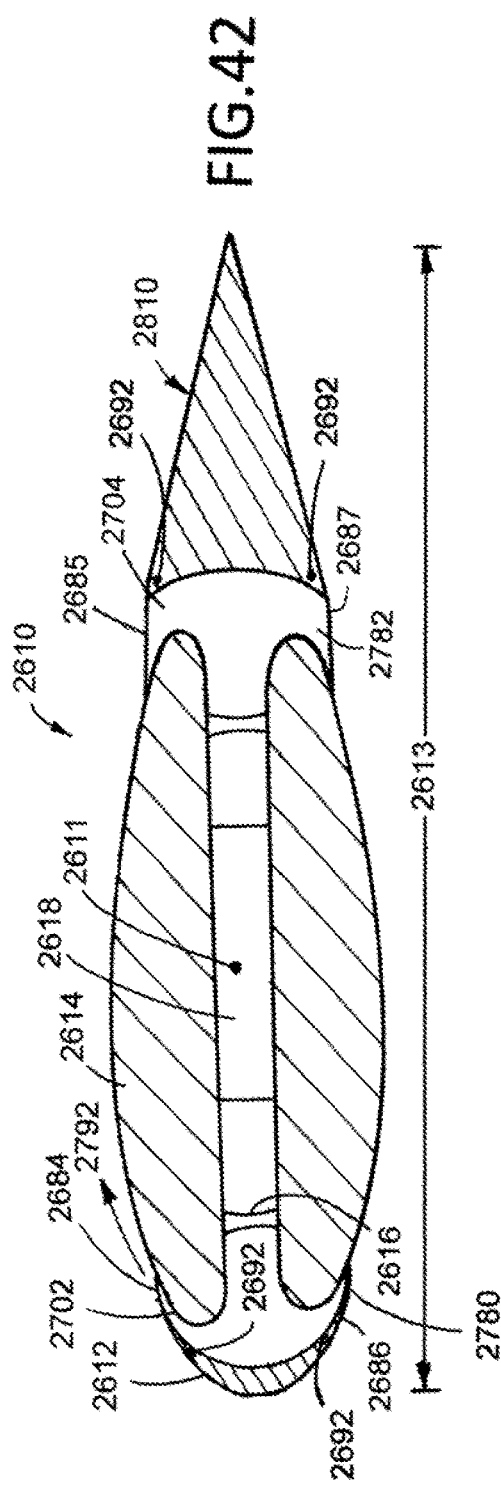
FIG. 42 is a cross-sectional view of a wing of an aircraft that includes a twelfth example fluid system. The valves and the flap are in a first configuration.
Figure 43:
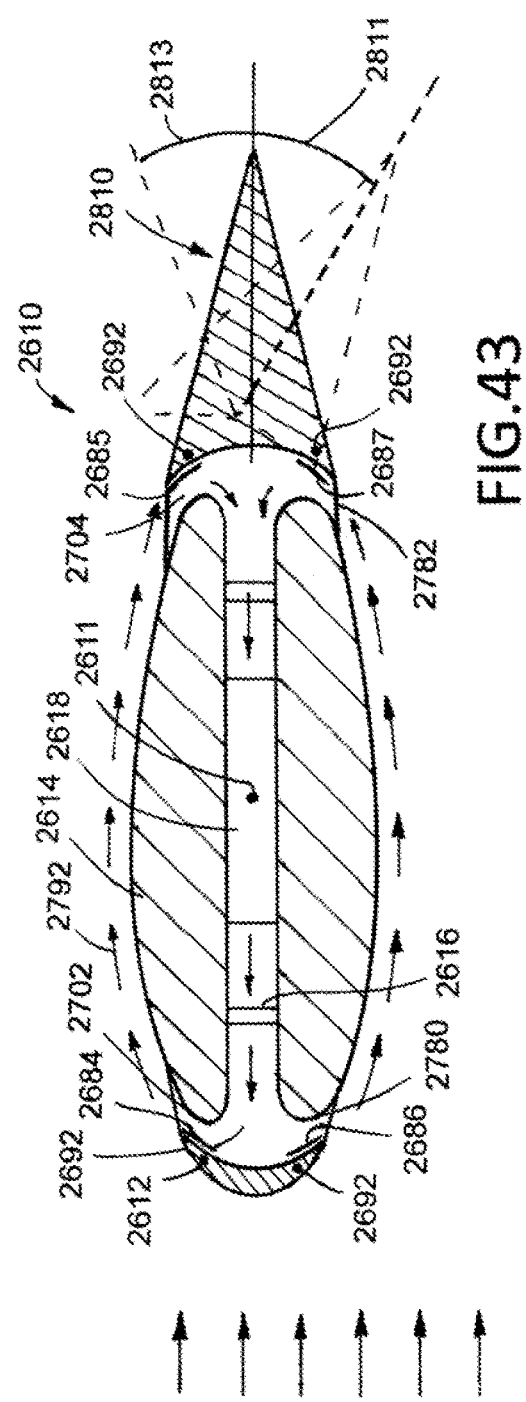
FIG. 43 is another cross-sectional view of the wing and the example fluid system illustrated in FIG. 42. The valves and the flap are in a second configuration.

FIGS. 42 and 43 illustrate a twelfth example fluid system 2610. The fluid system 2610 is similar to the fluid system 610 illustrated in FIG. 17 and described above, except as detailed below. The fluid system 2610 has a lengthwise axis 2611, a first body portion 2612, a chord length 2613, a second body portion 2614, a plurality of supports 2616, a plurality of fluid pressurizers 2618, a first valve 2684, a second valve 2685, a third valve 2686, and a fourth valve 2687.

In the illustrated embodiment, each of the valves 2684, 2685, 2686, 2687 is moveably attached to the first body portion 2612 and has a first configuration, as shown in FIG. 42, a second configuration, as shown in FIG. 43, and is moveable between these configurations via actuators 2692. In the first configuration, the first valve 2684 is disposed between the first body portion 2612 and the second body portion 2614 such that it seals the injection opening 2702 and fluid cannot pass through the injection opening 2702 (e.g., completely seals the injection opening 2702). In the second configuration, the first valve 2684 is disposed adjacent the first body portion 2612 such that it does not seal the injection opening 2702 and fluid can pass through the injection opening 2702. In the first configuration, the second valve 2685 is disposed between the first body portion 2612 and the second body portion 2614 such that it seals the suction opening 2704 and fluid cannot pass through the suction opening 2704 (e.g., completely seals the suction opening 2704). In the second configuration, the second valve 2685 is disposed adjacent the first body portion 2612 such that it does not seal the suction opening 2704 and fluid can pass through the suction opening 2704. In the first configuration, the third valve 2686 is disposed between the first body portion 2612 and the second body portion 2614 such that it seals the second injection opening 2780 and fluid cannot pass through the second injection opening 2780 (e.g., completely seals the second injection opening 2780). In the second configuration, the third valve 2686 is disposed adjacent the first body portion 2612 such that it does not seal the second injection opening 2780 and fluid can pass through the second injection opening 2780. In the first configuration, the fourth valve 2687 is disposed between the first body portion 2612 and the second body portion 2614 such that it seals the second suction opening 2782 and fluid cannot pass through the second suction opening 2782 (e.g., completely seals the second suction opening 2782). In the second configuration, the fourth valve 2687 is disposed adjacent the first body portion 2612 such that it does not seal the second suction opening 2682 and fluid can pass through the second suction opening 2682.

Each of the actuators 2692 is moveable between an off state and an on state and comprises the various components necessary to move a valve between a first configuration and a second configuration. Each of the actuators 2692 can be operatively connected to any suitable portion of the device, system, or component on which the fluid system is attached to provide power to the actuator (e.g., battery, electric motor) and to provide a mechanism for moving the actuator between the off state and the on state (e.g., one or more switches).

In the off state, the actuators 2692 position the valves 2684, 2685, 2686, 2687 in the first configuration and fluid is prevented from flowing through the relative openings. In the on state, the actuators 2692 position the valves 2684, 2685, 2686, 2687 in the second configuration such that fluid can flow through the relative openings. The actuators 2692 can move between the on state and off state concurrently, or separate from one another, depending on the desired flight control intended to be imparted on the aircraft.

Different flight control effects can be imparted onto the aircraft by manipulating the velocity of the jets of fluid 2792 being ejected from the injection openings 2702, 2780. For example, if it is desired to impart pitch control onto the aircraft, a first set of fluid pressurizers and a second set of fluid pressurizers can be utilized. The first set of fluid pressurizers is positioned on a first wing between the end and a point located a third of the length of the first wing from the end. The second set of fluid pressurizers is positioned on a second wing between the end and a point located a third of the length of the second wing from the end. Depending on the type of pitch control intended to be achieved, one of the first set of compressors, or portions thereof, or second set of compressors, or portions thereof, can increase or decrease the velocity of fluid exiting the compressors such that the pitch moment can be altered. As illustrated in FIGS. 42 and 43, the fluid system 2610 is utilized in combination with an elevator 2810. Alternatively, or in addition to increasing or decreasing the velocity of fluid exiting a compressor and/or using an elevator, the cross-sectional area of one or more injection openings and/or suction openings can be manipulated to achieve manipulation of the pitch moment.

In the illustrated embodiment, the fluid system 2610 is symmetrical about its chord length. During use, when it is not desired to impart flight control (e.g., pitch control) on an airfoil, each of the valves 2684, 2685, 2686, 2687 is in the first configuration. During use, when it is desired to generate lift in an upward direction, each of the first and second valves 2684 and 2685 can be moved to the second configuration, as shown in FIG. 43, the third and fourth valves 2686 and 2687 can be moved to, or maintained in, the first configuration, and/or the position of the flap 2810 can be manipulated such that it is deflected downward relative to the chord length at an angle 2811. The angle 2811 can be any suitable angle, such as an angle between about 0 degrees and about 90 degrees, between about 20 degrees and about 70 degrees, and any other angle considered suitable for a particular embodiment. During use, when it is desired to generate lift in a downward direction, each of the third and fourth valves 2686 and 2687 can be moved to the second configuration, as shown in FIG. 43, the first and second valves 2684 and 2685 can be moved to, or maintained in, the first configuration, and/or the position of the flap 2810 can be manipulated such that it is deflected upward relative to the chord length at an angle 2813 at an angle 2813. The angle 2813 can be any suitable angle, such as an angle between about 0 degrees and about 90 degrees, between about 20 degrees and about 70 degrees, and any other angle considered suitable for a particular embodiment.

Figure 44:
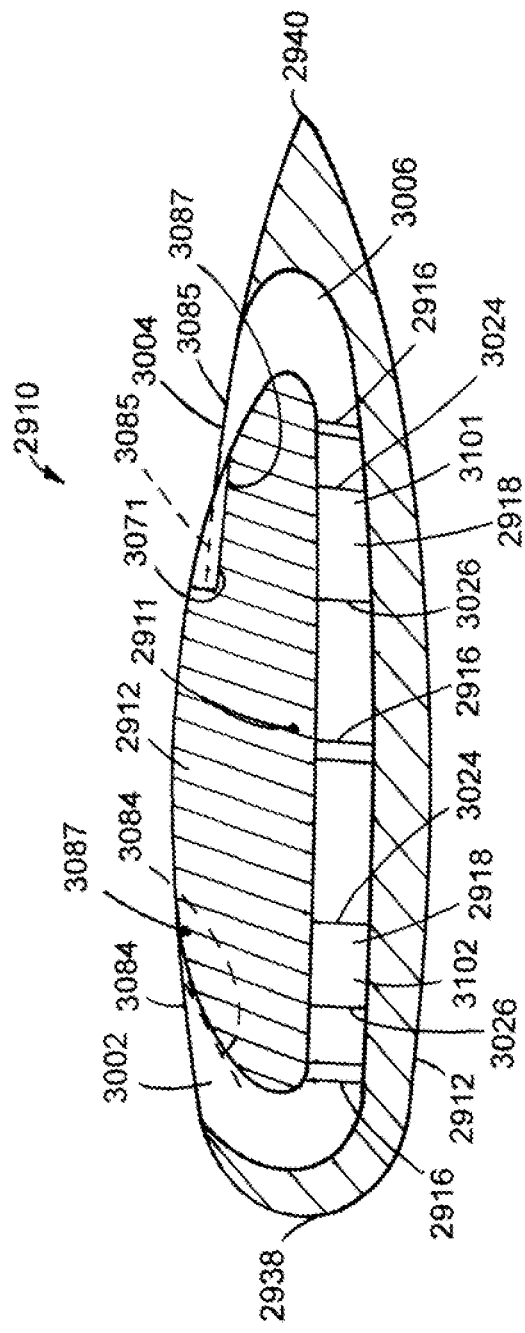
FIG. 44 is a cross-sectional view of a wing of an aircraft that includes a thirteenth example fluid system.

FIG. 44 illustrates a thirteenth example fluid system 2910. The fluid system 2910 is similar to the fluid system 2210 illustrated in FIGS. 38 and 39 and described above, except as detailed below. The fluid system 2910 has a lengthwise axis 2911, a main body 2912, a plurality of supports 2916, a plurality of fluid pressurizers 2918, a first valve 3084, and a second valve 3085.

In the illustrated embodiment, the main body 2912 has a leading edge 2938, a trailing edge 2940, and defines an injection opening 3002, a suction opening 3004, a channel 3006 that extends from the suction opening 3004 to the injection opening 3002, and a first recess 3071.

The first recess 3071 is sized and configured to receive and house the second valve 3085. In the illustrated embodiment, each of the valves 3084, 3085 is moveably attached to the main body 2912 and has a first surface, a second surface, a thickness that extends from the first surface to the second surface, and a length. Each of the valves 3084, 3085 has a first configuration, as shown in FIG. 44 in phantom lines, a second configuration, as shown in FIG. 44 in solid lines, and is moveable between these configurations via actuators 3087. In the first configuration, the first valve 3084 is positioned within the channel 3006 adjacent the main body 2912 such that fluid can flow through the channel 3006 out of the injection opening 3002 to an environment exterior to the channel 3006 (e.g., in the first configuration the first valve 3084 is positioned such that it does not seal the injection opening 3002). In the second configuration, the first valve 3084 is positioned such that fluid is prevented from flowing through the injection opening 3002 (e.g., in the second configuration the first valve 3084 seals the injection opening 3002). In the first configuration, the second valve 3085 is positioned within the first recess 3071 such that fluid can flow through the suction opening 3004 and into the channel 3006 (e.g., in the first configuration the second valve 3085 is positioned such that it does not seal the suction opening 3004). In the second configuration, the second valve 3085 is positioned such that fluid is prevented from flowing through the suction opening 3004 and into the channel 3006 (e.g., in the second configuration the second valve 3085 seals the suction opening 3006).

Each of the actuators 3087 is moveable between an off state and an on state and comprises the various components necessary to move a valve between a first configuration and a second configuration. Each of the actuators 3087 can be operatively connected to any suitable portion of the device, system, or component on which the fluid system is attached to provide power to the actuator (e.g., battery, electric motor) and to provide a mechanism for moving the actuator between the off state and the on state (e.g., one or more switches). In the off state, the actuators 3087 position each of the valves 3084, 3085 such that it is in the first configuration. In the on state, the actuators 3087 position each of the valves 3084, 3085 such that it is in the second configuration.

While each of the valves 3084, 3085 and actuators 3087 has been illustrated as having a particular structural arrangement and as being positioned at a particular location on the fluid system, a valve and an actuator can have any suitable structural arrangement and be positioned at any suitable location on a fluid system. Selection of a suitable structural arrangement and/or position to locate a valve and an actuator can be based on various considerations, such as the desired flow around a fluid system and/or the desired flow through a channel defined through a fluid system. For example, a valve and an actuator included in a fluid system can be positioned within a channel, be pivotably attached to a main body, be attached to a main body such that it can be linearly actuated, or at any other location that achieves the sealing as described herein.

While the fluid system 2910 has been illustrated as including a first recess 3071 and valves 3084, 3085, any of the features, elements, and/or structure illustrated with respect to fluid system 2910 can be included at multiple locations along a length of a fluid system. For example, a valve, such as valves 3084, 3085 can extend along a majority of the span of a wing, the entire span of a wing, or along a portion of the span of a wing. In embodiments in which a valve does not extend along a majority or the entire length of the span of a wing, or in embodiments in which discrete suction openings, and/or injection openings are defined along the span of a wing, a plurality of valves and/or actuators can be included in a fluid system to achieve the sealing described herein with respect to each of the discrete openings.

In the illustrated embodiment, each fluid pressurizer of the plurality of fluid pressurizers 2918 is disposed within the channel 3006 and is in fluid communication with the injection opening 3002 and the suction opening 3004. A first fluid pressurizer 3101 of the plurality of fluid pressurizers 2918 is attached to the main body 2912 and is positioned such that the suction port 3024 is directed toward a first portion of the channel 3006 that extends from the suction opening 3004 to the first fluid pressurizer 3101 (e.g., the suction port 3024 is directed toward the suction opening 3004) and the discharge port 3026 is directed toward a second portion of the channel 3006 that extends from the first fluid pressurizer 3101 to a second fluid pressurizer 3102 of the plurality of fluid pressurizers 2918 (e.g., the discharge port 3026 is directed toward the second fluid pressurizer 3102). The second fluid pressurizer 3102 of the plurality of fluid pressurizers 2918 is attached to the main body 2912 and is positioned such that the suction port 3024 is directed toward the second portion of the channel 3006 that extends from the first fluid pressurizer 3101 to the second fluid pressurizer 3102 (e.g., the suction port 3024 is directed toward the first fluid pressurizer 3101) and the discharge port 3026 is directed toward a third portion of the channel 3006 that extends from the second fluid pressurizer 3102 to the injection opening 3002 (e.g., the discharge port 3026 is directed toward the injection opening 3002). In the on state, the plurality of fluid pressurizers 3018 draws fluid through the suction opening 3004, through the channel 3006, through the fluid pressurizers, and pushes fluid through the channel 3006 and out of the injection opening 3002. Optionally, one or more ducts, such as those described herein can be included in fluid system 2910 and/or the first fluid pressurizer 3101 can be ducted to the second fluid pressurizer 3102 (e.g., the discharge port 3026 of the first fluid pressurizer 3101 can be ducted to the suction port 3024 of the second fluid pressurizer).

While the example fluid systems and ducts described herein have been illustrated as being included on a wing of an aircraft that has a constant chord length with no sweep angle and/or dihedral angle, a fluid system and/or duct, such as those described herein can be included in any suitable structure, device, and/or system. Selection of a suitable structure, device, and/or system to include a fluid system and/or duct can be based on various considerations, such as the intended use of the structure, device, and/or system.

Examples of structures, devices, and/or systems considered suitable to include a fluid system and/or duct, such as those described herein, include aircraft, unmanned reconnaissance aircrafts, small person aircrafts, commercial airlines, wings of aircrafts, wings of aircrafts that have a varying chord length and/or sweep angle, wings of aircraft that are tapered, space shuttles, space exploratory aircrafts, exploratory aircrafts, airplanes, helicopters, rotorcraft rotor blades, vehicles, automobiles, cars, trucks, motorcycles, boats, locomotives, projectiles, turbines, wind turbines, blades of wind turbines, gas turbine engines, gas turbine engine compressors and/or fans, pumps, propellers, blades, sails, any structure, device, and/or system that uses airfoils, land vehicles, water vehicles, air vehicles, any structure, device, and/or system that is used to generate lift and/or thrust, and any other structure, device, and/or system considered suitable. For example, the fluid systems and ducts described herein can be advantageously used for exploratory missions to other planets, such as flights in the Martian atmosphere. This is considered advantageous at least due to the reduced energy consumption, enhanced lift, reduced drag, generated thrust, increased cruise aerodynamic efficiency, enhanced maneuverability and safety, and reduced takeoff/landing distance required for structures, devices, and/or systems that include a fluid system and/or duct, such as those described herein.

Any of the herein described examples of fluid systems, and any of the features described relative to a particular example of a fluid system, can be included along a portion, or the entirety, of the span of a wing, blade, or other feature of a device, system, component (e.g., transportation vehicle) in which it is desired to include a fluid system. For example, any of the herein described embodiments, such as the fluid systems and/or ducts, can be combined in any suitable manner and include any of the features, devices, systems, and/or components described in U.S. patent application Ser. No. 15/426,084 by Zha and filed on Feb. 7, 2017, which is incorporated by reference herein in its entirety, and/or U.S. patent application Ser. No. 15/255,523 by Zha and filed on Sep. 2, 2016, which is incorporated by reference herein in its entirety. For example, any of the herein described embodiments can omit the inclusion of one or more ducts.

Those with ordinary skill in the art will appreciate that various modifications and alternatives for the described and illustrated embodiments can be developed in light of the overall teachings of the disclosure. Accordingly, the particular arrangements disclosed are intended to be illustrative only and not limiting as to the scope of the invention, which is to be given the full breadth of the appended claims and any and all equivalents thereof.

What is claimed is:

1. A fluid system comprising:
  a first body portion having a leading edge, a trailing edge, a first intermediate edge, a second intermediate edge, and a main body defining a recess, a recess base, and a first opening, the first intermediate edge disposed between the leading edge and the second intermediate edge, the second intermediate edge disposed between the first intermediate edge and the trailing edge, the recess extending into the main body of the first body portion from the first opening to the recess base, the first opening extending from the first intermediate edge to the second intermediate edge;
  a second body portion disposed within the recess defined by the main body of the first body portion, the first body portion and the second body portion cooperatively defining an injection opening, a suction opening, and a channel extending from the injection opening to the suction opening,
  a fluid pressurizer disposed within the channel cooperatively defined by the first body portion and the second body portion and having a port; and
  a duct attached to the port of the fluid pressurizer and disposed within the channel, the duct having a first end, a second end, a first portion, a second portion, and a main body defining a first duct opening at the first end, a second duct opening at the second end, and a passageway extending from the first duct opening to the second duct opening, the first portion extending from the first end toward the second end, the second portion extending from the second end toward the first end, the first portion disposed at an angle relative to the second portion, the angle being less than about 130 degrees.

2. The fluid system of claim 1, wherein the first duct opening has a first duct opening length and the second duct opening has a second duct opening length that is greater than the first duct opening length.

3. The fluid system of claim 1, wherein the first duct opening has a first duct opening height and the second duct opening has a second duct opening height that is less than the first duct opening height.

4. The fluid system of claim 1, wherein the first duct opening has a first duct opening height and the second duct opening has a second duct opening height; and
  wherein the second duct opening height is equal to between about 2% and about 50% of the first duct opening height.

5. The fluid system of claim 1, wherein the first duct opening has a first duct opening cross-sectional area and the second duct opening has a second duct opening cross-sectional area that is less than the first duct opening cross-sectional area; and
  wherein the second duct opening cross-sectional area is equal to between about 0.01% and about 200% of the first duct opening cross-sectional area.

6. The fluid system of claim 1, wherein the duct is entirely disposed within the channel.

7. The fluid system of claim 1, wherein the duct comprises a suction duct extending from the fluid pressurizer toward the suction opening.

8. The fluid system of claim 7, wherein the suction duct is configured to allow a fluid to pass through the passageway from the second duct opening to the first duct opening such that the fluid enters the passageway at the second end at an angle that is directed toward a plane that extends through the first duct opening and a portion of the passageway that extends from the first duct opening toward the second duct opening.

9. The fluid system of claim 7, wherein the fluid pressurizer has a second port; and
  further comprising an injection duct attached to the second port of the fluid pressurizer and extending toward the injection opening, the injection duct disposed within the channel and having an injection duct first end, an injection duct second end, an injection duct first portion, an injection duct second portion, and an injection duct main body defining an injection duct first opening at the injection duct first end, an injection duct second opening at the injection duct second end, and an injection duct passageway extending from the injection duct first opening to the injection duct second opening, the injection duct first portion extending from the injection duct first end toward the injection duct second end, the injection duct second portion extending from the injection duct second end toward the injection duct first end, the injection duct first portion disposed at an injection duct angle relative to the injection duct second portion, the injection duct angle being less than about 130 degrees.

10. The fluid system of claim 9, wherein the injection duct has a lengthwise axis that extends through the injection duct first opening and the injection duct first portion; and
wherein the injection duct is configured to allow a fluid to pass through the injection duct passageway from the injection duct first opening to the injection duct second opening such that the fluid exits the injection duct passageway at the injection duct second end at an angle that is directed toward a plane that is orthogonal to the lengthwise axis and away from the injection duct second end.

11. The fluid system of claim 1, wherein the main body of the duct defines a curve between the first end and the second end.

12. The fluid system of claim 1, wherein the first duct opening is circular and the second duct opening is rectangular.

13. The fluid system of claim 1, wherein the duct comprises a center body attached to the main body of the duct within the passageway defined by the duct.

14. The fluid system of claim 13, wherein the center body has a first end and a second end;
wherein a first axis passes through the center of the first end of the center body and the second end of the center body;
wherein a second axis extends through the center of the first duct opening; and
wherein the first axis is coaxial with the second axis.

15. The fluid system of claim 13, wherein the center body has a duck-billed configuration.

16. The fluid system of claim 1, wherein the first body portion and the second body portion cooperatively define the wing of an aircraft.

17. The fluid system of claim 1, wherein the first body portion, the second body portion, and the duct are formed as an integrated component.

18. A fluid system comprising:
a first body portion having a leading edge, a trailing edge, a first intermediate edge, a second intermediate edge, and a main body defining a recess, a recess base, and a first opening, the first intermediate edge disposed between the leading edge and the second intermediate edge, the second intermediate edge disposed between the first intermediate edge and the trailing edge, the recess extending into the main body of the first body portion from the first opening to the recess base, the first opening extending from the first intermediate edge to the second intermediate edge;
a second body portion disposed within the recess defined by the main body of the first body portion, the first body portion and the second body portion cooperatively defining an injection opening, a suction opening, and a channel extending from the injection opening to the suction opening,
a plurality of fluid pressurizers disposed within the channel cooperatively defined by the first body portion and the second body portion, each fluid pressurizer of the plurality of fluid pressurizers having a plurality of ports; and
a plurality of ducts disposed within the channel, each duct of the plurality of ducts attached to a port of a fluid pressurizer of the plurality of fluid pressurizers and having a first end, a second end, a first portion, a second portion, and a main body defining a first duct opening at the first end, a second duct opening at the second end, and a passageway extending from the first duct opening to the second duct opening, the first portion extending from the first end toward the second end, the second portion extending from the second end toward the first end, the first portion disposed at an angle relative to the second portion, the angle being less than about 130 degrees, the first duct opening having a first duct opening length and a first structural configuration, the second duct opening having a second duct opening length that is greater than the first duct opening length and a second structural configuration that is different than the first structural configuration.

19. The fluid system of claim 18, wherein the first duct opening has a first duct opening cross-sectional area and the second duct opening has a second duct opening cross-sectional area that is less than the first duct opening cross-sectional area; and
wherein the second duct opening cross-sectional area is equal to between about 0.01% and about 200% of the first duct opening cross-sectional area.

20. A fluid system comprising:
a first body portion having a leading edge, a trailing edge, a first intermediate edge, a second intermediate edge, and a main body defining a recess, a recess base, and a first opening, the first intermediate edge disposed between the leading edge and the second intermediate edge, the second intermediate edge disposed between the first intermediate edge and the trailing edge, the recess extending into the main body of the first body portion from the first opening to the recess base, the first opening extending from the first intermediate edge to the second intermediate edge;
a second body portion disposed within the recess defined by the main body of the first body portion, the first body portion and the second body portion cooperatively defining an injection opening, a suction opening, and a channel extending from the injection opening to the suction opening,
a plurality of fluid pressurizers disposed within the channel cooperatively defined by the first body portion and the second body portion, each fluid pressurizer of the plurality of fluid pressurizers having a plurality of ports;
a plurality of suction ducts disposed within the channel, each suction duct of the plurality of suction ducts attached to a port of a fluid pressurizer of the plurality of fluid pressurizers, extending toward the suction opening, and having a suction duct first end, a suction duct second end, a suction duct first portion, a suction duct second portion, and a suction duct main body defining a suction duct first opening at the suction duct first end, a suction duct second opening at the suction duct second end, and a suction duct passageway extending from the suction duct first opening to the suction duct second opening, the suction duct first portion extending from the suction duct first end toward the suction duct second end, the suction duct second portion extending from the suction duct second end toward the suction duct first end, the suction duct first portion disposed at a suction duct angle relative to the suction duct second portion, the suction duct angle being less than about 130 degrees, the suction duct first opening having a suction duct first opening length, a suction duct first opening height, and a suction duct first structural configuration, the suction duct second opening having a suction duct second opening length that is greater than the suction duct first opening length, a suction duct second opening height that is equal to between about 2% and about 50% of the first duct opening height, and a suction duct second structural configuration that is different than the suction duct first structural configuration, each suction duct of the plurality of suction ducts configured to allow a fluid to pass through the suction duct passageway from the suction duct second opening to the suction duct first opening such that the fluid enters the suction duct passageway at the suction duct second end at a suction duct second angle that is directed toward a plane that extends through the suction duct first opening and a portion of the suction duct passageway that extends from the suction duct first opening toward the suction duct second opening, and a plurality of injection ducts disposed within the channel, each injection duct of the plurality of injection ducts attached to a port of a fluid pressurizer, extending toward the injection opening, and having an injection duct first end, an injection duct second end, an injection duct first portion, an injection duct second portion, and an injection duct main body defining an injection duct first opening at the injection duct first end, an injection duct second opening at the injection duct second end, and an injection duct passageway extending from the injection duct first opening to the injection duct second opening, the injection duct first portion extending from the injection duct first end toward the injection duct second end, the injection duct second portion extending from the injection duct second end toward the injection duct first end, the injection duct first portion disposed at an injection duct angle relative to the injection duct second portion, the injection duct angle being less than about 130 degrees.

* * * * *